US011852043B2

(12) United States Patent
Bollinger et al.

(10) Patent No.: US 11,852,043 B2
(45) Date of Patent: Dec. 26, 2023

(54) PUMPED HEAT ELECTRIC STORAGE SYSTEM WITH RECIRCULATION

(71) Applicant: MALTA INC., Cambridge, MA (US)

(72) Inventors: Benjamin R. Bollinger, Cambridge, MA (US); Mert Geveci, Cambridge, MA (US); Bao H. Truong, Cambridge, MA (US); Erhan Karaca, Cambridge, MA (US); Sebastian W. Freund, Cambridge, MA (US); David M. Brantzeg, Cambridge, MA (US); James J. Underwood, Cambridge, MA (US); John S. Bowen, Cambridge, MA (US); Roy T. Collins, Cambridge, MA (US)

(73) Assignee: MALTA INC., Cambridge, MA (US)

( * ) Notice: Subject to any disclaimer, the term of this patent is extended or adjusted under 35 U.S.C. 154(b) by 0 days.

(21) Appl. No.: 17/777,128

(22) PCT Filed: Nov. 16, 2020

(86) PCT No.: PCT/US2020/060700
§ 371 (c)(1),
(2) Date: May 16, 2022

(87) PCT Pub. No.: WO2021/097413
PCT Pub. Date: May 20, 2021

(65) Prior Publication Data
US 2022/0389839 A1 Dec. 8, 2022

Related U.S. Application Data

(60) Provisional application No. 63/113,386, filed on Nov. 13, 2020, provisional application No. 62/936,491, filed on Nov. 16, 2019.

(51) Int. Cl.
*F01K 3/12* (2006.01)
*F01K 3/00* (2006.01)
(Continued)

(52) U.S. Cl.
CPC .............. *F01K 3/12* (2013.01); *F01K 3/006* (2013.01); *F01K 3/06* (2013.01); *F01K 3/262* (2013.01);
(Continued)

(58) Field of Classification Search
CPC ........ F02C 1/00–105; F02C 6/14; F02C 6/16; Y02E 60/14; F01K 3/00–267
See application file for complete search history.

(56) References Cited

U.S. PATENT DOCUMENTS

| 1,576,019 A | 3/1926 | Samuel |
| 1,758,567 A | 5/1930 | Fernandez |

(Continued)

FOREIGN PATENT DOCUMENTS

| CA | 2794150 C | 3/2018 |
| CA | 2952387 C | 2/2019 |

(Continued)

OTHER PUBLICATIONS

Ackeret et al., "Aerodynamic Heat-Power Engine Operating On A Closed Cycle," NACA Technical Memorandum, No. 1034, Nov. 1942, 35 pages.

(Continued)

*Primary Examiner* — Laert Dounis
(74) *Attorney, Agent, or Firm* — Barnes & Thornburg LLP

(57) ABSTRACT

The present disclosure provides pumped thermal energy storage systems that can be used to store and extract electrical energy. A pumped thermal energy storage system of the present disclosure can store energy by operating as a heat pump or refrigerator, whereby net work input can be used to transfer heat from the cold side to the hot side. A working fluid of the system is capable of efficient heat exchange with heat storage fluids on a hot side of the system and on a cold (Continued)

side of the system. The system can extract energy by operating as a heat engine transferring heat from the hot side to the cold side, which can result in net work output.

39 Claims, 26 Drawing Sheets

(51) Int. Cl.
*F01K 3/06* (2006.01)
*F01K 3/26* (2006.01)
*F01K 13/02* (2006.01)
*F01K 25/00* (2006.01)
*F02C 1/10* (2006.01)
*F02C 6/14* (2006.01)

(52) U.S. Cl.
CPC .............. *F01K 13/02* (2013.01); *F01K 25/00* (2013.01); *F02C 1/10* (2013.01); *F02C 6/14* (2013.01); *Y02E 60/14* (2013.01)

(56) References Cited

U.S. PATENT DOCUMENTS

| | | |
|---|---|---|
| 1,881,965 A | 10/1932 | Moroni et al. |
| 2,065,974 A | 12/1936 | Fritz et al. |
| 2,171,253 A | 8/1939 | Day |
| 2,172,910 A | 9/1939 | Keller |
| 2,203,731 A | 6/1940 | Keller |
| 2,246,513 A | 6/1941 | Hammond |
| 2,319,995 A | 5/1943 | Keller |
| 2,336,178 A | 12/1943 | Keller |
| 2,414,170 A | 1/1947 | Salzmann |
| 2,446,108 A | 7/1948 | Salzmann |
| 2,453,886 A | 11/1948 | Ackeret et al. |
| 2,454,358 A | 11/1948 | Traupel |
| 2,566,817 A | 9/1951 | Yellin |
| 2,689,680 A | 9/1954 | Lovesey |
| 2,697,326 A | 12/1954 | Featonby |
| 2,788,195 A | 4/1957 | Karmazin |
| 2,791,204 A | 5/1957 | Andrus |
| 2,820,348 A | 1/1958 | Sauter |
| 2,860,493 A | 11/1958 | Capps et al. |
| 2,911,792 A | 11/1959 | Herre |
| 3,152,442 A | 10/1964 | Rowekamp |
| 3,218,807 A | 11/1965 | Max et al. |
| 3,220,191 A | 11/1965 | Berchtold |
| 3,285,567 A | 11/1966 | Richardson |
| 3,352,774 A | 11/1967 | Williams |
| 3,537,517 A | 11/1970 | Doyle |
| 3,630,022 A | 12/1971 | Jubb |
| 3,797,516 A | 3/1974 | Forster et al. |
| 3,818,697 A | 6/1974 | Gilli |
| 3,859,795 A | 1/1975 | Frutschi |
| 3,895,492 A | 7/1975 | Forster et al. |
| 3,897,170 A | 7/1975 | Darvishian |
| 3,955,359 A | 5/1976 | Yannone et al. |
| 4,024,908 A | 5/1977 | Meckler |
| 4,054,124 A | 10/1977 | Knoos |
| 4,089,744 A | 5/1978 | Cahn |
| 4,094,148 A | 6/1978 | Nelson |
| 4,110,987 A | 9/1978 | Cahn et al. |
| 4,117,682 A | 10/1978 | Smith |
| 4,124,061 A | 11/1978 | Mitchell et al. |
| 4,126,291 A | 11/1978 | Gilbert et al. |
| 4,148,191 A | 4/1979 | Frutschi |
| 4,158,384 A | 6/1979 | Brautigam |
| 4,215,553 A | 8/1980 | Poirier et al. |
| 4,362,290 A | 12/1982 | Marx et al. |
| 4,405,010 A | 9/1983 | Schwartz |
| 4,408,654 A | 10/1983 | Doomernik |
| 4,430,241 A | 2/1984 | Fiorucci |
| 4,438,630 A | 3/1984 | Rowe |
| 4,444,024 A | 4/1984 | McFee |
| 4,479,352 A | 10/1984 | Yamaoka et al. |
| 4,523,629 A | 6/1985 | Copeland |
| 4,566,668 A | 1/1986 | Koppenberg |
| 4,583,372 A | 4/1986 | Egan et al. |
| 4,628,692 A | 12/1986 | Pierce |
| 4,630,436 A | 12/1986 | Frutschi |
| 4,643,212 A | 2/1987 | Rothrock |
| 4,670,205 A | 6/1987 | Montierth |
| 4,715,576 A | 12/1987 | Montierth |
| 4,727,930 A | 3/1988 | Bruckner et al. |
| 4,872,307 A | 10/1989 | Nakhamkin |
| 5,131,231 A | 7/1992 | Trimble et al. |
| 5,160,689 A | 11/1992 | Kamen |
| 5,269,145 A | 12/1993 | Krause et al. |
| 5,384,489 A | 1/1995 | Bellac |
| 5,537,822 A | 7/1996 | Shnaid et al. |
| 5,644,928 A | 7/1997 | Uda et al. |
| 5,653,656 A | 8/1997 | Thomas et al. |
| 5,653,670 A | 8/1997 | Endelman |
| 6,119,682 A | 9/2000 | Hazan |
| 6,318,066 B1 | 11/2001 | Skowronski |
| 6,532,745 B1 | 3/2003 | Neary |
| 6,629,413 B1 | 10/2003 | Wendt et al. |
| 6,634,410 B1 | 10/2003 | Wilson et al. |
| 6,644,062 B1 | 11/2003 | Hays |
| 6,701,711 B1 | 3/2004 | Litwin |
| 6,749,011 B2 | 6/2004 | Horng et al. |
| 6,787,116 B2 | 9/2004 | Williams et al. |
| 7,028,481 B1 | 4/2006 | Morrow |
| 7,086,231 B2 | 8/2006 | Pinkerton |
| 7,226,554 B2 | 6/2007 | Sudo et al. |
| 7,299,633 B2 | 11/2007 | Murphy et al. |
| 7,458,418 B2 | 12/2008 | Sienel |
| 7,603,858 B2 | 10/2009 | Bennett |
| 7,900,450 B2 | 3/2011 | Gurin |
| 7,937,930 B1 | 5/2011 | Dunn |
| 7,954,320 B2 | 6/2011 | Ellensohn et al. |
| 7,954,321 B2 | 6/2011 | Shinnar |
| 8,099,198 B2 | 1/2012 | Gurin |
| 8,113,011 B2 | 2/2012 | Howes et al. |
| 8,136,358 B1 | 3/2012 | Brostmeyer |
| 8,206,075 B2 | 6/2012 | White et al. |
| 8,281,593 B2 | 10/2012 | Held et al. |
| 8,378,280 B2 | 2/2013 | Mills et al. |
| 8,403,613 B2 | 3/2013 | Van Der Meulen |
| 8,424,284 B2 | 4/2013 | Staffend et al. |
| 8,453,677 B2 | 6/2013 | Howes et al. |
| 8,496,026 B2 | 7/2013 | Howes et al. |
| 8,500,388 B2 | 8/2013 | Van Der Meulen et al. |
| 8,613,195 B2 | 12/2013 | Held et al. |
| 8,616,323 B1 | 12/2013 | Gurin |
| 8,656,712 B2 | 2/2014 | Howes et al. |
| 8,671,686 B2 | 3/2014 | Pinkerton et al. |
| 8,783,034 B2 | 7/2014 | Held |
| 8,826,664 B2 | 9/2014 | Howes et al. |
| 8,833,079 B2 | 9/2014 | Smith |
| 8,833,101 B2 | 9/2014 | Howes et al. |
| 8,857,186 B2 | 10/2014 | Held |
| 8,863,641 B2 | 10/2014 | Howes |
| 8,869,531 B2 | 10/2014 | Held |
| 8,904,793 B2 | 12/2014 | Hemrle et al. |
| 8,931,277 B2 | 1/2015 | Peterson et al. |
| 8,991,183 B2 | 3/2015 | Stiesdal |
| 9,003,763 B2 | 4/2015 | Coney |
| 9,014,791 B2 | 4/2015 | Held |
| 9,062,898 B2 | 6/2015 | Held et al. |
| 9,243,566 B2 | 1/2016 | Ono et al. |
| 9,316,121 B2 | 4/2016 | Davidson et al. |
| 9,316,404 B2 | 4/2016 | Gurin |
| 9,341,084 B2 | 5/2016 | Xie et al. |
| 9,394,807 B1 | 7/2016 | Kreuger |
| 9,410,449 B2 | 8/2016 | Held et al. |
| 9,458,738 B2 | 10/2016 | Held et al. |
| 9,518,786 B2 | 12/2016 | Howes et al. |
| 9,605,661 B2 | 3/2017 | Aga et al. |
| 9,638,065 B2 | 5/2017 | Vermeersch et al. |
| 9,658,004 B2 | 5/2017 | Howes et al. |
| 9,683,788 B2 | 6/2017 | Olcese |
| 9,752,460 B2 | 9/2017 | Bowan |
| 9,759,096 B2 | 9/2017 | Vermeersch |

(56) References Cited

U.S. PATENT DOCUMENTS

| | | | |
|---|---|---|---|
| 9,841,243 B2 | 12/2017 | Oliva Llena et al. |
| 9,863,282 B2 | 1/2018 | Hart et al. |
| 9,863,287 B2 | 1/2018 | Kacludis et al. |
| 9,874,112 B2 | 1/2018 | Giegel |
| 9,932,830 B2 | 4/2018 | Laughlin |
| 10,012,448 B2 | 7/2018 | Laughlin et al. |
| 10,024,198 B2 | 7/2018 | Held et al. |
| 10,077,683 B2 | 9/2018 | Close |
| 10,082,045 B2 | 9/2018 | Larochelle et al. |
| 10,082,104 B2 | 9/2018 | Apte |
| 10,094,219 B2 | 10/2018 | Laughlin |
| 10,221,775 B2 | 3/2019 | Apte et al. |
| 10,233,787 B2 | 3/2019 | Larochelle et al. |
| 10,233,833 B2 | 3/2019 | Apte et al. |
| 10,260,820 B2 | 4/2019 | Kerth et al. |
| 10,267,184 B2 | 4/2019 | Bowan et al. |
| 10,288,357 B2 | 5/2019 | Laughlin et al. |
| 10,436,109 B2 | 10/2019 | Apte et al. |
| 10,443,452 B2 | 10/2019 | Laughlin et al. |
| 10,458,721 B2 | 10/2019 | Laughlin et al. |
| 10,472,994 B2 | 11/2019 | Avadhanula et al. |
| 10,724,805 B2 | 7/2020 | Barmeier et al. |
| 10,794,277 B2 | 10/2020 | Wagner et al. |
| 10,801,404 B2 | 10/2020 | Apte et al. |
| 10,895,409 B2 * | 1/2021 | Wagner ............... F25B 11/02 |
| 10,907,510 B2 | 2/2021 | Larochelle et al. |
| 10,907,513 B2 | 2/2021 | Laughlin |
| 10,907,548 B2 | 2/2021 | Apte et al. |
| 10,920,667 B2 | 2/2021 | Apte et al. |
| 10,934,895 B2 | 3/2021 | Held et al. |
| 11,053,847 B2 | 7/2021 | Apte et al. |
| 11,156,385 B2 | 10/2021 | Laughlin et al. |
| 11,187,112 B2 | 11/2021 | Held |
| 11,286,804 B2 | 3/2022 | Truong |
| 11,293,309 B2 | 4/2022 | Bowan |
| 11,396,826 B2 | 7/2022 | Bollinger et al. |
| 11,454,167 B1 | 9/2022 | Bollinger et al. |
| 11,454,168 B2 | 9/2022 | Apte et al. |
| 11,480,067 B2 | 10/2022 | Truong |
| 2001/0054449 A1 | 12/2001 | Jones et al. |
| 2003/0074900 A1 | 4/2003 | McFarland |
| 2003/0131623 A1 | 7/2003 | Suppes |
| 2004/0008010 A1 | 1/2004 | Ebrahim et al. |
| 2004/0042579 A1 | 3/2004 | Bolton et al. |
| 2004/0083731 A1 | 5/2004 | Lasker |
| 2004/0088980 A1 | 5/2004 | Emmel et al. |
| 2004/0099994 A1 | 5/2004 | Brinkhues |
| 2004/0105522 A1 | 6/2004 | Kriel et al. |
| 2004/0148934 A1 | 8/2004 | Pinkerton et al. |
| 2004/0221603 A1 | 11/2004 | Arik et al. |
| 2005/0056001 A1 | 3/2005 | Frutschi et al. |
| 2005/0126171 A1 | 6/2005 | Lasker |
| 2005/0235625 A1 | 10/2005 | Gericke et al. |
| 2006/0053792 A1 | 3/2006 | Bourgeois |
| 2006/0137869 A1 | 6/2006 | Steinhauser |
| 2006/0140747 A1 | 6/2006 | Vandervort et al. |
| 2006/0185626 A1 | 8/2006 | Allen et al. |
| 2006/0248886 A1 | 11/2006 | Ma |
| 2007/0220889 A1 | 9/2007 | Nayef et al. |
| 2007/0295673 A1 | 12/2007 | Enis et al. |
| 2008/0022683 A1 | 1/2008 | Ohler et al. |
| 2008/0066736 A1 | 3/2008 | Zhu |
| 2008/0121387 A1 | 5/2008 | Taniguchi et al. |
| 2008/0178601 A1 | 7/2008 | Nakhamkin |
| 2008/0272597 A1 | 11/2008 | Althaus |
| 2009/0126377 A1 | 5/2009 | Shibata et al. |
| 2009/0179429 A1 | 7/2009 | Ellis et al. |
| 2009/0293502 A1 | 12/2009 | Vandor |
| 2010/0024421 A1 | 2/2010 | Litwin et al. |
| 2010/0083660 A1 | 4/2010 | Nakhamkin |
| 2010/0175365 A1 | 7/2010 | Ota |
| 2010/0199694 A1 | 8/2010 | Taras et al. |
| 2010/0202582 A1 | 8/2010 | Shinnar et al. |
| 2010/0218500 A1 | 9/2010 | Ruer |
| 2010/0251712 A1 | 10/2010 | Nakhamkin |
| 2010/0275616 A1 | 11/2010 | Saji et al. |
| 2010/0301062 A1 | 12/2010 | Litwin et al. |
| 2010/0301614 A1 | 12/2010 | Ruer |
| 2010/0305516 A1 | 12/2010 | Xu et al. |
| 2011/0036091 A1 | 2/2011 | Waterstripe et al. |
| 2011/0100010 A1 | 5/2011 | Freund et al. |
| 2011/0100011 A1 | 5/2011 | Staffend |
| 2011/0100213 A1 | 5/2011 | Finkenrath et al. |
| 2011/0100356 A1 | 5/2011 | Bliesner |
| 2011/0100611 A1 | 5/2011 | Ohler et al. |
| 2011/0120669 A1 | 5/2011 | Hunt |
| 2011/0126539 A1 | 6/2011 | Ramaswamy et al. |
| 2011/0139407 A1 | 6/2011 | Ohler et al. |
| 2011/0146940 A1 | 6/2011 | Golbs et al. |
| 2011/0204655 A1 | 8/2011 | Waibel |
| 2011/0209496 A1 | 9/2011 | Horlyk et al. |
| 2011/0259007 A1 * | 10/2011 | Aoyama ................ F02C 1/05 |
| | | | 60/659 |
| 2011/0262269 A1 | 10/2011 | Lior |
| 2011/0277471 A1 | 11/2011 | Shinnar |
| 2011/0283700 A1 | 11/2011 | Zohar et al. |
| 2011/0289941 A1 | 12/2011 | Gonzalez Salazar et al. |
| 2011/0314839 A1 | 12/2011 | Brook et al. |
| 2012/0017622 A1 | 1/2012 | Kondo et al. |
| 2012/0039701 A1 | 2/2012 | Diddi et al. |
| 2012/0055661 A1 | 3/2012 | Feher |
| 2012/0060501 A1 | 3/2012 | Hemrle et al. |
| 2012/0080161 A1 | 4/2012 | Kelly |
| 2012/0137684 A1 | 6/2012 | Yogev et al. |
| 2012/0222423 A1 | 9/2012 | Mercangoez et al. |
| 2012/0267955 A1 | 10/2012 | Zhan et al. |
| 2012/0308364 A1 | 12/2012 | Hofmann |
| 2012/0319410 A1 | 12/2012 | Ambrosek et al. |
| 2013/0033044 A1 | 2/2013 | Wright et al. |
| 2013/0081394 A1 | 4/2013 | Perry |
| 2013/0087301 A1 | 4/2013 | Hemrle et al. |
| 2013/0105127 A1 | 5/2013 | Postma et al. |
| 2013/0118170 A1 | 5/2013 | Mierisch et al. |
| 2013/0118344 A1 | 5/2013 | Howes et al. |
| 2013/0125546 A1 | 5/2013 | Barmeier et al. |
| 2013/0147197 A1 | 6/2013 | Goebel et al. |
| 2013/0192216 A1 | 8/2013 | Berlin, Jr. et al. |
| 2013/0197704 A1 | 8/2013 | Pan et al. |
| 2013/0257056 A1 | 10/2013 | Ma |
| 2013/0266424 A1 | 10/2013 | Soehner |
| 2013/0276917 A1 | 10/2013 | Howes et al. |
| 2013/0318969 A1 | 12/2013 | Zhou et al. |
| 2013/0340432 A1 | 12/2013 | Hunt et al. |
| 2014/0008033 A1 | 1/2014 | Howes et al. |
| 2014/0014302 A1 | 1/2014 | Gutai |
| 2014/0060051 A1 | 3/2014 | Ohler et al. |
| 2014/0075970 A1 | 3/2014 | Benson |
| 2014/0103661 A1 | 4/2014 | Kacludis et al. |
| 2014/0165572 A1 | 6/2014 | Pang et al. |
| 2014/0190659 A1 | 7/2014 | Laurberg |
| 2014/0202157 A1 | 7/2014 | Shinnar et al. |
| 2014/0224447 A1 | 8/2014 | Reznik et al. |
| 2014/0224469 A1 | 8/2014 | Mirmobin et al. |
| 2014/0230401 A1 | 8/2014 | Dunn |
| 2014/0284021 A1 | 9/2014 | Laurberg et al. |
| 2014/0352295 A1 | 12/2014 | Reznik et al. |
| 2014/0352304 A1 | 12/2014 | Arias et al. |
| 2015/0026046 A1 | 1/2015 | Postrel |
| 2015/0034188 A1 | 2/2015 | Howes |
| 2015/0069758 A1 | 3/2015 | Davidson et al. |
| 2015/0084567 A1 | 3/2015 | Howes |
| 2015/0113806 A1 | 4/2015 | Couturier et al. |
| 2015/0113940 A1 | 4/2015 | Sinatov et al. |
| 2015/0114217 A1 | 4/2015 | Howes |
| 2015/0114591 A1 | 4/2015 | Howes et al. |
| 2015/0136115 A1 | 5/2015 | Bruch et al. |
| 2015/0167648 A1 | 6/2015 | Bergan |
| 2015/0211386 A1 | 7/2015 | Howes et al. |
| 2015/0267612 A1 | 9/2015 | Bannari |
| 2015/0361832 A1 | 12/2015 | Franke et al. |
| 2015/0372538 A1 | 12/2015 | Siegler et al. |
| 2016/0010512 A1 | 1/2016 | Close |
| 2016/0011617 A1 | 1/2016 | Liu et al. |
| 2016/0018134 A1 | 1/2016 | Ueda et al. |

(56) References Cited

U.S. PATENT DOCUMENTS

| | | | |
|---|---|---|---|
| 2016/0030856 A1 | 2/2016 | Kaplan et al. | |
| 2016/0032783 A1 | 2/2016 | Howes et al. | |
| 2016/0047361 A1 | 2/2016 | Al-Sulaiman | |
| 2016/0222830 A1 | 8/2016 | Aga et al. | |
| 2016/0248299 A1 | 8/2016 | Ouvry | |
| 2016/0290281 A1 | 10/2016 | Schmalz | |
| 2016/0298498 A1 | 10/2016 | Kreuger | |
| 2017/0081980 A1 | 3/2017 | Davidson et al. | |
| 2017/0159496 A1 | 6/2017 | Laughlin et al. | |
| 2017/0159497 A1 | 6/2017 | Laughlin et al. | |
| 2017/0159498 A1 | 6/2017 | Laughlin et al. | |
| 2017/0159500 A1 | 6/2017 | Laughlin et al. | |
| 2017/0254229 A1 | 9/2017 | Fletcher | |
| 2017/0292450 A1* | 10/2017 | Kutnjak | F02C 3/34 |
| 2017/0314420 A1 | 11/2017 | Bowan et al. | |
| 2018/0142577 A1 | 5/2018 | Ortmann et al. | |
| 2018/0179917 A1 | 6/2018 | Apte et al. | |
| 2018/0180363 A1 | 6/2018 | Apte et al. | |
| 2018/0185942 A1 | 7/2018 | Apte et al. | |
| 2018/0187572 A1 | 7/2018 | Apte | |
| 2018/0245485 A1 | 8/2018 | Conlon | |
| 2018/0340712 A1 | 11/2018 | Peter et al. | |
| 2019/0030593 A1 | 1/2019 | Merrill et al. | |
| 2019/0093556 A1 | 3/2019 | Wagner et al. | |
| 2019/0162482 A1 | 5/2019 | Kerth | |
| 2019/0195131 A1 | 6/2019 | Zia et al. | |
| 2019/0195571 A1 | 6/2019 | Laughlin et al. | |
| 2019/0212070 A1 | 7/2019 | Laughlin et al. | |
| 2019/0277196 A1 | 9/2019 | Ortmann et al. | |
| 2020/0248592 A1* | 8/2020 | Lehar | F01K 3/12 |
| 2021/0180522 A1 | 6/2021 | Apte et al. | |
| 2023/0073676 A1* | 3/2023 | Apte | F02C 6/00 |

FOREIGN PATENT DOCUMENTS

| | | | | |
|---|---|---|---|---|
| CA | 2952379 | C | 4/2019 | |
| CA | 2923403 | C | 8/2022 | |
| CN | 1359447 | A | 7/2002 | |
| CN | 1847626 | A | 10/2006 | |
| CN | 101169067 | A | 4/2008 | |
| CN | 101720380 | A | 6/2010 | |
| CN | 102374026 | A | 3/2012 | |
| CN | 203532124 | U | 4/2014 | |
| CN | 104297072 | A | 1/2015 | |
| CN | 204572095 | U | 8/2015 | |
| CN | 104884768 | A | 9/2015 | |
| CN | 104903551 | A | 9/2015 | |
| CN | 104956059 | A | 9/2015 | |
| CN | 106224040 | A | 12/2016 | |
| CN | 106224041 | A | 12/2016 | |
| CN | 207513700 | U | 6/2018 | |
| DE | 2904232 | A1 | 12/1980 | |
| DE | 2928691 | A1 | 2/1981 | |
| DE | 3118101 | A1 | 2/1983 | |
| DE | 202013004654 | U1 | 8/2014 | |
| DE | 102013006814 | A1 | 10/2014 | |
| DE | 102014117659 | A1 | 9/2016 | |
| EP | 0003980 | A1 | 9/1979 | |
| EP | 1577548 | A1 | 9/2005 | |
| EP | 1857614 | A2 | 11/2007 | |
| EP | 2241737 | A1 | 10/2010 | |
| EP | 2275649 | A1 | 1/2011 | |
| EP | 2312129 | A1 | 4/2011 | |
| EP | 2390473 | A1 | 11/2011 | |
| EP | 2400120 | A1 | 12/2011 | |
| EP | 2441925 | A1 | 4/2012 | |
| EP | 2441926 | A1 | 4/2012 | |
| EP | 2530283 | A1 | 12/2012 | |
| EP | 2532843 | A1 | 12/2012 | |
| EP | 2574740 | A1 | 4/2013 | |
| EP | 2602443 | A1 | 6/2013 | |
| EP | 2778406 | A1 | 9/2014 | |
| EP | 2940406 | A1 | 11/2015 | |
| EP | 2446122 | B1 | 8/2017 | |
| EP | 2905432 | B1 | 4/2018 | |
| EP | 3563050 | A2 | 11/2019 | |
| GB | 2501685 | A | 11/2013 | |
| GB | 2501795 | A | 11/2013 | |
| GB | 2528757 | A | 2/2016 | |
| JP | S62110499 | A | 5/1987 | |
| JP | H03286103 | A | 12/1991 | |
| JP | H0868341 | A | 3/1996 | |
| JP | H0893633 | A | 4/1996 | |
| JP | 2000154733 | A | 6/2000 | |
| JP | 2011106755 | A | 6/2011 | |
| KR | 20040045337 | A | 6/2004 | |
| KR | 20120042921 | A | 5/2012 | |
| KR | 101370843 | B1 | 3/2014 | |
| KR | 20150089110 | A | 8/2015 | |
| RU | 2012104762 | A | 8/2013 | |
| WO | WO-02080190 | A1 * | 10/2002 | F02C 1/05 |
| WO | WO-2005019756 | A2 | 3/2005 | |
| WO | WO-2010024691 | A2 | 3/2010 | |
| WO | WO-2011099891 | A1 | 8/2011 | |
| WO | WO-2011161094 | A2 | 12/2011 | |
| WO | WO-2012176258 | A1 | 12/2012 | |
| WO | WO-2013037658 | A1 | 3/2013 | |
| WO | WO-2013045388 | A1 | 4/2013 | |
| WO | WO-2013094905 | A1 | 6/2013 | |
| WO | WO-2013119145 | A2 | 8/2013 | |
| WO | WO-2013164563 | A1 | 11/2013 | |
| WO | WO-2013164653 | A1 | 11/2013 | |
| WO | WO-2014027093 | A1 | 2/2014 | |
| WO | WO-2014052098 | A1 | 4/2014 | |
| WO | WO-2014052927 | A1 | 4/2014 | |
| WO | WO-2014114531 | A1 | 7/2014 | |
| WO | WO-2014191157 | A2 | 12/2014 | |
| WO | WO-2015019096 | A1 | 2/2015 | |
| WO | WO-2015185891 | A1 | 12/2015 | |
| WO | WO-2016000016 | A1 | 1/2016 | |
| WO | WO-2018001931 | A1 | 1/2018 | |
| WO | WO-2018125511 | A2 | 7/2018 | |
| WO | WO-2018125535 | A1 | 7/2018 | |
| WO | WO-2019034536 | A1 | 2/2019 | |
| WO | WO-2020131194 | A1 | 6/2020 | |
| WO | WO-2021097413 | A1 | 5/2021 | |
| WO | WO-2021158641 | A1 | 8/2021 | |

OTHER PUBLICATIONS

Al-Attab et al., "Externally Fired Gas Turbine Technology: A Review," Applied Energy, 2015, pp. 474-487, vol. 138.

Anheden, M., "Economic Evaluation of Externally Fired Gas Turbine Cycles for Small-Scale Biomass Cogeneration," Technical Report, Jan. 2001, 112 pages.

Bammert et al., "Layout and Present Status of the Closed-Cycle Helium Turbine Plant Oberhausen," ASME 1974 International Gas Turbine Conference and Products Show, 1974, 9 pages.

Bammert et al., "Operation and Control of the 50-Mw Closed-Cycle Helium Turbine Oberhausen," ASME 1974 International Gas Turbine Conference and Products Show, Mar. 1974, 8 pages.

Bammert et al., "Status Report on Closed-Cycle Power Plants in the Federal Republic of Germany," Journal of Engineering for Power, Jan. 1977, pp. 37-46, vol. 99, No. 1.

Bammert et al., "Twenty-Five Years of Operating Experience With the Coal-Fired, Closed-Cycle Gas Turbine Cogeneration Plant at Coburg," Journal of Engineering for Power, Oct. 1983, 10 pages, vol. 105.

Baofix, Historical Review of Closed Cycle Gas Turbine (CCGT) Power Plants, Malta, 20 Pages.

Bardia, Alexander, "Dynamics and Control Modeling of the Closed-cycle Gas Turbine (GT-HTGR) Power Plant," Fourth Power Plant Dynamics, Control and Testing Symposium, General Atomic Company, Feb. 1980, 35 pages.

Bauer et al., "Sodium Nitrate for High Temperature Latent Heat Storage," The 11th International Conference on Thermal Energy Storage-Effstock, Jun. 2009, 8 pages.

Böke, Erhan, "Comparison of Thermal Efficiency of the Closed-Cycle Gas Turbine with and without Regeneration," The Second Scientific Technical Seminar on Gas Turbine Engine, Nov. 1996, 9 pages.

(56) References Cited

OTHER PUBLICATIONS

Boyce, Meherwan P., "7—Axial-Flow Compressors," Gas Turbine Engineering Handbook (Fourth Edition), 2012, pp. 303-355.
Boyce, Meherwan P., "Axial-Flow compressors", 2003 (date estimated), Internet, 33 pages.
Bradshaw et al., "Molten Nitrate Salt Development for Thermal Energy Storage in Parabolic Trough Solar Power Systems," ASME 2008 2nd International Conference on Energy Sustainability, ES2008-54174, 2008, pp. 631-637, vol. 2.
Chinese Patent Application No. 201780086973.3, Office Action dated Dec. 17, 2021—English Translation Available.
Coco-Enriquez et al., "New Text Comparison Between Co2 and Other Supercritical Working Fluids (Ethane, Xe, Ch4 And N2) in Line-Focusing Solar Power Plants Coupled To Supercritical Brayton Power Cycles," International Journal of Hydrogen Energy, Mar. 2017, vol. 42 (28), pp. 17611-17631.
Crotogino et al., "Huntorf CAES: More than 20 Years of Successful Operation," Spring Meeting, Apr. 2001, 7 pages.
Desrues et al., "A Thermal Energy Storage Process for Large Scale Electric Applications," Applied Thermal Engineering, Apr. 2010, pp. 425-432, vol. 30, No. 5.
Deuster et al., "Long-Time Operating Experiences with Oberhausen Closed-Cycle Gas-Turbine Plant," ASME 1970 International Gas Turbine Conference and Products Show, Jan. 1970, 15 pages.
Dewing Ernest W., "Heat Capacities of Liquid Sodium and Potassium Nitrates," Journal of Chemical and Engineering, 1975, pp. 221-223, vol. 20, No. 3.
Diguilio, R.M. et al., "The Thermal Conductivity of the Molten NaN03-KN03 Eutectic Between 525 and 590 K," International Journal of Thermophysics, Jul. 1992, pp. 575-592, vol. 13, No. 4.
Eisenberg, B., "Development of a New Front Stage for an Industrial Axial Flow Compressor," The American Society of Mechanical Engineers, Feb. 2015, 9 pages, Paper No. 93-GT-327.
European Patent Application No. 17885998.9, Extended European Search Report dated Jul. 13, 2020.
European Patent Application No. 17886005.2, Extended European Search Report dated Jul. 22, 2020.
European Patent Application No. 17886168.8, Extended European Search Report dated Oct. 19, 2020.
European Patent Application No. 17886168.8, Partial Supplementary European Search Report dated Jul. 15, 2020.
European Patent Application No. 17886274.4, Extended European Search Report dated Oct. 19, 2020.
European Patent Application No. 17886274.4, Partial Supplementary European Search Report dated Jul. 15, 2020.
European Patent Application No. 17887008.5, Extended European Search Report dated Jul. 20, 2020.
European Patent Application No. 17887541.5, Extended European Search Report dated Feb. 3, 2021.
Farres-Antunez et al., "A Pumped Thermal Energy Storage Cycle With Capacity for Concentrated Solar Power Integration," Offshore Energy and Storage Summit (OSES) IEEE, Jul. 2019, pp. 1-10.
Final Office Action dated Jun. 12, 2019 for U.S. Appl. No. 15/392,927, filed Dec. 28, 2016, 42 pages.
Final Office Action dated Jun. 25, 2020, for U.S. Appl. No. 16/289,017, filed Feb. 28, 2019, 22 pages.
Final Office Action dated Jun. 25, 2020, for U.S. Appl. No. 16/354,824, filed Mar. 15, 2019, 21 pages.
Final Office Action dated Apr. 28, 2020 for U.S. Appl. No. 15/392,542, filed Dec. 28, 2016, 27 pages.
Final Office Action dated Aug. 1, 2017, for U.S. Appl. No. 13/965,048, filed Aug. 12, 2013, 16 pages.
Final Office Action dated Apr. 2, 2019, for U.S. Appl. No. 15/440,312, filed Feb. 23, 2017, 13 pages.
Final Office Action dated Jun. 6, 2018 for U.S. Appl. No. 15/396,461, filed Dec. 31, 2016, 10 pages.
Final Office Action dated Nov. 6, 2015, for U.S. Appl. No. 12/932,775, filed Mar. 4, 2011, 15 pages.
Final Office Action dated Apr. 8, 2020 for U.S. Appl. No. 15/395,622, filed Dec. 30, 2016, 26 pages.
Final Office Action dated Jan. 9, 2014 for U.S. Appl. No. 12/932,775, filed Mar. 4, 2011, 11 pages.
Final Office Action dated Jan. 10, 2022 for U.S. Appl. No. 16/779,975, filed Mar. 2, 2020, 24 pages.
Final Office Action dated Apr. 12, 2022 for U.S. Appl. No. 17/092,806, filed Nov. 9, 2020, 16 pages.
Final Office Action dated Feb. 19, 2019 for U.S. Appl. No. 15/440,289, filed Feb. 23, 2017, 10 pages.
Final Office Action dated Feb. 21, 2019 for U.S. Appl. No. 15/440,297, filed Feb. 23, 2017, 11 pages.
Final Office Action dated Aug. 22, 2016, for U.S. Appl. No. 13/965,048, filed Aug. 12, 2013, 13 pages.
Final Office Action dated Jan. 24, 2022 for U.S. Appl. No. 17/164,295, filed Feb. 1, 2021, 7 pages.
Final Office Action dated Jul. 25, 2017 for U.S. Appl. No. 12/932,775, filed Mar. 4, 2011, 19 pages.
Final Office Action dated Sep. 25, 2017, for U.S. Appl. No. 14/668,610, filed Mar. 25, 2015, 28 pages.
Fraas et al., "Summary of Research and Development Effort on Closed-cycle Gas Turbines," Engineering Technology Division, Jun. 1981, 39 pages.
Früchtel et al., "Development of the GT36 Sequential Combustor," Ansaldo Energio, 2017, 18 pages.
Freeman, Eli S., "The Kinetics of the Thermal Decomposition of Sodium Nitrate and of the Reaction Between Sodium Nitrate and Oxygen," The Journal of Physical Chemistry, Nov. 1956, pp. 1487-1493, vol. 60, No. 11.
Frutschi, Hans Ulrich, "Closed-Cycle Gas Turbines," New York, ASME, 2005, Jan. 29, 2016, 293 pages. Retrieved from the internet: [URL:http://ebooks.asmedigitalcollection.asme.org/books.aspx].
Gamannossi et al., "Analysis of the GT26 Single Shaft Gas Turbine Performance and Emissions," Energy Procedia, Sep. 2017, pp. 461-468, vol. 126.
Hansen, Curt, "Land Based Gas Turbines for Power Production," ASEN 5063, Dec. 2009, 18 pages.
Ho et al., "Cost and Performance Tradeoffs of Alternative Solar Driven S-C02 Brayton Cycle Configuration," Proceedings of the ASME 2015 Power and Energy Conversion Conference, Jul. 2015, 10 pages.
International Preliminary Report on Patentability for Application No. PCT/US2013/062469, dated Mar. 31, 2015, 9 pages.
International Search Report and Written Opinion of PCT Application No. PCT/US2013/062469, dated Jan. 2, 2014, 11 pages.
International Search Report and Written Opinion of PCT Application No. PCT/US2017/062117, dated Feb. 22, 2018, 17 pages.
International Search Report and Written Opinion of PCT Application No. PCT/US2017/063289, dated Apr. 16, 2018, 17 pages.
International Search Report and Written Opinion of PCT Application No. PCT/US2017/063519, dated Apr. 12, 2018, 16 pages.
International Search Report and Written Opinion of PCT Application No. PCT/US2017/063521, dated Mar. 12, 2018, 18 pages.
International Search Report and Written Opinion of PCT Application No. PCT/US2017/064074, dated Feb. 26, 2018, 13 pages.
International Search Report and Written Opinion of PCT Application No. PCT/US2017/064076, dated Jul. 30, 2018, 15 pages.
International Search Report and Written Opinion of PCT Application No. PCT/US2017/064839, dated Mar. 20, 2018, 13 pages.
International Search Report and Written Opinion of PCT Application No. PCT/US2017/065200, dated Mar. 26, 2018, 15 pages.
International Search Report and Written Opinion of PCT Application No. PCT/US2017/065201, dated Mar. 27, 2018, 13 pages.
International Search Report and Written Opinion of PCT Application No. PCT/US2017/065643, dated Mar. 29, 2018, 17 pages.
International Search Report and Written Opinion of PCT Application No. PCT/US2017/065645, dated Mar. 26, 2018, 16 pages.
International Search Report and Written Opinion of PCT Application No. PCT/US2017/067049, dated Mar. 29, 2018, 16 pages.
International Search Report and Written Opinion of PCT Application No. PCT/US2020/060700, dated Mar. 29, 2021, 18 pages.
International Search Report and Written Opinion of PCT Application No. PCT/US2021/016382, dated Apr. 13, 2021, 49 pages.
International Search Report and Written Opinion of PCT Application No. PCT/US2021/016384, dated Apr. 12, 2021, 17 pages.

(56) References Cited

OTHER PUBLICATIONS

International Search Report and Written Opinion of PCT Application No. PCT/US2021/045640, dated Dec. 23, 2021 99 pages.
International Search Report and Written Opinion of PCT Application No. PCT/US2021/045642, dated Dec. 23, 2021 121 pages.
International Search Report and Written Opinion of PCT Application No. PCT/US2021/045654, dated Dec. 14, 2021, 219 pages.
International Search Report and Written Opinion of PCT Application No. PCT/US2021/045655, dated Dec. 13, 2021 129 pages.
International Search Report and Written Opinion of PCT Application No. PCT/US2021/045659, dated Nov. 5, 2021, 161 pages.
International Search Report and Written Opinion of PCT Application No. PCT/US2021/045738, dated Dec. 13, 2021 232 pages.
International Search Report and Written Opinion of PCT Application No. PCT/US2021/045746, dated Dec. 13, 2021 127 pages.
International Search Report and Written Opinion of PCT Application No. PCT/US2021/045759, dated Dec. 21, 2021, 14 pages.
International Search Report and Written Opinion of PCT Application No. PCT/US2021/045778, dated Dec. 20, 2021 48 pages.
Isentropic, "A New Era in Electrical Energy Storage and Recovery," 2014, 2 pages. Retrieved from the internet: [URL:http://www.isenlropic.co.uk/our-phesechnology].
John, "Stem and CPower to Combine Behind-the-Meter Batteries and Demand Response," Energy Storage, Aug. 8, 2017, 1 page.
Jose et al., "A Novel Supercritical C02 Recompression Brayton Power Cycle for Power Tower Concentrating Solar Plants," Applied Energy, Feb. 2020, vol. 263, pp. 22.
Keller et al., "Industrial Closed-Cycle Gas Turbines for Conventional and Nuclear Fuel," ASME 1967 Gas Turbine Conference and Products Show, 1967, 14 pages.
Keller et al., "Operating Experience and Design Features of Closed Cycle Gas Turbine Power Plants," The American Society of Mechanical Engineers (ASME) 1956 Gas Turbine Power Conference, Apr. 1956, 52 pages.
Keller et al., "The Aerodynamic Turbine in the Iron and Steel Works," Swiss Construction Newspaper, 1943, 7 pages, vol. 121/122.
Keller et al., "The Coal-Burning Closed-Cycle Gas Turbine," ASME 1961 Gas Turbine Power Conference and Exhibit, 1961, 7 pages.
Keller, Curt, "Forty Years of Experience on Closed-Cycle Gas Turbines," Annals of Molecular Biology, Jun. 1978, pp. 405-422, vol. 5.
Kuo et al., "Closed Cycle Gas Turbine Systems in Europe," United Technology Research Center, Office of Naval Research, Mar. 1977, 24 pages.
Kuo et al., "The Prospects for Solar-Powered Closed-Cycle Gas Turbines," The American Society of Mechanical Engineers, Mar. 1980, 9 pages.
Kupiec, Hailey, "Chamfer or Fillet: It's More than a Coin Toss," 2016, Engineering.com, 3 pages, Retrieved from the internet: URL:https://www.engineering.com/AdvancedManufacturing/ArticleID/12682/Chamfer-or-Fillet-Its-More-Than-a-Coin-Toss.aspx.
La Fleur et al., "The Closed-Cycle Gas Turbine and Cryogenics: A New Application," ASME 1965 Gas Turbine Conference and Products Show, 1965, 5 pages.
La Fleur, James K., "Description of an Operating Closed Cycle—Helium Gas Turbine," The American Society of Mechanical Engineers, 1963, 8 pages, Paper No. 63-AGHT-74.
Laughlin et al., U.S. Appl. No. 61/706,337, filed Sep. 27, 2012, 34 pages.
Laughlin et al., U.S. Appl. No. 61/868,070, filed Aug. 20, 2013, 45 pages.
Laughlin, R.B., "Here Comes the Sun," Stanford Physics Department Colloquium, Jan. 2010, 23 pages.
Laughlin R.B., U.S. Appl. No. 61/339,577, filed Mar. 4, 2010, 18 pages.
MacNaghten, James, "Commercial Potential of Different Large Scale Thermal Storage Technologies Under Development Globally," Isentropic LTD, Jun. 2016, 21 pages.
Man Turbo, Engineering the Future, Since 1758, Apr. 2009, 40 pages.
McDonald et al., "Helium and Combustion Gas Turbine Power Conversion Systems Comparison," ASME 1995 International Gas Turbine and Aeroengine Congress and Exposition, Jun. 1995, 12 pages.
McDonald et al., "Helium Turbomachinery Operating Experience From Gas Turbine Power Plants and Test Facilities," Applied Thermal Engineering, 2012, pp. 108-142, vol. 44.
McDonald et al., "Closed-Cycle Gas Turbine Applications for Fusion Reactors," The American Society of Mechanical Engineers, Dec. 1981, pp. 1-18, vol. 13, No. 1.
Morimoto et al., "The 2000kw Gas Turbine Plant," Mechanical Div., Engineering Department, 1956, pp. 63-68, vol. 2, No. 3.
Morimoto et al., "The First Closed-Cycle Gas Turbine Power Plant In Japan," Thermal Machine Div., Design Dep't., 1958, pp. 57-64, vol. 4, No. 3.
Morimoto, Takaoki, "12.000 KW Gas Turbine Power Generating Unit for Steel Works," Fuji Denki Review, 1960, pp. 93-101, vol. 8, No. 4.
Non-Final Office Action dated Nov. 13, 2019, for U.S. Appl. No. 15/392,542, filed Dec. 28, 2016, 13 pages.
Non-Final Office Action dated Jun. 9, 2020 for U.S. Appl. No. 15/392,542, filed Dec. 28, 2016, 17 pages.
Non-Final Office Action dated Jun. 3, 2022 on for U.S. Appl. No. 17/365,341, filed Jul. 1, 2021, 12 pages.
Non-Final Office Action dated Nov. 3, 2021 on for U.S. Appl. No. 17/092,806, filed Nov. 9, 2020, 12 pages.
Non-Final Office Action dated Sep. 9, 2021 on for U.S. Appl. No. 17/164,295, filed Feb. 1, 2021, 7 pages.
Non-Final Office Action dated Jan. 11, 2022 for U.S. Appl. No. 17/164,302, filed Feb. 1, 2021, 8 pages.
Non-Final Office Action dated Sep. 13, 2021 on for U.S. Appl. No. 16/991,802, filed Aug. 12, 2020, 61 pages.
Non-Final Office Action dated May 19, 2022 on for U.S. Appl. No. 17/400,706, filed Aug. 12, 2021, 16 pages.
Non-Final Office Action dated May 20, 2022 on for U.S. Appl. No. 17/400,953, filed Aug. 12, 2021, 18 pages.
Non-Final Office Action dated Oct. 22, 2021 on for U.S. Appl. No. 17/174,490, filed Feb. 12, 2021, 10 pages.
Non-Final Office Action dated Aug. 23, 2021 on for U.S. Appl. No. 16/991,813, filed Aug. 12, 2020, 65 pages.
Non-Final Office Action dated Jun. 29, 2021 on for U.S. Appl. No. 16/779,975, filed Feb. 3, 2020, 14 pages.
Non-Final Office Action dated Aug. 31, 2021 on for U.S. Appl. No. 16/991,790, filed Aug. 12, 2020, 62 pages.
Non-Final Office Action dated Apr. 1, 2019 for U.S. Appl. No. 15/393,891, filed Dec. 29, 2016, 13 pages.
Non-Final Office Action dated Nov. 1, 2018, for U.S. Appl. No. 15/440,297, filed Feb. 23, 2017, 11 pages.
Non-Final Office Action dated Nov. 3, 2016, for U.S. Appl. No. 12/932,775, filed Mar. 4, 2011, 17 pages.
Non-Final Office Action dated Dec. 4, 2015, for U.S. Appl. No. 13/965,048, filed Aug. 12, 2013, 11 pages.
Non-Final Office Action dated May 4, 2020, for U.S. Appl. No. 16/289,017, filed Feb. 28, 2019, 84 pages.
Non-Final Office Action dated May 4, 2020, for U.S. Appl. No. 16/354,824, filed Mar. 15, 2019, 83 pages.
Non-Final Office Action dated Aug. 5, 2021 for U.S. Appl. No. 17/069,496, filed Oct. 13, 2020, 15 pages.
Non-Final Office Action dated Feb. 5, 2020, for U.S. Appl. No. 16/111,151, filed Aug. 23, 2018, 9 pages.
Non-Final Office Action dated Feb. 8, 2018, for U.S. Appl. No. 15/396,461, filed Dec. 31, 2016, 09 pages.
Non-Final Office Action dated Nov. 8, 2018, for U.S. Appl. No. 15/440,300, filed Feb. 23, 2017, 26 pages.
Non-Final Office Action dated Jan. 9, 2019, for U.S. Appl. No. 15/396,461, filed Dec. 31, 2016, 13 pages.
Non-Final Office Action dated Jan. 11, 2019, for U.S. Appl. No. 15/440,312, filed Feb. 23, 2017, 14 pages.
Non-Final Office Action dated Apr. 13, 2020, for U.S. Appl. No. 16/260,859, filed Jan. 29, 2019, 72 pages.

(56) References Cited

OTHER PUBLICATIONS

Non-Final Office Action dated Apr. 13, 2020, for U.S. Appl. No. 16/260,932, filed Jan. 29, 2019, 71 pages.
Non-Final Office Action dated Feb. 13, 2018, for U.S. Appl. No. 14/668,610, filed Mar. 25, 2015, 13 pages.
Non-Final Office Action dated May 14, 2018, for U.S. Appl. No. 15/392,653, filed Dec. 28, 2016, 26 pages.
Non-Final Office Action dated May 14, 2018, for U.S. Appl. No. 15/392,657, filed Dec. 28, 2016, 27 pages.
Non-Final Office Action dated Jan. 15, 2019, for U.S. Appl. No. 15/440,295, filed Feb. 23, 2017, 22 pages.
Non-Final Office Action dated Nov. 15, 2018, for U.S. Appl. No. 15/440,306, filed Feb. 23, 2017, 13 pages.
Non-Final Office Action dated Oct. 17, 2019, for U.S. Appl. No. 15/395,622, filed Dec. 30, 2016, 14 pages.
Non-Final Office Action dated Mar. 23, 2017 for U.S. Appl. No. 13/965,048, filed Aug. 12, 2013, 20 pages.
Non-Final Office Action dated May 25, 2018, for U.S. Appl. No. 15/393,874, filed Dec. 29, 2016.
Non-Final Office Action dated Feb. 26, 2015, for U.S. Appl. No. 12/932,775, filed Mar. 4, 2011, 14 pages.
Non-Final Office Action dated Mar. 26, 2019 for U.S. Appl. No. 15/392,523, filed Dec. 28, 2016, 9 pages.
Non-Final Office Action dated Jan. 28, 2021, for U.S. Appl. No. 16/289,017, filed Feb. 28, 2019, 16 pages.
Non-Final Office Action dated Jun. 28, 2018, for U.S. Appl. No. 15/392,927, filed Dec. 28, 2016, 11 pages.
Non-Final Office Action dated Mar. 28, 2013, for U.S. Appl. No. 12/932,775, filed Mar. 4, 2011, 12 pages.
Non-Final Office Action dated Jan. 31, 2017, for U.S. Appl. No. 14/668,610, filed Mar. 25, 2015, 38 pages.
Non-Final Office Action dated Oct. 31, 2018, for U.S. Appl. No. 15/440,289, filed Feb. 23, 2017, 25 pages.
Non-Final Office Action dated Oct. 12, 2021 for U.S. Appl. No. 17/174,493, filed Feb. 12, 2021, 10 pages.
Notice of Allowance dated Jun. 1, 2020, for U.S. Appl. No. 16/111,151, filed Aug. 23, 2018, 14 pages.
Notice of Allowance dated Jun. 10, 2020 for U.S. Appl. No. 15/395,622, filed Dec. 30, 2016, 17 pages.
Notice of Allowance dated Apr. 29, 2020, for U.S. Appl. No. 16/111,151, filed Aug. 23, 2018, 17 pages.
Notice of Allowance dated Oct. 15, 2020 on for U.S. Appl. No. 16/260,932, filed Jan. 29, 2019, 7 pages.
Notice of Allowance dated Jun. 15, 2020 for U.S. Appl. No. 16/260,859, filed Jan. 29, 2019, 11 pages.
Notice of Allowance dated Jun. 22, 2020, for U.S. Appl. No. 16/260,932, filed Jan. 29, 2019, 10 pages.
Notice of Allowance dated Jun. 2, 2022 on for U.S. Appl. No. 16/991,859, filed Aug. 12, 2020, 10 pages.
Notice of Allowance dated May 5, 2021 on for U.S. Appl. No. 16/289,017, filed Feb. 28, 2019, 8 pages.
Notice of Allowance dated May 10, 2022 on for U.S. Appl. No. 17/174,493, filed Feb. 12, 2021, 7 pages.
Notice of Allowance dated May 19, 2022 for U.S. Appl. No. 16/991,802, filed Aug. 12, 2020, 7 pages.
Notice of Allowance dated Dec. 24, 2020 on for U.S. Appl. No. 16/576,329, filed Sep. 19, 2019, 11 pages.
Notice of Allowance dated Jul. 1, 2019 for U.S. Appl. No. 15/440,312, filed Feb. 23, 2017, 19 pages.
Notice of Allowance dated Mar. 2, 2022, for U.S. Appl. No. 17/174,490, filed Feb. 12, 2021, 9 pages.
Notice of Allowance dated Jun. 3, 2019 for U.S. Appl. No. 15/440,289, filed Feb. 23, 2017, 23 pages.
Notice of Allowance dated Jun. 3, 2019 for U.S. Appl. No. 15/440,295, filed Feb. 23, 2017, 14 pages.
Notice of Allowance dated Mar. 4, 2021 for U.S. Appl. No. 15/392,542, filed Dec. 28, 2016, 09 pages.
Notice of Allowance dated Aug. 5, 2020 for U.S. Appl. No. 15/395,622, filed Dec. 30, 2016, 4 pages.
Notice of Allowance dated Jun. 5, 2018, for U.S. Appl. No. 15/392,571, filed Dec. 28, 2016, 11 pages.
Notice of Allowance dated Sep. 6, 2019 for U.S. Appl. No. 15/440,300, filed Feb. 23, 2017, 20 pages.
Notice of Allowance dated Oct. 7, 2020 for U.S. Appl. No. 16/260,859, filed Jan. 29, 2019, 7 pages.
Notice of Allowance dated Apr. 8, 2019 for U.S. Appl. No. 15/440,297, filed Feb. 23, 2017, 5 pages.
Notice of Allowance dated Jul. 8, 2019, for U.S. Appl. No. 15/440,297, filed Feb. 23, 2017, 5 pages.
Notice of Allowance dated Apr. 9, 2019, for U.S. Appl. No. 15/440,306, filed Feb. 23, 2017, 2 pages.
Notice of Allowance dated Feb. 9, 2022, for U.S. Appl. No. 16/991,802, filed Aug. 12, 2020, 2 pages.
Notice of Allowance dated Nov. 10, 2021, for U.S. Appl. No. 16/991,805, filed Aug. 12, 2020, 65 pages.
Notice of Allowance dated Apr. 11, 2019 for U.S. Appl. No. 15/396,461, filed Dec. 31, 2016, 7 pages.
Notice of Allowance dated Feb. 11, 2022, for U.S. Appl. No. 17/069,496, filed Oct. 13, 2020, 8 pages.
Notice of Allowance dated Mar. 11, 2019 for U.S. Appl. No. 15/440,306, filed Feb. 23, 2017, 8 pages.
Notice of Allowance dated Sep. 11, 2019 for U.S. Appl. No. 15/396,461, filed Dec. 31, 2016, 8 pages.
Notice of Allowance dated Sep. 11, 2020 for U.S. Appl. No. 16/260,929, filed Jan. 29, 2019, 10 pages.
Notice of Allowance dated Jun. 15, 2018, for U.S. Appl. No. 15/395,040, filed Dec. 30, 2016, 12 pages.
Notice of Allowance dated Apr. 17, 2019 for U.S. Appl. No. 15/440,295, filed Feb. 23, 2017, 5 pages.
Notice of Allowance dated Feb. 19, 2019 for U.S. Appl. No. 15/440,300, filed Feb. 23, 2017, 8 pages.
Notice of Allowance dated May 19, 2020 for U.S. Appl. No. 16/260,929, filed Jan. 29, 2019, 80 pages.
Notice of Allowance dated Oct. 19, 2018 for U.S. Appl. No. 15/392,653, filed Dec. 28, 2016, 5 pages.
Notice of Allowance dated May 21, 2018 for U.S. Appl. No. 14/668,610, filed Mar. 25, 2015, 2 pages.
Notice of Allowance dated Feb. 22, 2022, for U.S. Appl. No. 16/991,813, filed Aug. 12, 2020, 9 pages.
Notice of Allowance dated Jan. 22, 2019 for U.S. Appl. No. 15/440,308, filed Feb. 23, 2017, 8 pages.
Notice of Allowance dated Jul. 22, 2019 for U.S. Appl. No. 15/392,927, filed Dec. 28, 2016, 8 pages.
Notice of Allowance dated Mar. 22, 2022, for U.S. Appl. No. 16/991,790, filed Aug. 12, 2020, 7 pages.
Notice of Allowance dated Nov. 22, 2021, for U.S. Appl. No. 16/991,859, filed Aug. 12, 2020, 58 pages.
Notice of Allowance dated Sep. 23, 2020 for U.S. Appl. No. 16/260,929, filed Jan. 29, 2019, 5 pages.
Notice of Allowance dated Jul. 24, 2020 for U.S. Appl. No. 16/576,357, filed Sep. 19, 2019, 9 pages.
Notice of Allowance dated Sep. 25, 2020 for U.S. Appl. No. 16/111,151, filed Aug. 23, 2018, 9 pages.
Notice of Allowance dated Apr. 26, 2018, for U.S. Appl. No. 14/668,610, filed Mar. 25, 2015, 12 pages.
Notice of Allowance dated Jan. 26, 2022, for U.S. Appl. No. 16/991,859, filed Aug. 12, 2020, 62 pages.
Notice of Allowance dated Dec. 28, 2017, for U.S. Appl. No. 13/965,048, filed Aug. 12, 2013, 9 pages.
Notice of Allowance dated Jun. 28, 2019 for U.S. Appl. No. 15/440,306, filed Feb. 23, 2017, 5 pages.
Notice of Allowance dated Jun. 28, 2021 for U.S. Appl. No. 16/289,017, filed Feb. 28, 2019, 5 pages.
Notice of Allowance dated May 28, 2019 for U.S. Appl. No. 15/440,300, filed Feb. 23, 2017, 8 pages.
Notice of Allowance dated Apr. 29, 2019 for U.S. Appl. No. 15/440,289, filed Feb. 23, 2017, 5 pages.
Notice of Allowance dated May 30, 2018 for U.S. Appl. No. 14/668,610, filed Mar. 25, 2015, 1 pages.
Notice of Allowance dated Dec. 31, 2018 for U.S. Appl. No. 15/393,874, filed Dec. 29, 2016, 5 pages.

(56) References Cited

OTHER PUBLICATIONS

Notice of Allowance dated Jan. 31, 2022, for U.S. Appl. No. 16/991,802, filed Aug. 12, 2020, 25 pages.
Notice of Allowance dated May 31, 2018 for U.S. Appl. No. 12/932,775, filed Mar. 4, 2011, 10 pages.
Notice of Allowance dated Sep. 3, 2019, for U.S. Appl. No. 15/396,461, filed Dec. 31, 2016, 7 pages.
Nunes et al., "Viscosity of Molten Sodium Nitrate," International Journal of Thermophysics, Nov. 2006, pp. 1638-1649, vol. 27, No. 6.
Olumayegun et al., "Closed-Cycle Gas Turbine for Power Generation: A State-of-the-Art Review," Fuel, Sep. 2016, pp. 694-717, vol. 180.
Parsons., "Cost Estimates for Thermal Peaking Power Plant," Parsons Brinckerhoff New Zealand Ltd, 2008, Version 2, 26 pages.
Pasch et al., "Supercritical Carbon Dioxide Closed Brayton Cycle: Development and Applications," Sandia National Laboratories, Albuquerque, NM (United States), 2014, 16 pages.
Pathirathna, K.A.B., "Gas Turbine Thermodynamic and Performance Analysis Methods Using Available Catalog Data", Faculty of Engineering and Sustainable Development, Oct. 2013, 103 pages.
Peng et al, "High-Temperature Thermal Stability of Molten Salt Materials," International Journal of Energy Research, Oct. 2008, pp. 1164-1174, vol. 32, No. 12.
Pickett et al., "Heated Turbulent Flow of Helium-Argon Mixtures in Tubes," International Journal of Heat and Mass Transfer, May 1979, pp. 705-719, vol. 22, No. 5.
Raade et al, "Development of Molten Salt Heat Transfer Fluid With Low Melting Point and High Thermal Stability," Journal of Solar Energy Engineering, Aug. 2011, pp. 031013-1 to 031013-6, vol. 133, No. 3.
Rochau, Gary E., "Supercritical CO2 Brayton Cycle Development," Advance SMR Energy Conversion, Nuclear Energy, Jun. 2014, 23 pages.
Ruer et al, "Pumped Heat Energy Storage," 2010, pp. 1-14.
Scott et al., "The Redesign and Simulated Test of a Small Closed Brayton Cycle Turbine-compressor Set for Nuclear Application," ASME 1969 Gas Turbine Conference and Products Show, 1969, 11 pages.
Silverman et al., "Survey of Technology for Storage of Thermal Energy in Heat Transfer Salt," Oak Ridge National Laboratory, ORNL/TM-5682, Jan. 1977, 32 pages.
Steinmann et al., "Thermo-Mechanical Concepts for Bulk Energy Storage," Renewable and Sustainable Energy Reviews, Nov. 2016, vol. 75, pp. 205-219.
Stiesdal et al., "Stiesdal Gridscale Battery Technology Addresses the Growing Need for Reliable, Cost-Effective Bulk Energy Storage," Stiesdal Storage Technologies, Jan. 2019, pp. 23.
Taygun et al., "Conventional and Nuclear Gas Turbines for Combined Power and Heat Production," ASME 1970 International Gas Turbine Conference and Products Show, 1970, 9 pages.
Taygun, F., "Discussion: Bureau of Mines Progress in Developing Open and Closed-Cycle Coal-Burning Gas Turbine Power Plants," Journal of Engineering for Power, Oct. 1966, pp. 320-322, vol. 88, No. 4.
Turchi, Craig, "NREL Advanced Concepts," Solar Energy Technologies Program Peer Review, May 2010, 13 pages.
Vanco, Michael R., "Analytical Comparison of Relative Heat-Transfer Coefficients and Pressure Drops of Inert Gases and Their Binary Mixtures," U.S. National Aeronautics and Space Administration, Feb. 1965, 18 pages.
Way, Julie, "Storing the Sun: Molten Salt Provides Highly Efficient Thermal Storage," LTD, Jun. 2008, 2 pages. http://www.renewableenergyworld.com/articles/2008/06/storing-the-sun-molten-salt-provides-highly-efficient-thermalstorage-52873.html.
Wesoff, Eric, "Breakthrough in Energy Storage: Isentropic Energy," Feb. 2010, 3 pages,https://www.greentechmedia.com/articles/read/breakthrough-in-utility-scale-energy-storage-isentropic.
Wilson, Joseph Nathanael, "A Utility-Scale Deployment Project of Behind-the-Meter Energy Storage for Use in Ancillary Services, Energy Resiliency, Grid Infrastructure Investment Deferment, and Demand-Response Integration," Portland State University, 2016, 154 pages.
Yergovich et al, "Density and Viscosity of Aqueous Solutions of Methanol and Acetone from the Freezing Point to 10.degree. C," Journal of Chemical and Engineering Data, Apr. 1971, pp. 222-226, vol. 16, No. 2.
Zabrasnsky et al., "Heat Capacities of Organic Compounds in the Liquid State I. C1 to C18 1-Alkanols," Journal of Physical and Chemical Reference Data, May 1990, pp. 719-762, vol. 19, No. 3.
Final Office Action dated Sep. 14, 2022 for U.S. Appl. No. 17/164,302, filed Feb. 1, 2021, 12 pages.
Non-Final Office Action dated Jul. 12, 2022 on for U.S. Appl. No. 16/779,975, filed Feb. 3, 2020, 50 pages.
Non-Final Office Action dated Jul. 28, 2022 on for U.S. Appl. No. 17/509,341, filed Oct. 25, 2021, 13 pages.
Non-Final Office Action dated Sep. 30, 2022 on for U.S. Appl. No. 17/092,806, filed Nov. 9, 2020, 14 pages.
Notice of Allowance dated Aug. 9, 2022 on for U.S. Appl. No. 17/174,493, filed Feb. 12, 2021, 2 pages.
Notice of Allowance dated Jun. 21, 2022 on for U.S. Appl. No. 16/991,790, filed Aug. 12, 2020, 7 pages.
Notice of Allowance dated Aug. 1, 2022, for U.S. Appl. No. 17/164,295, filed Feb. 1, 2021, 07 pages.
Notice of Allowance dated Jul. 22, 2022, for U.S. Appl. No. 17/164,286, filed Feb. 1, 2021, 8 pages.
Notice of Allowance dated Jul. 28, 2022, for U.S. Appl. No. 17/564,526, filed Dec. 29, 2021, 11 pages.
Notice of Allowance dated Jun. 28, 2022, for U.S. Appl. No. 16/991,813, filed Aug. 12, 2020, 9 pages.
Chinese Patent Application No. 201780086973.3, Office Action dated Sep. 19, 2022—English Translation Available.
International Search Report and Written Opinion of PCT Application No. PCT/US2022/052906, dated Apr. 18, 2023, 19 pages.
International Search Report and Written Opinion of PCT Application No. PCT/US2023/10461, dated Apr. 26, 2023, 15 pages.
Final Office Action dated Oct. 28, 2022 for U.S. Appl. No. 17/400,706, filed Aug. 12, 2021, 17 pages.
Final Office Action dated Jun. 27, 2023 for U.S. Appl. No. 17/400,706, filed Aug. 12, 2021.
Final Office Action dated Jun. 27, 2023 for U.S. Appl. No. 17/872,489, filed Jul. 25, 2022.
Final Office Action dated Jul. 10, 2023 for U.S. Appl. No. 17/952,753, filed Sep. 26, 2022.
Final Office Action dated May 1, 2023, for U.S. Appl. No. 17/850,510, filed Jun. 27, 2022, 23 pages.
Final Office Action dated Feb. 13, 2023 for U.S. Appl. No. 16/779,975, filed Feb. 3, 2020, 25 pages.
Final Office Action dated Jan. 12, 2023 for U.S. Appl. No. 17/400,953, filed Aug. 12, 2021, 17 pages.
Non-Final Office Action dated Dec. 14, 2022 for U.S. Appl. No. 17/705,738, filed Mar. 28, 2022, 6 pages.
Non-Final Office Action dated Dec. 23, 2022, for U.S. Appl. No. 17/850,510, filed Jun. 27, 2022, 22 pages.
Non-Final Office Action dated Jan. 24, 2023 for U.S. Appl. No. 17/872,489, filed Jul. 25, 2022, 6 pages.
Non-Final Office Action dated Jan. 25, 2023 for U.S. Appl. No. 17/952,753, filed Sep. 26, 2022, 10 pages.
Non-Final Office Action dated Feb. 14, 2023 for U.S. Appl. No. 17/400,706, filed Aug. 12, 2021, 14 pages.
Non-Final Office Action dated Feb. 6, 2023 for U.S. Appl. No. 17/971,196, filed Oct. 21, 2021, 59 pages.
Non-Final Office Action dated Feb. 17, 2023 for U.S. Appl. No. 17/952,722, filed Sep. 26, 2022, 211 pages.
Non-Final Office Action dated Jul. 28, 2023 for U.S. Appl. No. 17/400,953, filed Aug. 12, 2021.
Notice of Allowance dated Nov. 4, 2022 on for U.S. Appl. No. 17/564,526, filed Dec. 29, 2021, 9 pages.
Notice of Allowance dated Oct. 19, 2022 on for U.S. Appl. No. 17/365,341, filed Jul. 1, 2021, 8 pages.
Notice of Allowance dated Nov. 23, 2022 on for U.S. Appl. No. 17/164,286, filed Feb. 1, 2021, 9 pages.

(56) References Cited

OTHER PUBLICATIONS

Notice of Allowance dated Dec. 27, 2022 on for U.S. Appl. No. 17/564,526, filed Dec. 29, 2021, 3 pages.
Notice of Allowance dated Jan. 25, 2023, for U.S. Appl. No. 17/509,341, filed Oct. 25, 2021, 8 pages.
Notice of Allowance dated Feb. 2, 2023, for U.S. Appl. No. 17/164,302, filed Feb. 1, 2021, 7 pages.
Notice of Allowance dated Feb. 16, 2023, for U.S. Appl. No. 17/092,806, filed Nov. 9, 2020, 8 pages.
Notice of Allowance dated Apr. 4, 2023, for U.S. Appl. No. 17/705,738, filed Mar. 28, 2022, 10 pages.
Notice of Allowance dated May 4, 2023, for U.S. Appl. No. 17/509,341, filed Oct. 25, 2021, 5 pages.
Notice of Allowance dated May 17, 2023, for U.S. Appl. No. 17/509,341, filed Feb. 1, 2021, 7 pages.
Notice of Allowance dated May 22, 2023 on for U.S. Appl. No. 17/872,489, filed Jul. 25, 2022, 9 pages.

\* cited by examiner

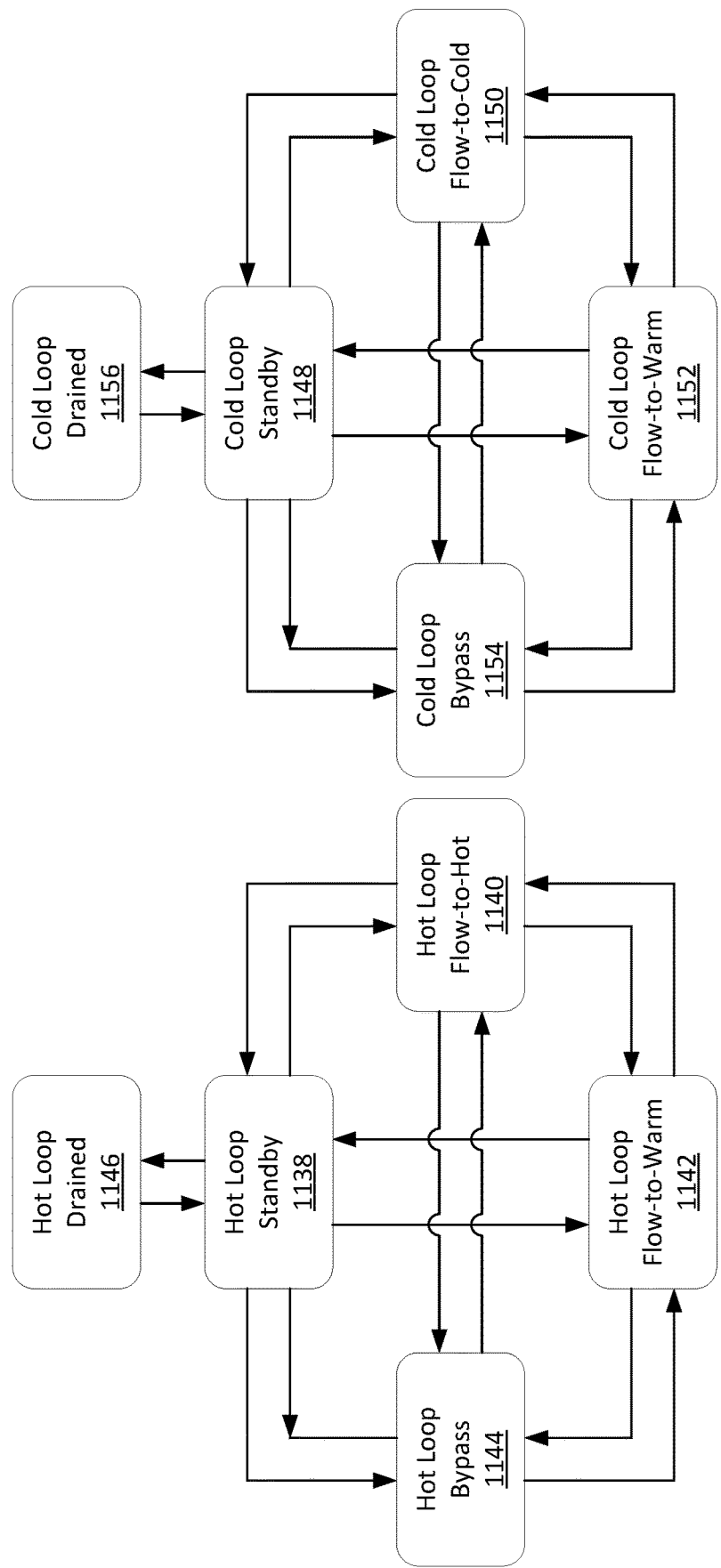

PUMPED HEAT ELECTRIC STORAGE SYSTEM WITH RECIRCULATION

CROSS REFERENCE TO RELATED APPLICATIONS

This application is a U.S. nationalization under 35 U.S.C. § 371 of International Application No. PCT/US2020/060700, filed 16 Nov. 2020, which claims the benefit of priority under 35 U.S.C. § 119(e) to U.S. Provisional Patent Application No. 62/936,491, filed Nov. 16, 2019, and U.S. Provisional Patent Application No. 63/113,386, filed Nov. 13, 2020. The disclosures set forth in the referenced applications are incorporated herein by reference in their entirety.

BACKGROUND

In a heat engine or heat pump, a heat exchanger may be employed to transfer heat between a thermal storage material and a working fluid for use with turbomachinery. The heat engine may be reversible, e.g., it may also be a heat pump, and the working fluid and heat exchanger may be used to transfer heat or cold to thermal storage media.

SUMMARY

A Pumped Heat Electric Storage ("PHES") system may include at least a working fluid circulated through a closed cycle fluid path including at least two heat exchangers, at least one turbine, and at least one compressor. In some systems, one or more recuperative heat exchangers may also be included. At least two thermal reservoirs may hold thermal fluids which may be sent through the heat exchangers, providing thermal energy to, and/or extracting thermal energy from, the working fluid. One or more motor/generators may be used to obtain work from the thermal energy in the system, preferably by generating electricity from mechanical energy received from the turbine.

BRIEF DESCRIPTION OF THE DRAWINGS

FIG. 25 is a state diagram illustrating hot-side loop states of a PHES system, according to an example embodiment.

FIG. 26 is a state diagram illustrating cold-side loop states of a PHES system, according to an example embodiment.

DETAILED DESCRIPTION

I. Overview

Figure 1:
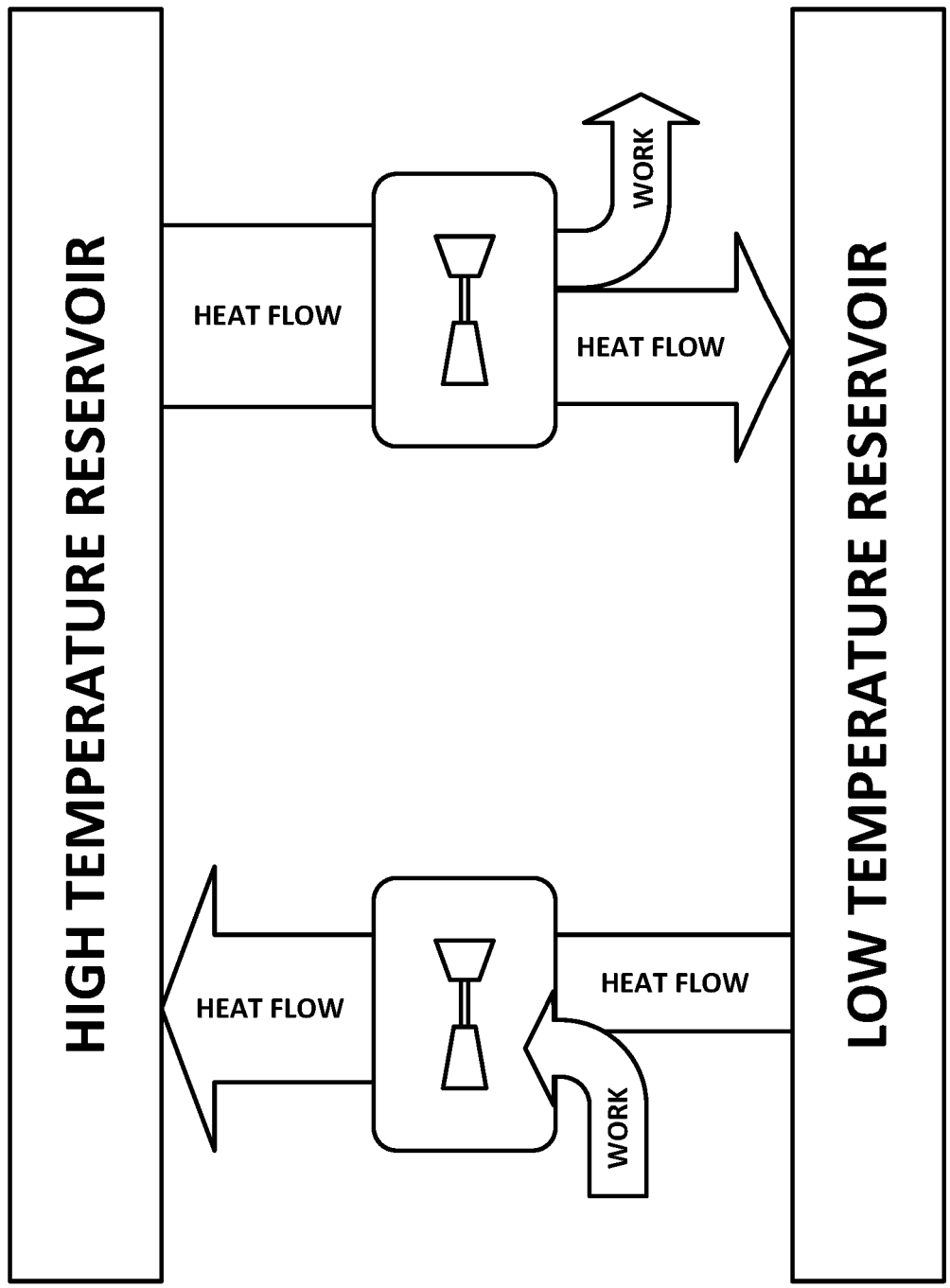
FIG. 1 schematically illustrates operating principles of a pumped heat electric storage system.

The Pumped Heat Electric Storage ("PHES") systems, modes of operations, and states disclosed herein, as illustrated via multiple embodiments, are grid-scale energy storage systems that provide dispatchable power generation and power absorption. Advantageously, the PHES systems may provide increased grid stability and resilience. Additionally or alternatively, embodiments disclosed herein can achieve very fast dispatch response times, with spinning reserve capabilities comparable to natural gas peaker and cyclic units, but without the fossil fuel consumption. The PHES systems disclosed herein, utilizing thermal storage media also disclosed herein, may advantageously provide a safe, non-toxic and geography-independent energy (e.g., electricity) storage alternative.

The PHES systems function as thermodynamic cycle power generation and/or energy storage systems. Embodiments of the PHES systems may work as Brayton cycle systems. Alternatively or additionally, embodiments of the PHES systems may work as reversible Brayton cycle systems. Preferably, the PHES systems may operate as closed working-fluid loop systems. The PHES systems may use one or more generator and/or motor systems, which connect to one or more turbines and/or compressors which act on a working fluid (e.g., air) circulating in the system.

The PHES systems may have a hot side and a cold side. Each side may include one or more heat exchanger systems coupled to one or more thermal reservoirs. The PHES systems may employ liquid thermal storage medium on both or either the hot side and/or the cold side. The liquid thermal storage media preferably include liquids that are stable at high temperatures, such as molten nitrate salt or solar salt, and/or liquids that are stable at low temperatures, such as methanol/water coolant mixtures, glycols, and/or alkanes such as hexane. In one embodiment, cold-side and hot-side thermal reservoirs may include tanks of liquid thermal storage media, such as, but not limited to, methanol/water coolant and molten salt, respectively.

During a charge cycle (i.e, charge mode), the PHES systems act as a heat pump, converting electrical energy from an electrical grid or other source to thermal energy that is stored in thermal reservoirs. The heat-pumping action may be done via motor-driven turbomachinery (e.g., a compressor system and a turbine system) in a closed-loop Brayton cycle using a working fluid (e.g., air).

During a generation cycle (i.e., generation mode), the PHES systems act as a heat engine, converting stored thermal energy from the thermal reservoirs to electrical energy that can be dispatched back to the grid or another load. The working fluid loop during generation may be a closed-loop Brayton cycle, may use the same working fluid as the charge cycle, may use the same or different heat exchangers as the charge cycle, and may use the same turbomachinery as the charge cycle or may use different turbomachinery than the charge cycle. The generation turbine system may drive one or more generators that are grid synchronous.

Embodiments of the disclosed PHES systems enable fast cycling from full charge to full discharge.

Embodiments of the PHES systems also enable fast mode switching, such that the PHES system can switch modes from full load (i.e., charge) to full generation in a very short duration. This is particularly useful for providing spinning reserve type capabilities to address energy shifting needs related to high penetration of solar (e.g., photovoltaic) energy generation on an electrical grid or grid segment. During ramp periods when solar generation is coming online or going offline, the ability of the PHES systems to quickly change from full load to full generation is critical for helping to address slope of the solar "duck curve" that reflects a timing imbalance between peak demand and renewable energy production.

Embodiments of the PHES systems also enable partial turndown. Various power generation applications (e.g. wind farms, natural gas peaker power plants) benefit from the ability for generation and load assets such as the PHES systems to ramp power up and down from full power based on a dispatching signal.

FIG. 1 schematically illustrates operating principles of the PHES systems. Electricity may be stored in the form of thermal energy of two thermal storage media at different temperatures (e.g., thermal energy reservoirs comprising thermal storage media such as heat storage fluids) by using one or more heat pump and heat engine systems. In a charging (heat pump) mode, work may be consumed by the PHES system for transferring heat from a cold thermal medium to a hot thermal medium, thus lowering the temperature of the cold thermal medium and increasing the temperature of the hot thermal medium. In a generation (heat engine or discharging) mode, work may be produced by the PHES systems by transferring heat from the hot thermal medium to the cold thermal medium, thus lowering the temperature (i.e., sensible energy) of the hot thermal medium and increasing the temperature of the cold thermal medium. The PHES systems may be configured to ensure that the work produced by the system during generation is a favorable fraction of the energy consumed during charge. Excess heat from inefficiency may be dumped to ambient or an external heat sink. The PHES systems are configured to achieve high roundtrip efficiency, defined herein as the work produced by the system during generation divided by the work consumed by the system during charge. Further, the design of the PHES systems permits high roundtrip efficiency using components of a desired (e.g., acceptably low) cost.

The PHES systems may include a working fluid to and from which heat is transferred while undergoing a thermodynamic cycle. The PHES systems operating in a closed cycle allows, for example, a broad selection of working fluids, operation at elevated cold side pressures, operation at lower cold side temperatures, improved efficiency, and reduced risk of compressor and turbine damage. One or more aspects of the disclosure described in relation to the PHES systems having working fluids undergoing closed thermodynamic cycles may also be applied to the PHES systems having working fluids undergoing open or semi-open thermodynamic cycles.

The working fluid may undergo a thermodynamic cycle operating at one, two, or more pressure levels. For example, the working fluid may operate in a closed cycle between a low-pressure limit on a cold side of the system and a high-pressure limit on a hot side of the system. In some implementations, a low-pressure limit of about 10 atmospheres (atm) or greater can be used. In some instances, the low pressure limit may be at least about 1 atm, at least about 2 atm, at least about 5 atm, at least about 10 atm, at least about 15 atm, at least about 20 atm, at least about 30 atm, at least about 40 atm, at least about 60 atm, at least about 80 atm, at least about 100 atm, at least about 120 atm, at least about 160 atm, or at least about 200 atm, 500 atm, 1000 atm, or more. In some instances, a sub-atmospheric low-pressure limit may be used. For example, the low-pressure limit may be less than about 0.1 atm, less than about 0.2 atm, less than about 0.5 atm, or less than about 1 atm. In some instances, the low-pressure limit may be about 1 atmosphere (atm). In the case of a working fluid operating in an open cycle, the low-pressure limit may be about 1 atm or equal to ambient pressure.

Working fluids used in embodiments of the PHES systems may include air, argon, other noble gases, carbon dioxide, hydrogen, oxygen, or any combination thereof, and/or other fluids in gaseous state throughout the working fluid loop. In some implementations, a gas with a high specific heat ratio may be used to achieve higher cycle efficiency than a gas with a low specific heat ratio. For example, argon (e.g., specific heat ratio of about 1.66) may be used rather than air (e.g., specific heat ratio of about 1.4). In some cases, the working fluid may be a blend of one, two, three, or more fluids. In one example, helium (having a high thermal conductivity and a high specific heat) may be added to the working fluid (e.g., argon) to improve heat transfer rates in heat exchangers.

The PHES systems may utilize thermal storage media, such as one or more heat storage fluids. Alternatively or additionally, the thermal storage media may be solids or gasses, or a combination of liquids, solids, and/or gasses. The PHES systems may utilize a thermal storage medium on a hot side of the PHES system ("HTS medium") and a thermal storage medium on a cold side of the system ("CTS medium"). Preferably, the thermal storage media have high heat capacities per unit volume (e.g., heat capacities above about 1400 Joule (kilogram Kelvin)−1) and high thermal conductivities (e.g., thermal conductivities above about 0.7 Watt (meter Kelvin)−1). In some implementations, several different thermal storage media on either the hot side or the cold side, or both the hot side and the cold side, may be used.

The operating temperatures and pressures of the HTS medium may be entirely in the liquid range of the HTS medium, and the operating temperatures and pressures of the CTS medium may be entirely in the liquid range of the CTS medium. In some examples, liquids may enable a more rapid exchange of large amounts of heat than solids or gases. Thus, in some cases, liquid HTS and CTS media may advantageously be used.

In some implementations, the HTS medium may be a molten salt or a mixture of molten salts. A salt or salt mixture that is liquid over the operating temperature range of the HTS medium may be employed. Molten salts can provide numerous advantages as thermal storage media, such as low vapor pressure, lack of toxicity, chemical stability, low reactivity with typical steels (e.g., melting point below the creep temperature of steels, low corrosiveness, low capacity to dissolve iron and nickel), and low cost. In one example, the HTS medium is a mixture of sodium nitrate and potassium nitrate. In another example, the HTS medium is a eutectic mixture of sodium nitrate and potassium nitrate. In another example, the HTS medium is a mixture of sodium nitrate and potassium nitrate having a lowered melting point than the individual constituents, an increased boiling point than the individual constituents, or a combination thereof. Other examples of HTS media include potassium nitrate, calcium nitrate, sodium nitrate, sodium nitrite, lithium nitrate, mineral oil, or any combination thereof. Further examples include any gaseous (including compressed gases), liquid or solid media (e.g., powdered solids) having suitable (e.g., high) thermal storage capacities and/or are capable of achieving suitable (e.g., high) heat transfer rates with the working fluid. For example, a mix of 60% sodium nitrate and 40% potassium nitrate (also referred to as a solar salt) can have a heat capacity of approximately 1500 Joule (Kelvin mole)−1 and a thermal conductivity of approximately 0.75 Watt (meter Kelvin)−1 within a temperature range of interest. Advantageously, the HTS medium may be operated in a temperature range that is compatible with structural steels used in unit components of the PHES system.

In some cases, liquid water at temperatures of about 0° C. to 100° C. (about 273 K-373 K) and a pressure of about 1 atm may be used as the CTS medium. Due to a possible explosion hazard associated with the presence of steam at or near the boiling point of water, the operating temperature can be kept below 100° C. while maintaining an operating pressure of 1 atm (i.e., no pressurization). In some cases, the temperature operating range of the CTS medium may be extended (e.g., to −30° C. to 100° C. at 1 atm) by using a mixture of water and one or more antifreeze compounds (e.g., ethylene glycol, propylene glycol, or glycerol), or a water/alcohol mixture such as water and methanol.

Improved efficiency may be achieved by increasing the temperature difference at which the PHES system operates, for example, by using a CTS medium capable of operating at lower temperatures. In some examples, the CTS medium may comprise hydrocarbons, such as, for example, alkanes (e.g., hexane or heptane), alkenes, alkynes, aldehydes, ketones, carboxylic acids (e.g., HCOOH), ethers, cycloalkanes, aromatic hydrocarbons, alcohols (e.g., butanol), other type(s) of hydrocarbon molecules, or any combinations thereof. In some examples, cryogenic liquids having boiling points below about −150° C. or about −180° C. may be used as CTS medium (e.g., propane, butane, pentane, nitrogen, helium, neon, argon, krypton, air, hydrogen, methane, or liquefied natural gas, or combinations thereof). In some implementations, choice of CTS medium may be limited by the choice of working fluid. For example, when a gaseous working fluid is used, a liquid CTS medium having a liquid temperature range at least partially or substantially above the boiling point of the working fluid may be required.

In some cases, the operating temperature range of CTS and/or HTS media can be changed by pressurizing (i.e., raising the pressure) or evacuating (i.e., lowering the pressure) the thermal media fluid paths and storage tanks, and thus changing the temperature at which the storage media undergo phase transitions.

The HTS medium and/or CTS medium may be in a liquid state over all, or over at least a portion, of the operating temperature range of the respective side of a PHES system. The HTS medium and/or CTS medium may be heated, cooled or maintained to achieve a suitable operating temperature prior to, during or after various modes of operation of a PHES system.

The thermal reservoirs of the PHES systems may cycle between charged and discharged modes, in conjunction with, or separate from, the charge and generation cycles of the overall PHES system embodiment. In some examples, the thermal reservoirs of the PHES systems may be fully charged, partially charged or partially discharged, or fully discharged. In some cases, cold-side thermal reservoir(s) may be charged (also "recharged" herein) independently from hot-side thermal reservoir(s). Further, in some implementations, charging (or some portion thereof) of thermal reservoirs and discharging (or some portion thereof) of thermal reservoirs can occur simultaneously. For example, a first portion of a hot-side thermal reservoir may be recharged while a second portion of the hot-side thermal reservoir together with a cold-side thermal reservoir are being discharged.

Embodiments of the PHES systems may be capable of storing energy for a given amount of time. In some cases, a given amount of energy may be stored for at least about 1 second, at least about 30 seconds, at least about 1 minute, at least about 5 minutes, at least about 30 minutes, at least about 1 hour, at least about 2 hours, at least about 3 hours, at least about 4 hours, at least about 5 hours, at least about 6 hours, at least about 7 hours, at least about 8 hours, at least about 9 hours, at least about 10 hours, at least about 12 hours at least about 14 hours, at least about 16 hours, at least about 18 hours, at least about 20 hours, at least about 22 hours, at least about 24 hours (1 day), at least about 2 days, at least about 4 days, at least about 6 days, at least about 8 days, at least about 10 days, 20 days, 30 days, 60 days, 100 days, 1 year or more.

Embodiments of the PHES systems may be capable of storing/receiving input of, and/or extracting/providing output of, a substantially large amount of energy for use with power generation systems (e.g., intermittent power generation systems such as wind power or solar power), power distribution systems (e.g. electrical grid), and/or other loads or uses in grid-scale or stand-alone settings. During a charge mode of the PHES systems, electric power received from an external power source (e.g., a wind power system, a solar photovoltaic power system, an electrical grid etc.) can be used to operate the PHES systems in the heat pump mode (i.e., transferring heat from a low temperature reservoir to a high temperature reservoir, thus storing energy). During a generation mode of the PHES systems, the system can supply electric power to an external power system or load (e.g., one or more electrical grids connected to one or more loads, a load, such as a factory or a power-intensive process, etc.) by operating in the heat engine mode (i.e., transferring heat from a high temperature reservoir to a low temperature reservoir, thus extracting energy). As described elsewhere herein, during charge and/or generation, the system may receive or reject thermal power, including, but not limited to electromagnetic power (e.g., solar radiation) and thermal power (e.g., sensible energy from a medium heated by solar radiation, heat of combustion etc.).

In some implementations, the PHES systems are grid-synchronous. Synchronization can be achieved by matching speed and frequency of motors and/or generators and/or turbomachinery of a system with the frequency of one or more grid networks with which the PHES systems exchange power. For example, a compressor and a turbine can rotate at a given, fixed speed (e.g., 3600 revolutions per minute (rpm)) that is a multiple of North American grid frequency (e.g., 60 hertz (Hz)). In some cases, such a configuration may eliminate the need for additional power electronics. In some implementations, the turbomachinery and/or the motors and/or generators are not grid synchronous. In such cases, frequency matching can be accomplished through the use of power electronics. In some implementations, the turbomachinery and/or the motors and/or generators are not directly grid synchronous but can be matched through the use of gears and/or a mechanical gearbox. As described in greater detail elsewhere herein, the PHES systems may also be power and/or load rampable. Such capabilities may enable these grid-scale energy storage systems to operate as peaking power plants and/or as a load following power plants. In some cases, the PHES systems of the disclosure may be capable of operating as base load power plants.

Embodiments of the PHES systems can have a given power capacity. In some cases, power capacity during charge may differ from power capacity during discharge. For example, embodiments of the PHES system can have a charge and/or discharge power capacity of less than about 1 megawatt (MW), at least about 1 megawatt, at least about 2 MW, at least about 3 MW, at least about 4 MW, at least about 5 MW, at least about 6 MW, at least about 7 MW, at least about 8 MW, at least about 9 MW, at least about 10 MW, at least about 20 MW, at least about 30 MW, at least about 40 MW, at least about 50 MW, at least about 75 MW, at least about 100 MW, at least about 200 MW, at least about 500 MW, at least about 1 gigawatt (GW), at least about 2 GW, at least about 5 GW, at least about 10 GW, at least about 20 GW, at least about 30 GW, at least about 40 GW, at least about 50 GW, at least about 75 GW, at least about 100 GW, or more.

Embodiments of the PHES systems can have a given energy storage capacity. In one example, a PHES system embodiment may be configured as a 100 MW unit operating for 10-hour cycles. In another example, a PHES system embodiment may be configured as a 1 GW plant operating for 12-hour cycles. In some instances, the energy storage capacity can be less than about 1 megawatt hour (MWh), at least about 1 megawatt hour, at least about 10 MWh, at least about 100 MWh, at least about 1 gigawatt hour (GWh), at least about 5 GWh, at least about 10 GWh, at least about 20 GWh, at least about 50 GWh, at least about 100 GWh, at least about 200 GWh, at least about 500 GWh, at least about 700 GWh, at least about 1000 GWh, or more.

In some cases, a given power capacity may be achieved with a given size, configuration and/or operating conditions of the heat engine/heat pump cycle. For example, size of turbomachinery and/or heat exchangers, number of turbomachinery and/or heat exchangers, or other system components, may correspond to a given power capacity.

In some implementations, a given energy storage capacity may be achieved with a given size and/or number of hot-side thermal reservoir(s) and/or cold-side thermal reservoir(s). For example, the heat engine/heat pump cycle can operate at a given power capacity for a given amount of time set by the heat storage capacity of the thermal reservoir(s). The number and/or heat storage capacity of the hot-side thermal reservoir(s) may be different from the number and/or heat storage capacity of the cold-side thermal reservoir(s). The number of thermal reservoir(s) may depend on the size of individual thermal reservoir(s).

Embodiments of the PHES systems may include any suitable number of cold-side and/or hot-side thermal storage units (e.g., CTS medium and/or HTS medium storage tanks, respectively), such as, but not limited to, at least about 1 (divided into two sections), at least about 2, at least about 4, at least about 10, at least about 50, at least about 100, and the like. In some examples, embodiments of the PHES system include 2, 3, 4, 5, 6, 7, 8, 9, 10, 15, 20, 30, 40, 50, 60, 70, 80, 90, 100, or more thermal storage units (e.g., CTS medium and/or HTS medium storage tanks).

While various embodiments of the invention are shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed. It shall be understood that different aspects of the invention can be appreciated individually, collectively, or in combination with each other.

It is to be understood that the terminology used herein is used for the purpose of describing specific embodiments, and is not intended to limit the scope of the present invention. It should be noted that as used herein, the singular forms of "a", "an" and "the" include plural references unless the context clearly dictates otherwise. In addition, unless defined otherwise, all technical and scientific terms used herein have the same meaning as commonly understood by one of ordinary skill in the art to which this invention belongs.

While preferable embodiments of the present invention are shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

The term "reversible," as used herein, generally refers to a process or operation that can be reversed. In some examples, in a reversible process, the direction of flow of energy is reversible. As an alternative, or in addition to, the general direction of operation of a reversible process (e.g., the direction of fluid flow) can be reversed, such as, e.g., from clockwise to counterclockwise, and vice versa.

The term "sequence," as used herein, generally refers to elements (e.g., unit operations) in order. Such order can refer to process order, such as, for example, the order in which a fluid flows from one element to another. In an example, a compressor, heat exchange unit, and turbine in sequence includes the compressor upstream of the heat exchange unit, and the heat exchange unit upstream of the turbine. In such a case, a fluid can flow from the compressor to the heat exchange unit and from the heat exchange unit to the turbine. A fluid flowing through unit operations in sequence can flow through the unit operations sequentially. A sequence of elements can include one or more intervening elements. For example, a system comprising a compressor, heat storage unit and turbine in sequence can include an auxiliary tank between the compressor and the heat storage unit. A sequence of elements can be cyclical.

II. Illustrative PHES System

Figure 2:
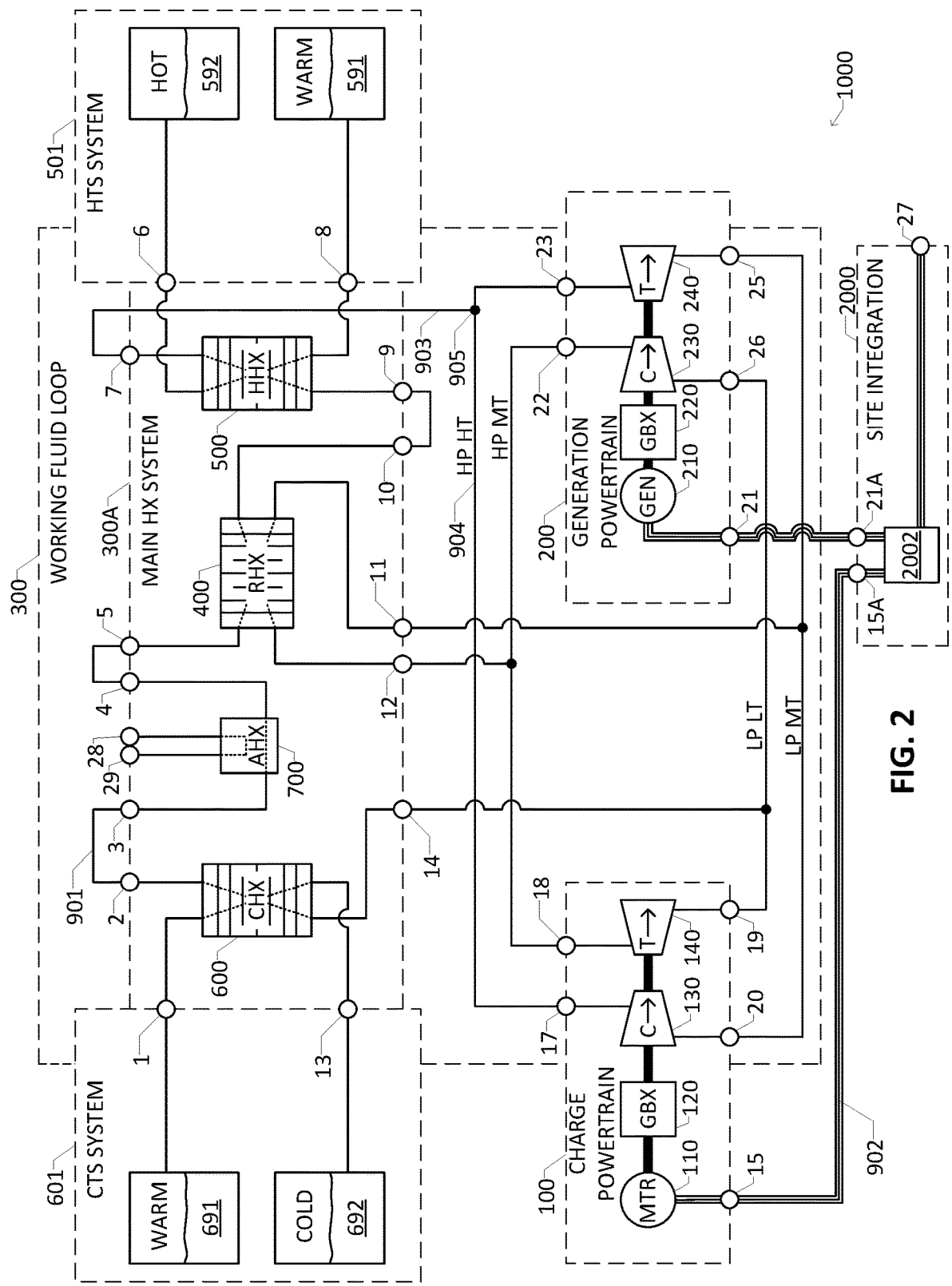
FIG. 2 is a top-level schematic diagram of a PHES system, according to an example embodiment.

FIG. 2 is a top-level schematic diagram of a PHES system 1000, according to an example embodiment, in which PHES system embodiments herein may be implemented. As a top-level schematic, the example embodiment PHES system 1000 in FIG. 2 illustrates major subsystems and select components, but not all components. Additional components are further illustrated with respect to additional figures detailing various subsystems. Additionally or alternatively, in other embodiments, additional components and/or subsystems may be included, and/or components and/or subsystems may not be included. FIG. 2 further illustrates select components and subsystems that work together in the PHES system 1000. FIG. 2 schematically shows how the select components and subsystems connect, how they are grouped into major subsystems, and select interconnects between them.

In FIG. 2 and FIGS. 3, 3A-3O, 4-9, connections between subsystems are illustrated as interconnects, such as fluid interconnects 3, 4 and electrical interconnects 15, 21. Illustrated connections between fluid interconnects, electrical interconnects, and/or components reflect fluid paths or power/signal paths, as appropriate. For example, fluid path 901 connects fluid interconnect 2 and fluid interconnect 3, thereby allowing fluid flow between CHX system 600 and AHX system 700, described in further detail below. As another example, power/signal path 902 connects electrical interconnect 15 and electrical interconnect 15A, which can carry power/signals between power interface 2002 and motor system 110. Junctions between illustrated paths are shown as a solid dot. For example, fluid path 903 exiting the main heat exchanger system 300A at fluid interconnect 7 joins the fluid path 904 between fluid interconnect 17 and fluid interconnect 23 at junction 905. Fluid paths may include components, connections, valves, and piping between components, and each fluid path may, in practice, include a single flow path (e.g., a single pipe) or multiple (e.g. parallel) flow paths (e.g., multiple pipes) between components. Valves may interrupt or make fluid connections between various fluid paths, as elsewhere illustrated, such as in FIG. 3. Valves may be actively controllable through actuators or other known devices in response to control signals, or may change state (e.g., open to close) in response to a physical condition at the valve, such as an overpressure condition at a pressure relief device. Further, valves may include variable position valves (e.g., capable of partial flow such as in proportional or servo valves) or switching valves (e.g., either open or closed). If an illustrated valve is on a fluid path that in practice includes multiple flow paths (e.g., multiple pipes), then each flow path may connect to the single valve or there may be multiple valves connecting the multiple flow paths. For power/signal paths, switches, breakers, or other devices may interrupt or make power/signal connections between various power/signal paths, such as in FIG. 9.

Major subsystems of PHES system 1000 include a charge powertrain system ("CPT system") 100, a generation powertrain system ("GPT system") 200, a working fluid loop 300, a main heat exchanger system 300A, a hot-side thermal storage system ("HTS system") 501, a cold-side thermal storage system ("CTS system") 601, and site integration systems 2000.

In FIG. 2, illustrated components in CPT system 100 include charge motor system 110, charge gearbox system 120, charge compressor system 130, and charge turbine system 140. Depending on operational mode, state, and embodiment configuration, CPT system 100 may connect to other components and subsystems of PHES system 1000 through various interconnects, including electrical interconnect 15 and fluid interconnects 17, 18, 19, and 20. Additionally, CPT system 100 may include more or fewer interconnects than shown in FIG. 2. The CPT system 100 takes electrical power in at electrical interconnect 15 and converts the electrical energy to working fluid flows through one or more of its fluid interconnects.

In FIG. 2, illustrated components in GPT system 200 include generation motor system 210, generation gearbox system 220, generation compressor system 230, and generation turbine system 240. Depending on operational mode, state, and embodiment configuration, GPT system 200 may connect to other components and subsystems of PHES system 1000 through various interconnects, including electrical interconnect 21 and fluid interconnects 22, 23, 25, and 26. Additionally, GPT system 200 may include more or fewer interconnects than shown in FIG. 2. GPT system 200 outputs electrical power at electrical interconnect 21 by taking energy from the working fluid flows through one or more of fluid interconnects. In some operating conditions or states, GPT system 200 may also receive power through one or more of electrical interconnects, such as electrical interconnect 21.

In FIG. 2, working fluid loop 300 includes a main heat exchanger system 300A, which includes recuperator heat exchanger ("RHX") system 400, hot-side heat exchanger ("HHX") system 500, cold-side heat exchanger ("CHX") system 600, and ambient cooler (heat exchanger) ("AHX") system 700. Depending on operational mode, state, and embodiment configuration, components in the main heat exchanger system 300A may connect to other components and subsystems of the PHES system 1000, and/or other components within the main heat exchanger system 300A or the working fluid loop 300, through various interconnects, including fluid interconnects 1, 2, 3, 4, 5, 6, 7, 8, 9, 10, 11, 12, 13, 14, 28, and 29.

In FIG. 2, working fluid loop 300 further includes the charge compressor system 130, and charge turbine system 140 of the CPT system 100, and the generation compressor system 230, and generation turbine system 240 of the GPT system 200. Depending on operational mode, state, and embodiment configuration, components in the working fluid loop 300 may connect to other components and subsystems of the PHES system 1000, and/or other components within the working fluid loop 300, through various interconnects, including fluid interconnects 17, 18, 19, 20, 22, 23, 25, and 26.

Figure 3:
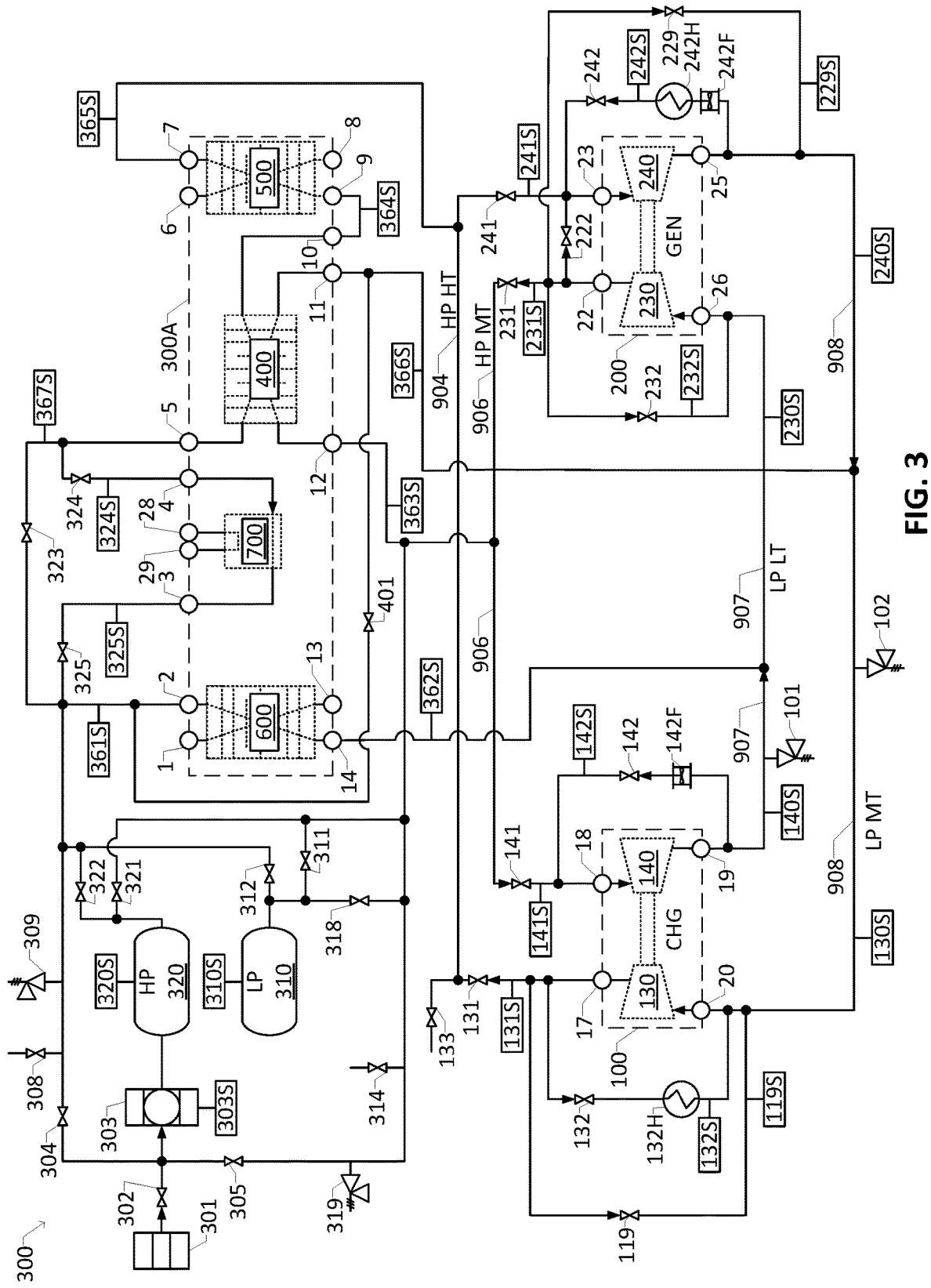
FIG. 3 is a schematic fluid path diagram of a working fluid loop subsystem in a PHES system, according to an example embodiment.
Figure 3A:
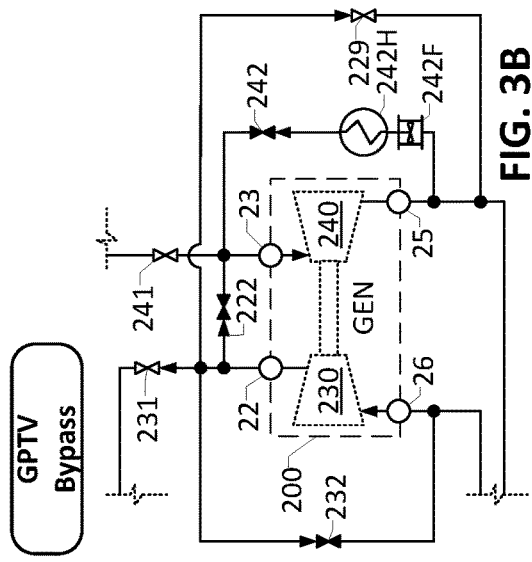
FIGS. 3A-3D are schematic fluid path diagrams of a generation powertrain system and associated valves, according to example embodiments.
Figure 3B:
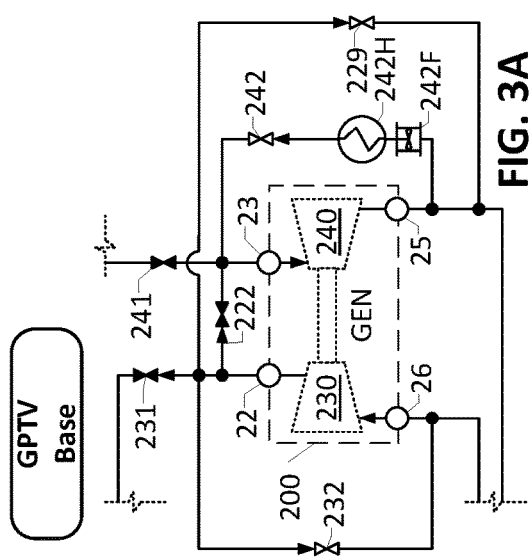
Figure 3C:
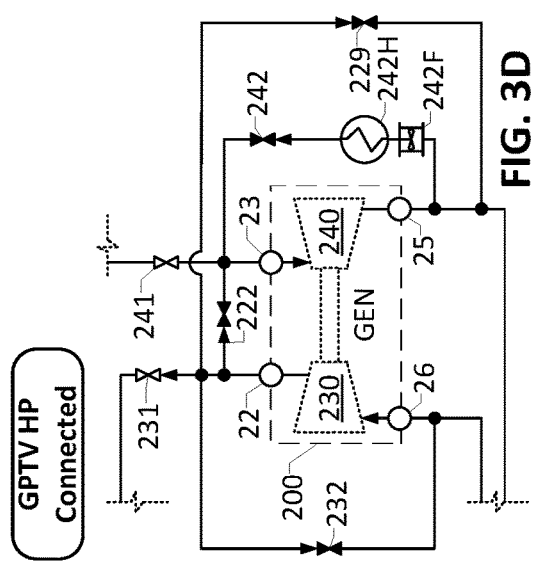
Figure 3D:
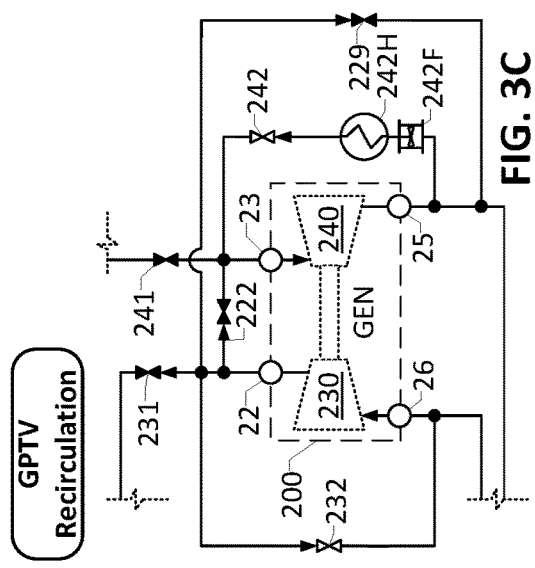
Figure 3E:
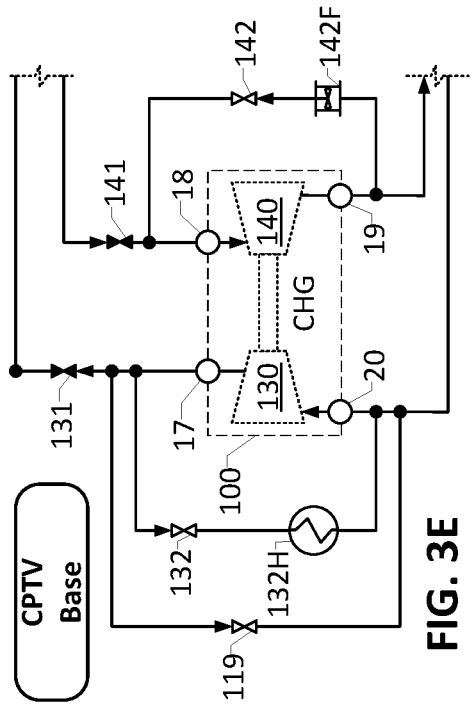
FIGS. 3E-3H are schematic fluid path diagrams of a charge powertrain system and associated valves, according to example embodiments.
Figure 3F:
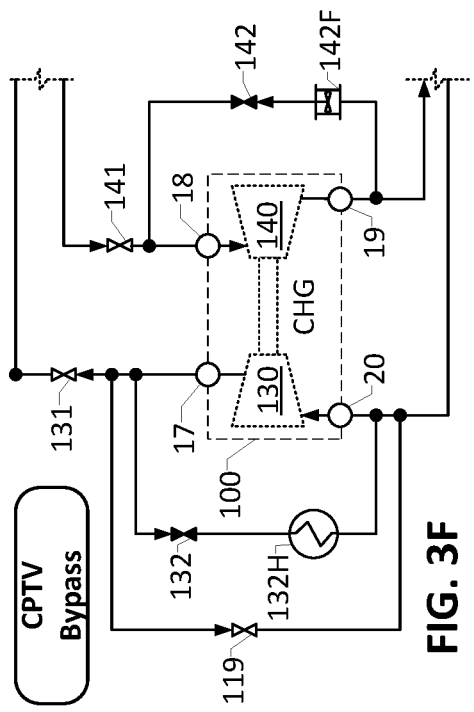
Figure 3G:
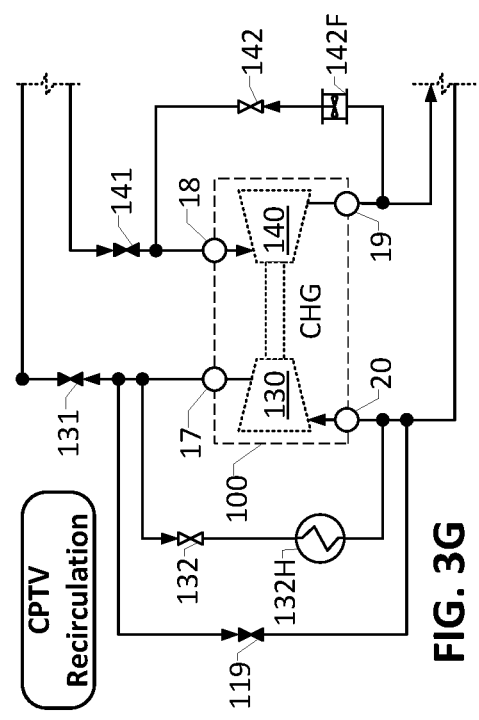
Figure 3H:
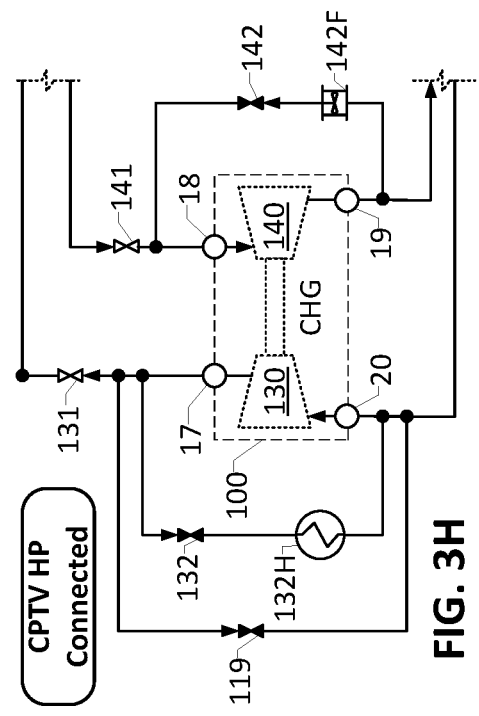
Figure 3I:
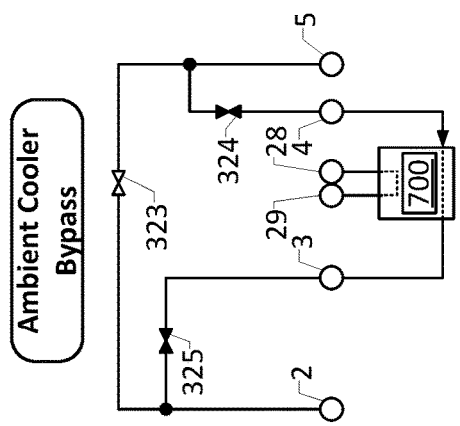
FIGS. 3I-3J are schematic fluid path diagrams of an ambient cooler system and associated valves, according to example embodiments.
Figure 3K:
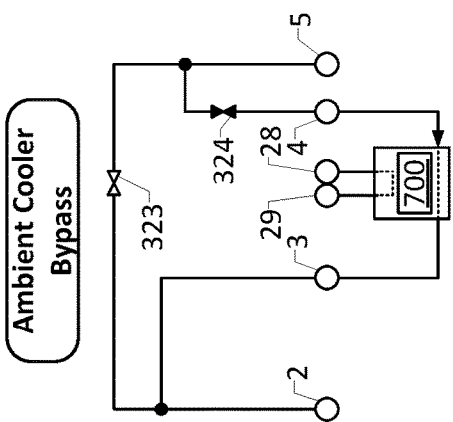
FIGS. 3K-3L are schematic fluid path diagrams of an ambient cooler system and associated valves, according to example embodiments.
Figure 3J:
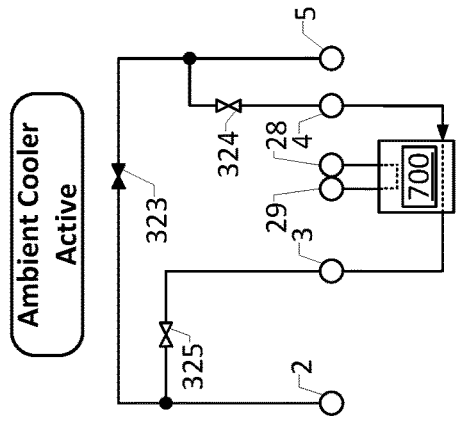
Figure 3L:
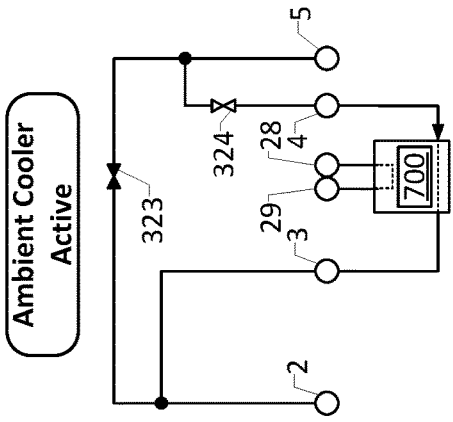
Figure 3M:
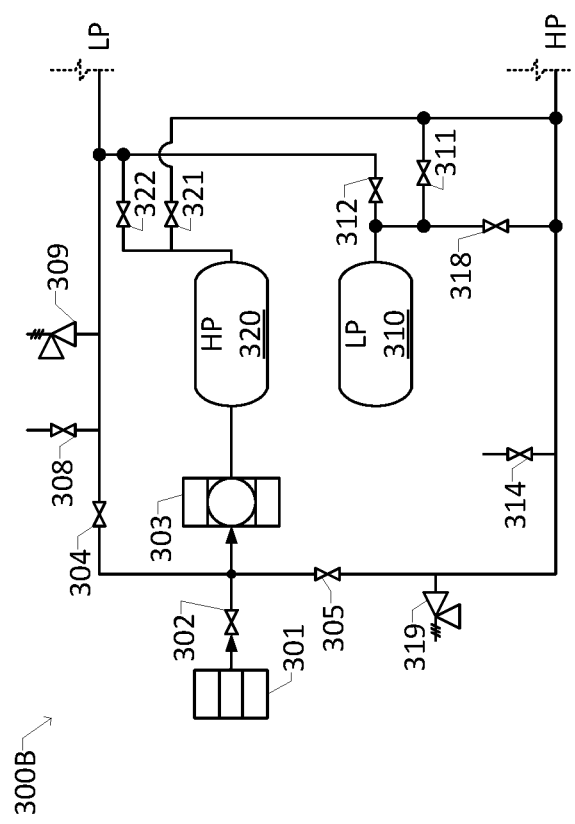
FIG. 3M is a schematic fluid path diagram of an inventory control system, according to an example embodiment.

In the PHES system 1000, working fluid loop 300 may act as a closed fluid path through which the working fluid circulates and in which desired system pressures of the working fluid can be maintained. The working fluid loop 300 provides an interface for the working fluid between the turbomachinery (e.g., charge compressor system 130 and charge turbine system 140, and/or generation compressor system 230 and generation turbine system 240) and the heat exchangers in the main heat exchanger system 300A. In a preferred embodiment, the working fluid is air. Example embodiments, and portions thereof, of working fluid loop 300, are illustrated in FIGS. 3 and 3A-O.

The working fluid loop 300 includes a fluid path that, in some operational modes and/or states of PHES system 1000, carries high-temperature and high-pressure working fluid between charge compressor system 130 and HHX system 500. In other operational modes and/or states a fluid path carries high-temperature and high-pressure working fluid between HHX system 500 and generation turbine system 240. Other configurations are possible as well. These configurations are further detailed with respect to the mode of operation and state descriptions herein and FIGS. 3 and 3A-O.

The working fluid loop 300 includes a fluid path that, in some operational modes and/or states of PHES system 1000, carries medium-temperature and high-pressure working fluid between RHX system 400 and charge turbine system 140. In other operational modes and/or states, a fluid path carries medium-temperature and high-pressure working fluid between generation compressor system 230 and RHX system 400. Other configurations are possible as well. These configurations are further detailed with respect to the mode of operation and state descriptions herein and FIGS. 3 and 3A-O.

The working fluid loop 300 includes a fluid path that, in some operational modes and/or states of PHES system 1000, carries low-temperature and low-pressure working fluid between charge turbine system 140 and CHX system 600. In other operational modes and/or states a fluid path carries low-temperature and low-pressure working fluid between CHX system 600 and generation compressor system 230. Other configurations are possible as well. These configurations are further detailed with respect to the mode of operation and state descriptions herein and FIGS. 3 and 3A-O.

The working fluid loop 300 includes a fluid path that, in some operational modes and/or states of PHES system 1000, carries medium-temperature and low-pressure working fluid between RHX system 400 and charge compressor system 130. In other operational modes and/or states, a fluid path carries medium-temperature and low-pressure working fluid between generation turbine system 240 and RHX system 400. Other configurations are possible as well. These configurations are further detailed with respect to the mode of operation and state descriptions herein and FIGS. 3 and 3A-O.

The main heat exchanger system 300A facilitates heat transfer between the working fluid circulating through the working fluid loop 300, a CTS medium circulating from/to the CTS system 601, an HTX medium circulating from/to the HTS system 501, and the ambient environment or other heat sink via AHX system 700. The CTS medium circulates between a warm CTS system 691 and a cold CTS system 692 via the CHX system 600, and that circulation may be referred to as the "CTS loop" or "cold-side loop," as further described, e.g., with respect to a CTS system 601 embodiment illustrated in FIG. 5. In a preferred embodiment, the CTS medium is a coolant fluid, such as a methanol and water mixture. The HTS medium circulates between a warm HTS system 591 and a hot HTS system 592 via the HHX system 500, and that circulation may be referred to as the "HTS loop" or "hot-side loop," as further described, e.g., with respect to an HTS system 601 embodiment illustrated in FIG. 4. In a preferred embodiment, the HTX medium is a molten salt.

Figure 5:
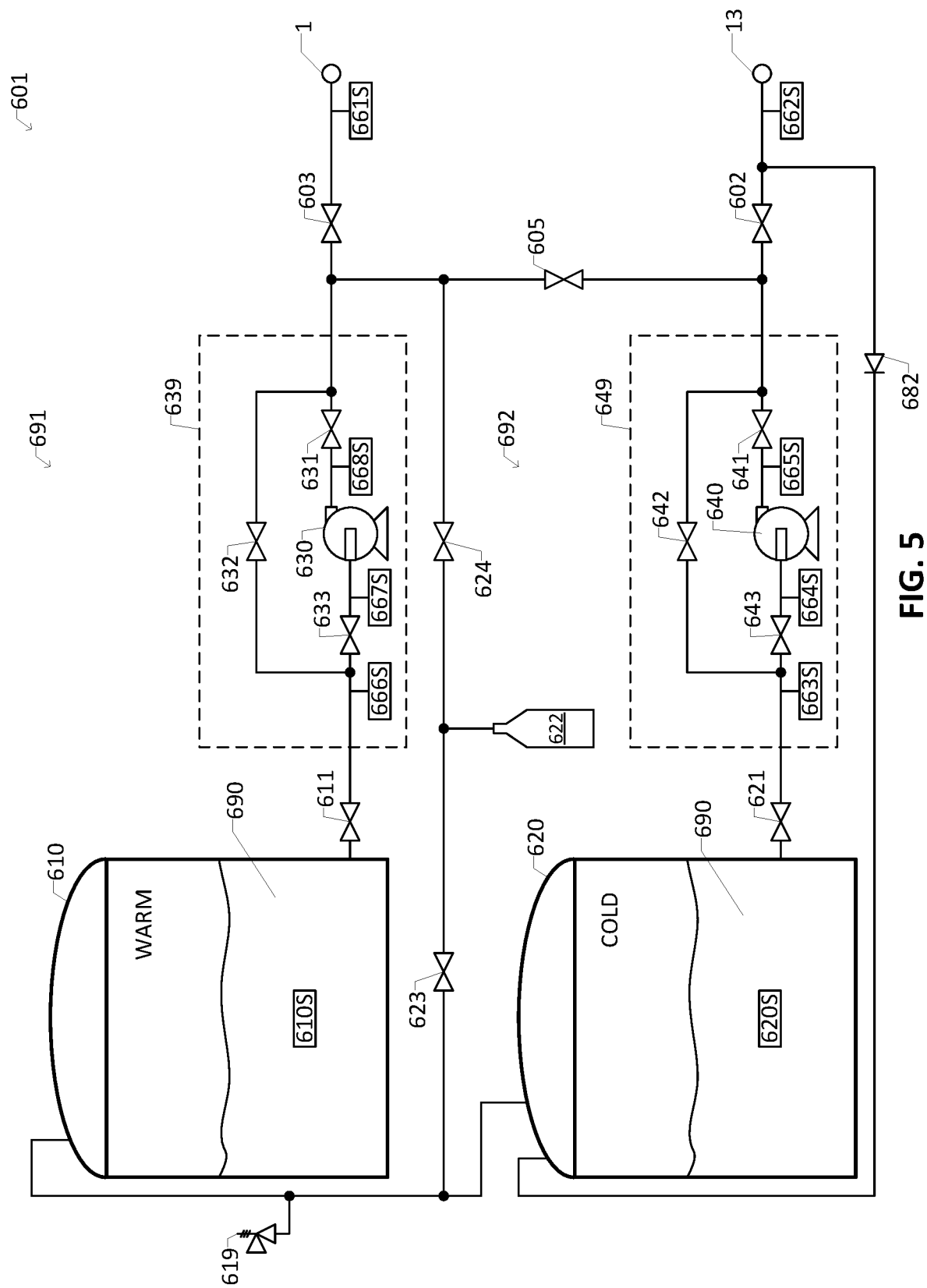
FIG. 5 is a schematic fluid path diagram of a cold-side thermal storage system, according to an example embodiment.

In FIG. 2, illustrated components in CTS system 601 include a representation of a cold-side thermal reservoir, including warm CTS system 691 and cold CTS system 692. Depending on operational mode, state, and embodiment configuration, CTS system 601 may connect to other components and subsystems of PHES system 1000 through various interconnects, including fluid interconnects 1 and 31. An example embodiment of CTS system 601, including pumps and supporting fluid paths, valves, and other components is illustrated in FIG. 5.

Figure 4:
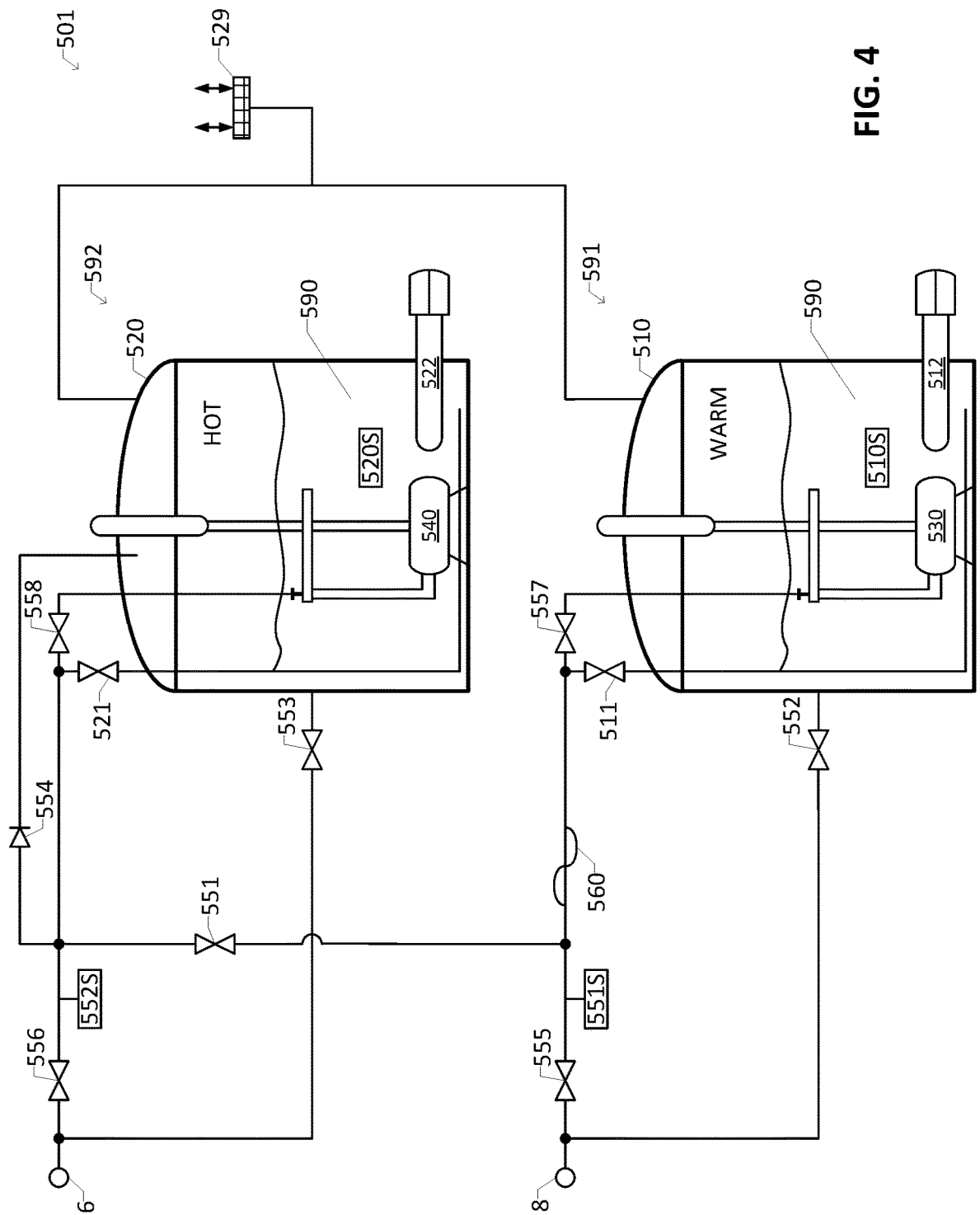
FIG. 4 is a schematic fluid path diagram of a hot-side thermal storage system, according to an example embodiment.

In FIG. 2, illustrated components in HTS system 501 include a representation of a hot-side thermal reservoir, including warm HTS system 591 and hot HTS system 592. Depending on operational mode, state, and embodiment configuration, HTS system 501 may connect to other components and subsystems of PHES system 1000 through various interconnects, including fluid interconnects 6 and 8. An example embodiment of HTS system 501, including pumps and supporting fluid paths, valves, and other components is illustrated in FIG. 4.

Components in PHES system 1000, including but not limited to valves, fans, sensors, pumps, heaters, heat traces, breakers, VFDs, working fluid compressors, etc., may each be connected to a power source and may be independently controllable, either or both proportionally and/or switchably, via one or more controllers and/or control systems. Additionally, each such component may include, or be communicatively connected via, a signal connection with another such component, through, for example, a wired, optical, or wireless connections. For example, a sensor may transmit data regarding temperature of the working fluid at a location in the working fluid loop; and, a control system may receive that data and responsively send a signal to a valve to close a fluid path. Data transmission and component control via signaling is known in the art and not illustrated herein, except wherein a particular arrangement is new and/or particularly relevant to the disclosed PHES systems, as with, for example, FIG. 9.

A. Charge Powertrain Subsystem

Figure 8:
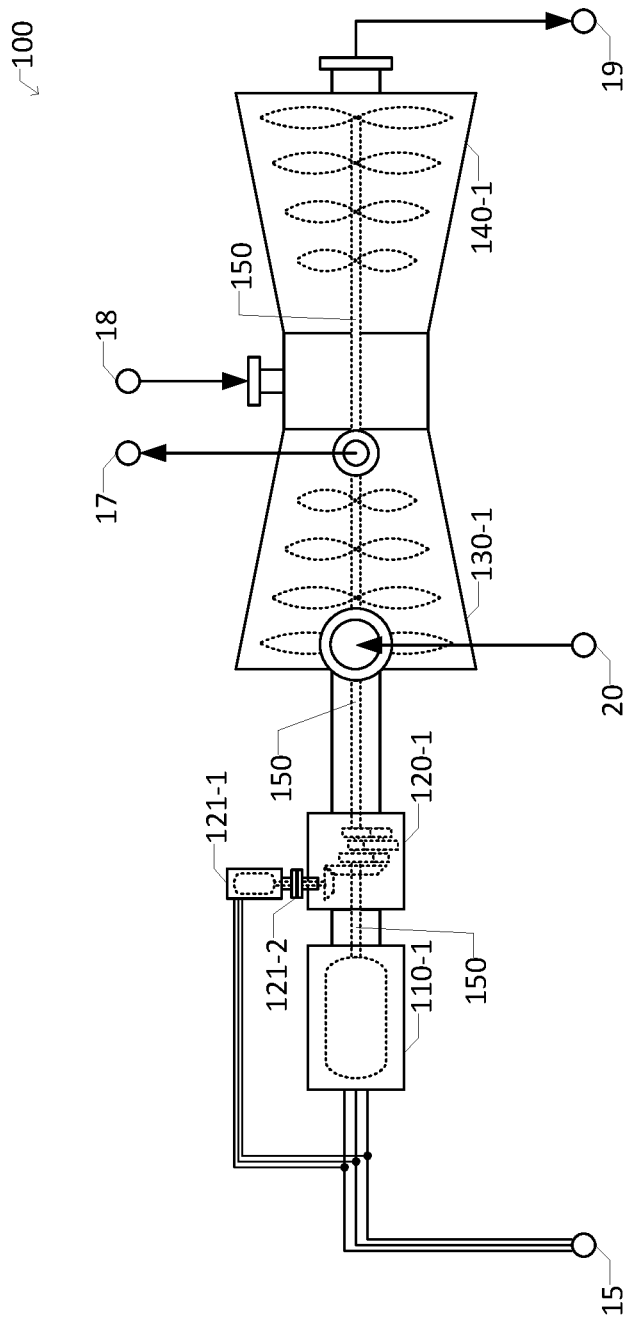
FIG. 8 is a schematic diagram of a charge powertrain ("CPT") system, according to an example embodiment.

FIG. 8 is a schematic diagram of the charge powertrain system 100, according to an example embodiment. FIG. 8 provides additional detail concerning CPT system 100 beyond that shown in the top-level schematic of FIG. 2. The CPT system 100 may be implemented in PHES systems disclosed herein, including the PHES system 1000 embodiment illustrated in FIG. 2. Other embodiments of a charge powertrain system operable in PHES systems disclosed herein are possible as well.

In FIG. 8, CPT system 100 includes a motor 110-1 as part of the charge motor system 110 of FIG. 2, a gearbox 120-1 as part of the charge gearbox system 120 of FIG. 2, a compressor 130-1 as part of charge compressor system 130, and a turbine 140-1 as part of charge turbine system 140. These components are connected via a drivetrain 150, such that the motor 110-1 is capable of driving the gearbox 120-1, the compressor 130-1, and the turbine 140-1. Drivetrain 150 may include a fixed connection between compressor 130-1 and turbine 140-1, and/or may include one or more shafts, flexible couplings, clutches, and/or gearboxes between compressor 130-1 and turbine 140-1. CPT system 100 further includes a turning motor 121-1 that is additionally capable of driving the compressor 130-1 and/or the turbine 140-1. Within CPT system 100, gearbox 120-1 provides a speed conversion between the motor 110-1 and turning motor 121-1 and the turbomachinery. In other embodiments of a charge powertrain system, the gearbox 120-1 may act only on one of the motors 110-1 and 121-1. Alternatively or additionally, gearbox 120-1 may act only on motor 110-1 and another gearbox (or no gearbox) may act on turning motor 121-1. In another embodiment, gearbox 120-1 may be omitted, therefore resulting in no speed conversion.

Turning motor 121-1 may be used for spinning CPT system 100 turbomachinery at low speeds (e.g., "slow roll"), for example, to cool the compressor 130-1 following a shutdown, and before bringing the rotating equipment to rest. The turning motor 121-1 may be mounted to the gearbox 120-1 or the drivetrain 150 or the motor 110-1, or elsewhere, and preferably rotates the turbomachinery at a very low RPM compared to the motor 110-1. The turning motor 121-1 is fitted with an overrunning clutch 121-2 that disengages when the drivetrain 150 side of the clutch is operating at higher speeds than the turning motor 121-1. This results in the turning motor 121-2 engaging with the drivetrain 150 when the slowing drivetrain 150 reaches the speed of the turning motor 121-1. The turning motor 121-1 will then maintain the slow roll speed.

CPT system 100 can receive power into the subsystem (via, e.g., electrical interconnect 15) and supply power to the motor system 110 (e.g., motor 110-1) and/or the turning motor 121-1. Depending on operational mode, state, and embodiment configuration, and as further illustrated in FIG. 2, CPT system 100 may receive power via a power interface 2002 and from the generation system 210 and/or an external source such as an electrical grid or local external generation source (e.g., power plant, renewable energy source, etc.) via interconnect 27.

Depending on operational mode and state, compressor 130-1 may raise the pressure of working fluid flowing through the compressor 130-1 by using rotational energy transmitted through the drivetrain 150. For example, during a charging mode (e.g., charge 1002 in FIG. 10), compressor 130-1 will compress working fluid flowing through it. As another example, during a slow rolling mode (e.g., CPT slow rolling 1062 in FIG. 15), the compressor 130-1, though spinning (e.g., via torque from the turning motor 121-1), may not cause an operationally significant increase in pressure of the working fluid.

Compressor 130-1 has at least one fluid inlet which connects to fluid interconnect 20 and allows working fluid to enter the low-pressure side of the compressor 130-1. Compressor 130-1 also has at least one fluid outlet which connects to fluid interconnect 17 and allows working fluid to exit the high-pressure side of the compressor 130-1. The schematic illustration represented in FIG. 8 is not meant to limit the CPT system 100 to a particular arrangement. For example, the turning motor 121-1 may be oriented differently or located at a different location where it is still capable of turning the drivetrain 150. As another example, inlets and outlets to the turbomachinery may be located at sides other than the top, side, and ends depicted.

A variable frequency drive ("VFD") (e.g., VFD 214 in FIG. 9) may be shared between the CPT system 100 and the GPT system 200. In one embodiment, the VFD may be utilized for startup and slow-rolling of the system only and is configured to exert only positive loads on the drivetrain 150. For example, VFD 214 may provide variable frequency power to motor 110-1 during CPT system 100 spinup.

Depending on operational mode and state, turbine 140-1 may reduce the pressure (e.g., through expansion) of working fluid flowing through the turbine 140-1, and energy derived from that pressure reduction may be transformed into rotational energy in the drivetrain 150. Turbine 140-1 has a fluid inlet which connects to fluid interconnect 18 and allows working fluid to enter the high-pressure side of the turbine 140-1. Turbine 140-1 also has a fluid outlet which connect to fluid interconnect 19 and allows working fluid to exit the low-pressure side of the turbine 140-1.

B. Generation Powertrain Subsystem

Figure 7:
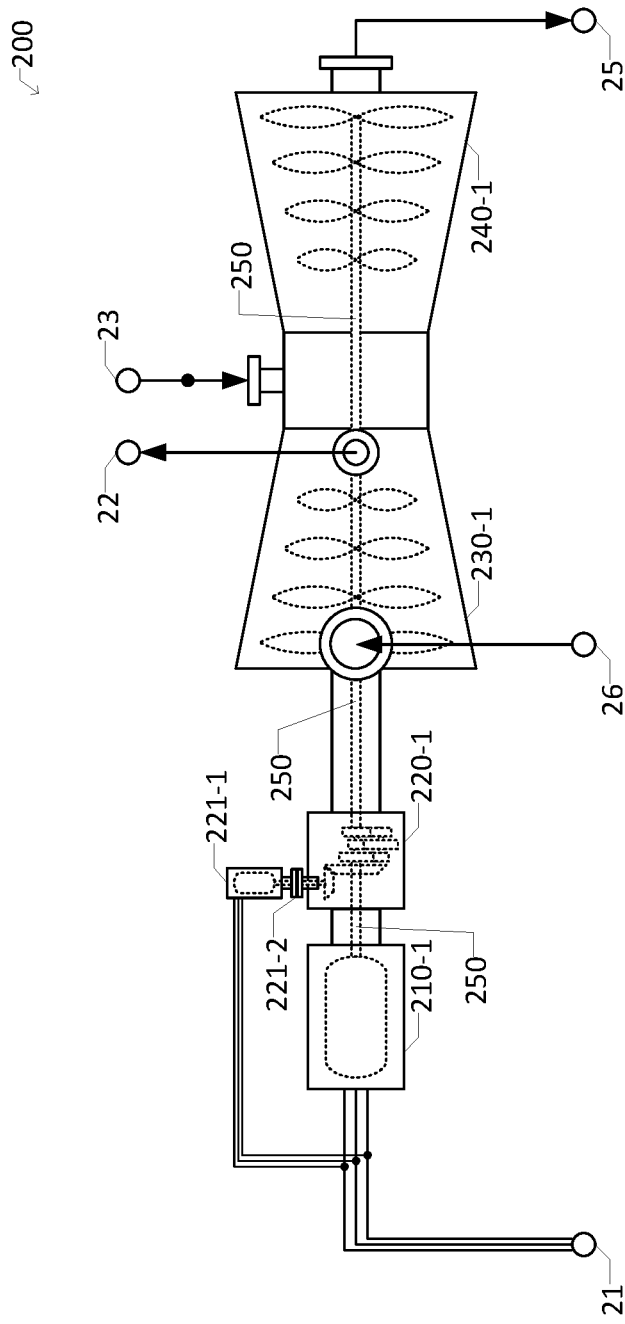
FIG. 7 is a schematic diagram of a generation powertrain ("GPT") system, according to an example embodiment.

FIG. 7 is a schematic diagram of the generation powertrain system 200, according to an example embodiment. FIG. 7 provides additional detail concerning GPT system 200 than is shown in the top-level schematic of FIG. 2. The GPT system 200 may be implemented in PHES systems disclosed herein, including the PHES system 1000 embodiment illustrated in FIG. 2. Other embodiments of a generation powertrain system operable in PHES systems disclosed herein are possible as well.

In FIG. 7, GPT system 200 includes a generator 210-1 as part of the generation system 210 of FIG. 2, a gearbox 220-1 as part of the generation gearbox system 220 of FIG. 2, a compressor 230-1 as part of generation compressor system 230, and a turbine 240-1 as part of generation turbine system 240. These components are connected via a drivetrain 250, such that the generator 210-1 is capable of being driven by the gearbox 220-1 and the turbine 240-1, and vice-versa. Depending on operational mode and system states, the generation system 210, and generator 210-1, may generate net positive electrical power that is the sent outside and/or elsewhere within the PHES system 1000. Additionally, depending on the operating condition and state, the generator 210-1 may act as a motor. For example, during spinup of the GPT system 200, the generator 210-1 may receive electrical power and drive the gearbox 220-1 and the turbomachinery. Drivetrain 250 may include a fixed connection between compressor 230-1 and turbine 240-1, and/or may include one or more shafts, flexible couplings, clutches, and/or gearboxes between compressor 230-1 and turbine 240-1.

GPT system 200 further includes a turning motor 221-1 that is capable of driving the compressor 230-1 and the turbine 240-1. Within GPT system 200, gearbox 220-1 provides a speed conversion between the generator 210-1 and turning motor 221-1 and the turbomachinery. In other embodiments of a generation powertrain system, the gearbox 220-1 may act only on one of the generator 210-1 and turning motor 221-1. Alternatively or additionally, gearbox 220-1 may act only on generator 210-1 and another gearbox (or no gearbox) may act on turning motor 221-1. In another embodiment, gearbox 220-1 may be omitted, therefore resulting in no speed conversion Turning motor 221-1 may be used for spinning GPT system 200 turbomachinery under slow roll, for example, to cool the turbine 240-1 following a shutdown, and before bringing the rotating equipment to rest. The turning motor 221-1 may be mounted to the gearbox 220-1 or the drivetrain 250 or the generator 210-1, or elsewhere, and preferably rotates the turbomachinery at a very low RPM compared to normal operational speed of the turbomachinery. The turning motor 221-1 is fitted with an overrunning clutch 221-2 that disengages when the drivetrain 250 side of the clutch is operating at higher speeds. This results in the turning motor 221-2 engaging with the drivetrain 250 when the slowing drivetrain 250 reaches the speed of the turning motor 221-1. The turning motor 221-1 will then maintain the slow roll speed.

GPT system 200 may send electrical power out of, and receive power into, the subsystem via electrical interconnect 21 and via power interface 2002. Depending on operational mode, state, and embodiment configuration, the power interface 2002 may receive electrical power from the generator 210-1 via electrical interconnect 21A and send electrical power to an external source, such as an electrical grid or other load via electrical interconnect 27. The power interface 2002 may also send electrical power from an electrical grid or other source to GPT system 200. The power interface 2002 may alternatively or additionally route power received from the GPT system 200 to the CPT system 100.

Depending on operational mode and state, compressor 230-1 may raise the pressure of working fluid flowing through the compressor 230-1 by using rotational energy transmitted through the drivetrain 250 from, e.g., the turbine 240-1. For example, during a generation mode (e.g., generation 1004 in FIG. 10), compressor 230-1 will compress working fluid flowing through it. As another example, during a slow rolling mode (e.g., GPT slow rolling 1054 in FIG. 14), the compressor 230-1, though spinning (e.g., via torque from the turning motor 221-1), may not cause an operationally significant increase in pressure of the working fluid. Compressor 230-1 has a fluid inlet which connects to fluid interconnect 26 and allows working fluid to enter the low-pressure side of the compressor 230-1. Compressor 230-1 also has a fluid outlet which connects to fluid interconnect 22 and allows working fluid to exit the high-pressure side of the compressor 230-1. The schematic illustration represented in FIG. 7 is not meant to limit the GPT system 200 to a particular arrangement. For example, the turning motor 221-1 may be oriented differently or located at a different location where it is still capable of turning the drivetrain 250. As another example, inlets and outlets to the turbomachinery may be located at sides other than the top, side, and ends depicted.

As previously disclosed, a VFD (e.g., VFD 214 in FIG. 9) may be shared between the CPT system 100 and the GPT system 200. In one embodiment, the VFD may be utilized for startup and slow-rolling of the system only and is configured to exert only positive loads on the drivetrain 250. For example, VFD 214 may provide variable frequency power to generator 210-1 during GPT system 200 startup.

Depending on operational mode and state, turbine 240-1 may reduce the pressure (e.g., through expansion) of working fluid flowing through the turbine 240-1, and energy derived from that pressure reduction may be transformed into rotational energy in the drivetrain 250. In some modes and states, that rotational energy may be used to rotate the compressor 230-1 and/or generate electrical power at the generator 210-1. Turbine 240-1 has one or more fluid inlets which connect to fluid interconnect 23 and allow working fluid to enter the high-pressure side of the turbine 240-1. Turbine 240-1 also has a fluid outlet which connects to fluid interconnect 25 and allows working fluid to exit the low-pressure side of the turbine 240-1.

C. Site Integration Subsystem

Figure 9:
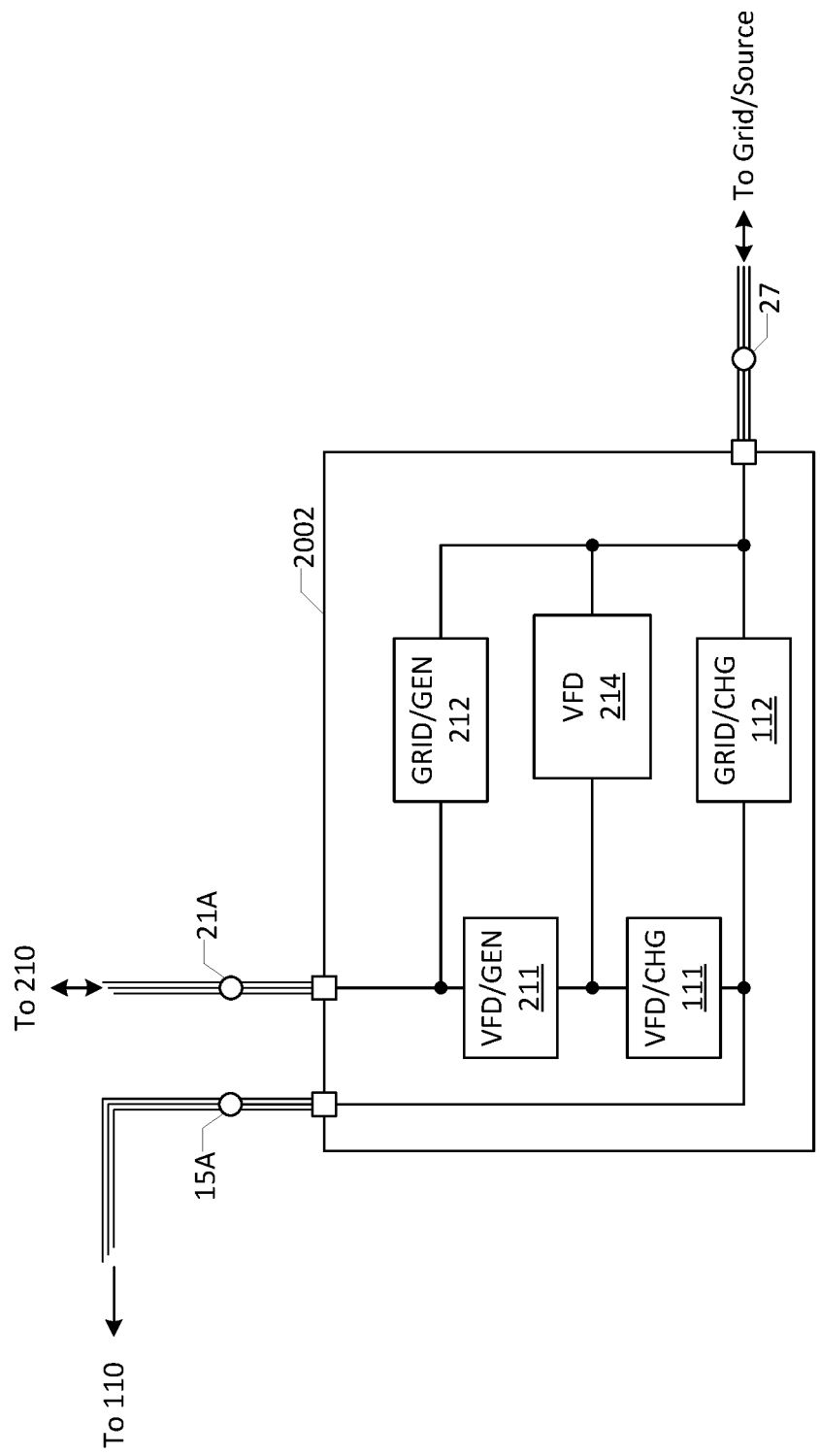
FIG. 9 is a schematic electrical diagram of a power interface, according to an example embodiment.

FIG. 9 is a schematic electrical diagram of a power interface, according to an example embodiment, that can be implemented in power interface 2002 in site integration subsystem 2000. Power interface 2000 includes a VFD 214, a VFD-to-generator breaker 211, a generator-to-grid breaker 212, a VFD-to-charge-motor breaker 111, and a charge-motor-to-grid breaker 112, with each component in power interface 2002 electrically connected as illustrated. Breakers can be set to closed or open mode and may be remotely controlled. Other embodiments of a power interface may include additional or fewer breakers, additional or fewer VFDs, different electrical connections, and/or additional components.

For spinning up the GPT system 200, VFD-to-generator breaker 211 can be closed to connect VFD 214 to generation system 210 (e.g., generator 210-1 and/or turning motor 221-1), thus routing power from an external source via electrical interconnect 27, through VFD 214, through breaker 211, and to generation system 210. For generation mode, generator-to-grid breaker 212 can be closed to connect generation system 210 (e.g., generator 210-1) to an external electrical grid or other external load through electrical interconnects 21A and 27. For spinning up the CPT system 100, VFD-to-charge-motor breaker 111 can be closed to connect VFD 214 to the motor system 110 (e.g., motor 110-1 and/or turning motor 121-1) in the CPT system 100 through electrical interconnects 15A and 27. For charge mode, charge-motor-to-grid breaker 112 can be closed to connect motor system 110 (e.g., motor 110-1) in the CPT system 100 to an external electrical grid or other electrical power source through electrical interconnects 15A and 27.

D. Main Heat Exchanger Subsystem

Figure 6A:
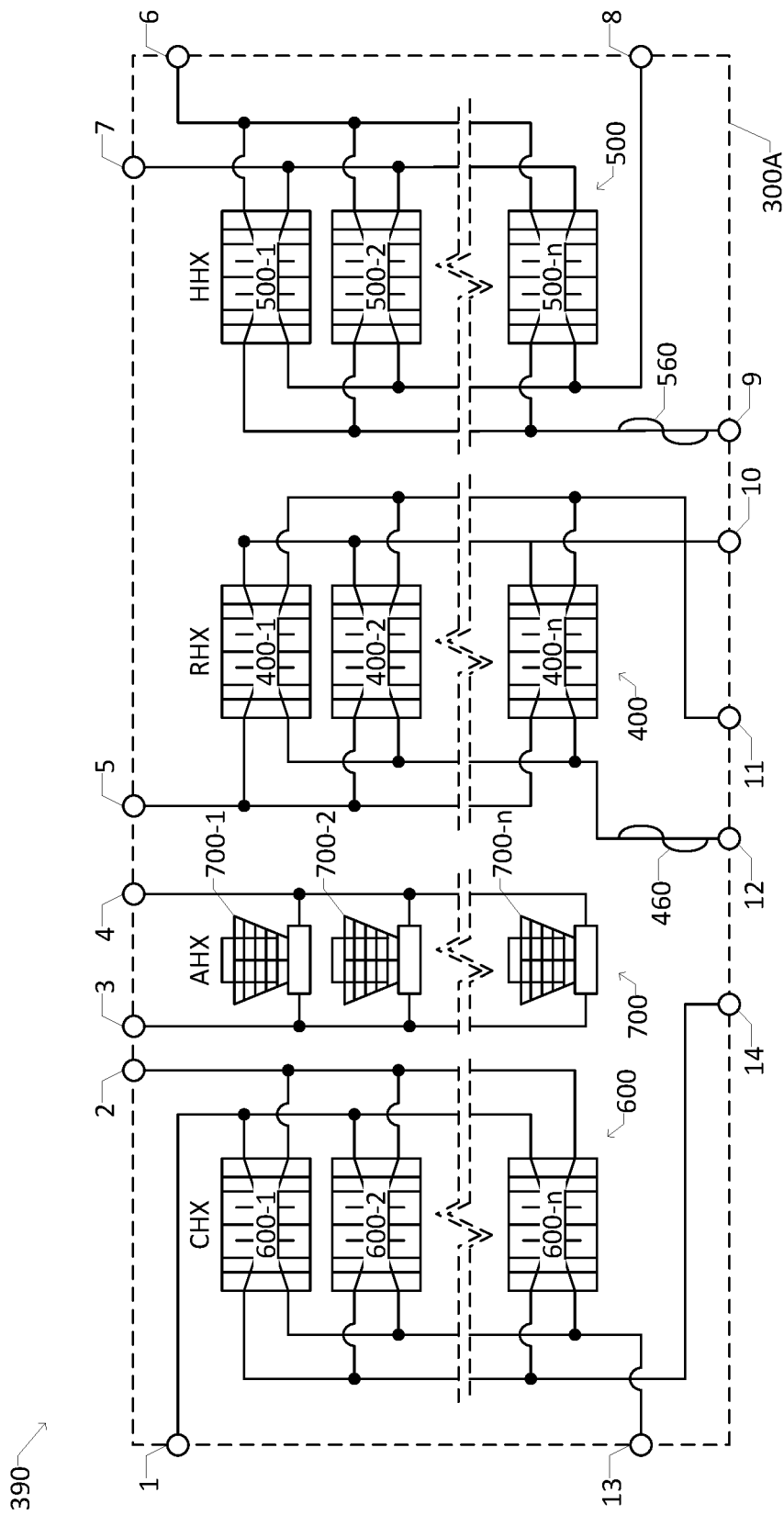
FIG. 6A is a schematic fluid path diagram of a main heat exchanger system, according to an example embodiment.
Figure 6B:
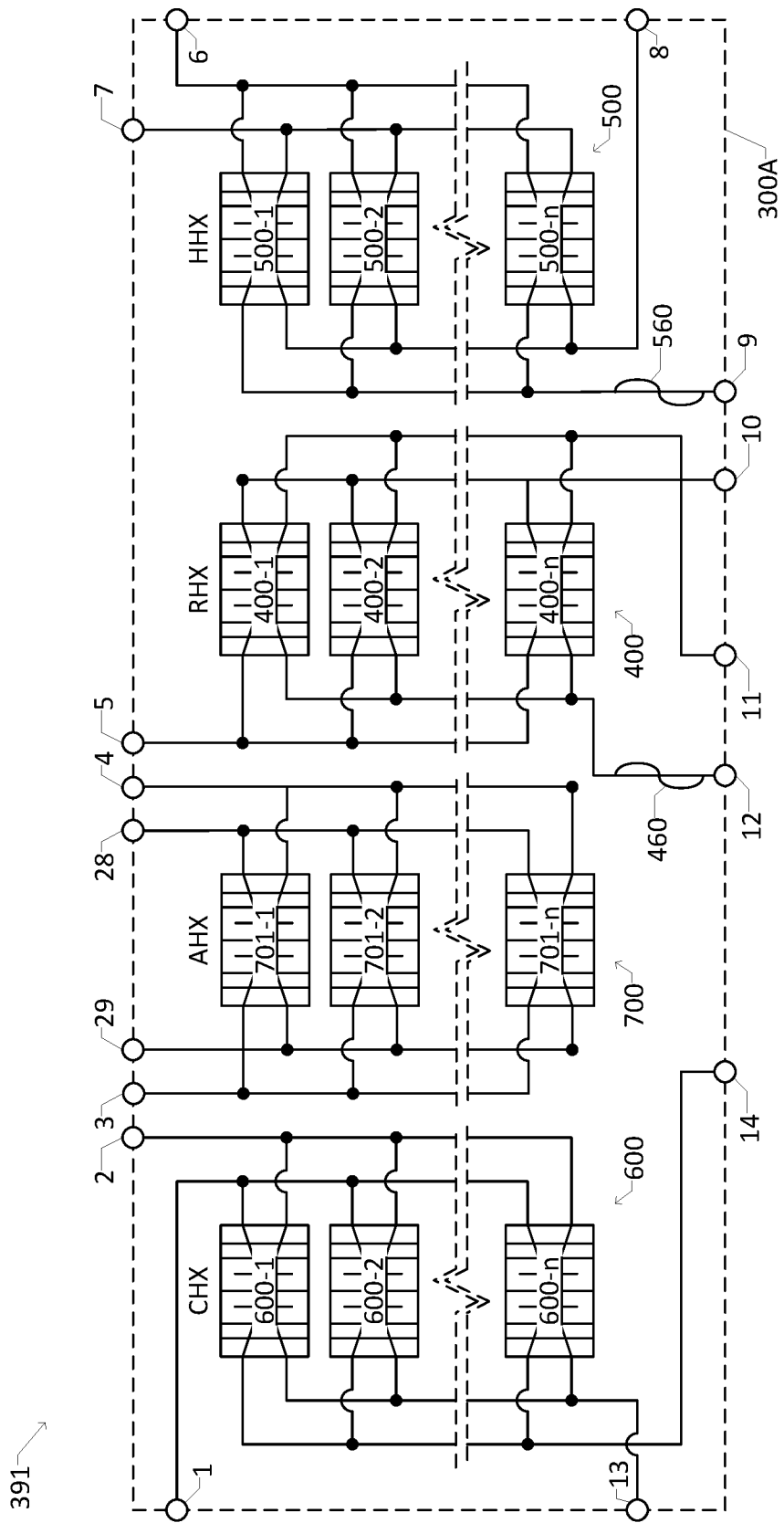
FIG. 6B is a schematic fluid path diagram of a main heat exchanger system, according to an example embodiment.

FIGS. 6A and 6B are schematic fluid path diagrams of example embodiments of main heat exchanger systems, that can be implemented as main heat exchanger system in a PHES system (e.g., PHES system 1000). FIGS. 6A and 6B provide additional details, in separate embodiments, concerning main heat exchanger system 300A than is shown in the top-level schematic of FIG. 2.

The main heat exchanger system 390 embodiment in FIG. 6A and/or the main heat exchanger system 391 embodiment in FIG. 6B can be implemented as the main heat exchanger system 300A in PHES system 1000, or other disclosed PHES systems. Other main heat exchanger system embodiments are also possible. References herein to main heat exchanger system 300A can be understood with reference to embodiments 390 and/or 391.

In general terms, main heat exchanger system 300A consists of four different heat exchanger systems, but all operate together within a PHES system, such as PHES system 1000, to provide the desired operating conditions for operational modes. Each heat exchanger system consists of one or more heat exchanger units that may be connected via manifolds and/or other fluid routing systems.

The main heat exchanger system 300A has two major modes of operation, mirroring the PHES system main modes of operation. During PHES system generation (e.g., generation 1004 in FIG. 10), the heat exchangers operate in a forward flow direction at a flow rate between a maximum power (operational maximum) mass flow rate and a maximum turndown (operational minimum) mass flow rate. In this generation mode, heat is transferred from an HTS medium to a working fluid at HHX system 500, from the working fluid to a CTS medium at CHX system 600, from a low-pressure working fluid stream to a high-pressure working fluid stream at RHX system 400, and from the working fluid to the ambient environment or other heat sink at AHX system 700. During PHES system charge (e.g., charge 1002 in FIG. 10), the heat exchangers operate in the reverse flow direction at a flow rate between the maximum power mass flow rate and the maximum turndown mass flow rate. In this process, heat is transferred from the working fluid to the HTS medium at HHX system 500, from the CTS medium to the working fluid at CHX system 600, and from a high-pressure working fluid stream to a low-pressure working fluid stream at RHX system 400.

Under some PHES system modes, such as a long term Cold Dry Standby 1010 (see FIG. 10), the HTS medium and the CTS medium in the main heat exchanger system 300A is drained to thermal reservoirs (e.g., CTS system 691 and/or 692, and/or HTS system 591 and/or 592). In such a scenario, heat traces may be used to ensure that the HTS medium does not freeze.

Main heat exchanger system 300A includes CHX system 600. A function of CHX system 600 is to transfer heat between a CTS medium and a working fluid. As illustrated in FIGS. 6A and 6B, embodiments of CHX system 600 can include differing amounts of cold-side heat exchangers ("CHX") depending on design requirements. CHX system 600 is illustrated as including cold-side heat exchangers 600-1, 600-2, through 600-$n$, which reflect in these example embodiments 390, 391 at least three CHX and can include more than three CHX, although other PHES system embodiments may have less than three CHX. In some embodiments, as illustrated in FIGS. 6A and 6B, each of CHX 600-1 through 600-$n$ is a cross-flow heat exchanger. Specifically, a CTS medium flows through each of CHX 600-1 through 600-$n$ between fluid interconnect 1 and fluid interconnect 13. Additionally, a working fluid flows through each of CHX 600-1 through 600-$n$ between fluid interconnect 2 and fluid interconnect 14. In another embodiment, one or more CHX may not be cross-flow, and may have another internal fluid routing arrangement; however, CTS flow between interconnects 1, 13 and working fluid flow between interconnects 2, 14 is maintained.

As illustrated in FIGS. 6A and 6B, each of CHX 600-1 through 600-$n$ is connected in parallel to the CTS medium and working fluid flows, respectively, with respect to each other CHX. In another embodiment, one or more CHX may be connected in series with one or more CHX. In another embodiment, one more groups of CHX may be connected in parallel, and one or more groups of CHX may be connected in series. In another embodiment, individual CHX and/or groups of CHX may be combined in various combinations of series and parallel configurations.

Main heat exchanger system 300A includes HHX system 500. A function of HHX system 500 is to transfer heat between an HTS medium and a working fluid. Embodiments of HHX system 500 can include differing amounts of hot-side heat exchangers ("HHX") depending on design requirements. HHX system 500 is illustrated as including hot-side heat exchangers 500-1, 500-2, through 500-$n$, which reflect in these example embodiments 390, 391 at least three HHX and can include more than three HHX, although other PHES system embodiments may have less than three HHX. In some embodiments, as illustrated in FIGS. 6A and 6B, each of HHX 500-1 through 500-$n$ is a cross-flow heat exchanger. Specifically, an HTS medium flows through each of HHX 500-1 through 500-$n$ between fluid interconnect 6 and fluid interconnect 8. Additionally, a working fluid flows through each of HHX 500-1 through 500-$n$ between fluid interconnect 7 and fluid interconnect 9. In another embodiment, one or more HHX may not be cross-flow, and may have another internal fluid routing arrangement; however, HTS flow between interconnects 6, 8 and working fluid flow between interconnects 7, 9 is maintained.

As illustrated in FIGS. 6A and 6B, each of HHX 500-1 through 500-$n$ is connected in parallel to the HTS medium and working fluid flows, respectively, with respect to each other HHX. In another embodiments, one or more HHX may be connected in series with one or more HHX. In another embodiments, one more groups of HHX may be connected in parallel, and one or more groups of HHX may be connected in series. In another embodiment, individual HHX and/or groups of HHX may be combined in various combinations of series and parallel configurations.

Main heat exchanger system 300A includes RHX system 400. A function of RHX system 400 is to transfer heat between a high-pressure working fluid stream and a low-pressure working fluid stream. Embodiments of RHX system 400 can include differing amounts of recuperator heat exchangers ("RHX") depending on design requirements. In FIGS. 6A and 6B, RHX system 400 is illustrated as including recuperator heat exchangers 400-1, 400-2, through 400-$n$, which reflect at least three RHX and can include more than three RHX in these example embodiments, 390, 391 although other PHES system embodiments may have less than three RHX. In some embodiments, as illustrated in FIGS. 6A and 6B, each of RHX 400-1 through 400-$n$ is a cross-flow heat exchanger. Specifically, working flows through each of RHX 400-1 through 400-$n$ between fluid interconnect 5 and fluid interconnect 11. Additionally, the working fluid in a different part of the working fluid loop flows through each of RHX 400-1 through 400-$n$ between fluid interconnect 10 and fluid interconnect 12. In another embodiment, one or more RHX may not be cross-flow, and may have another internal fluid routing arrangement; however, working fluid flow between interconnects 5, 11 and working fluid flow between interconnects 10, 12 is maintained.

As illustrated in FIGS. 6A and 6B, each of RHX 400-1 through 400-$n$ is connected in parallel to the working fluid flows with respect to each other RHX. In another embodiments, one or more RHX may be connected in series with one or more RHX. In another embodiments, one more groups of RHX may be connected in parallel, and one or more groups of RHX may be connected in series. In another embodiment, individual RHX and/or groups of RHX may be combined in various combinations of series and parallel configurations.

Main heat exchanger system 300A includes AHX system 700. A function of AHX system 700 is to transfer heat from a working fluid to the ambient environment, or other external heat sink, during generation mode. In one embodiment, the AHX system 700 will only be operational during PHES system generation (e.g., generation 1004 in FIG. 10). For example, during PHES system charge (e.g., charge 1002 in FIG. 10), the AHX system 700 will be bypassed, as further discussed herein.

Embodiments of AHX system 700 can include differing configurations and amounts of ambient heat exchangers ("AHX") (also referred to as ambient coolers) depending on design requirements. In embodiment 390 in FIG. 6A, AHX system 700 is illustrated as including ambient heat exchangers 700-1, 700-2, through 700-n, which reflect at least three AHX in this example embodiment and can include more than three AHX, although other PHES system embodiments may have less than three AHX. In a preferred embodiment, AHX system 700 includes only one AHX, e.g., AHX 700-1. In embodiment 390, as illustrated in FIG. 6A, each of AHX 700-1 through 700-n is an ambient cooler that exhausts heat to the environment from the working fluid flowing through the AHX between fluid interconnects 4 and 3. In the embodiment of FIG. 6A, fluid interconnects 28, 29 are not utilized. In the embodiment of FIG. 6A, individual AHX may include one or more variable-speed fans that can be controlled to adjust ambient air flow across the AHX in order to reach a desired working fluid outlet temperature of the AHX system 700. As illustrated in FIG. 6A, each of AHX 700-1 through 700-n is connected in parallel to the working fluid flow with respect to each other AHX. In another embodiments, one or more AHX may be connected in series with one or more AHX. In another embodiments, one more groups of AHX may be connected in parallel, and one or more groups of AHX may be connected in series. In another embodiment, individual AHX and/or groups of AHX may be combined in various combinations of series and parallel configurations.

In embodiment 391 in FIG. 6B, AHX system 700 is illustrated as including ambient heat exchangers 701-1, 701-2, through 701-n, which reflect at least three AHX in this example embodiment and can include more than three AHX, although other PHES system embodiments may have less than three AHX. In a preferred embodiment, AHX system 700 includes only one AHX, e.g., AHX 701-1. In embodiment 391, as illustrated in FIG. 6B, each of AHX 701-1 through 701-n is a cross-flow heat exchanger. Specifically, a heat sink fluid flows through each of AHX 701-1 through 701-n between fluid interconnect 28 and fluid interconnect 29. Additionally, a working fluid flows through each of AHX 701-1 through 701-n between fluid interconnect 4 and fluid interconnect 3. In the embodiment of FIG. 6B, the heat sink fluid may be ambient air that is pulled from and/or is exhausted to the environment, or the heat sink fluid may be a fluid that is pulled from a heat sink fluid reservoir (not shown) and/or sent to heat sink fluid reservoir (not shown) or other heat sink (not shown), such as a thermal waste heat capture/transfer system. In embodiment 391 of FIG. 6B, heat sink fluid mass flow rate through the AHXs may be adjusted in order to reach a desired working fluid outlet temperature of the AHX system 700. As illustrated in FIG. 6B, each of AHX 701-1 through 701-n is connected in parallel to the working fluid flow with respect to each other AHX. In another embodiments, one or more AHX may be connected in series with one or more AHX. In another embodiments, one more groups of AHX may be connected in parallel, and one or more groups of AHX may be connected in series. In another embodiment, individual AHX and/or groups of AHX may be combined in various combinations of series and parallel configurations.

Main heat exchanger system 300A, as illustrated in embodiment 390 and 391 in FIGS. 6A and 6B, may include heat traces 460 and 560 as part of the RHX system 400 and HHX system 500, respectively. A function of heat trace 460 is to maintain fluid manifolds and/or other metal mass at desired setpoint temperatures during various modes and/or states, for example, in order to reduce thermal gradients on sensitive components. A function of heat trace 560 is to maintain fluid manifolds and/or other metal mass at desired setpoint temperatures during various modes and/or states, for example, in order to avoid freezing (i.e., phase change) of HTX medium in the HHX system 500 and/or to reduce thermal gradients on sensitive components. Each of the heat traces 460 and 560 can function to reduce thermal ramp rates, which benefits heat exchanger longevity, and allows for faster PHES system 1000 startup times. Heat traces 460 and 560 are illustrated as near fluid interconnects 12 and 9, respectively. However, heat traces 460 and 560 can be located at other locations within RHX system 400 and HHX system 500 in order to accomplish their functions. Additionally or alternatively, heat traces 460 and 560 can include heat traces at multiple locations within RHX system 400 and HHX system 500 in order to accomplish their functions.

E. Working Fluid Loop Subsystem

FIG. 3 is a schematic fluid path diagram of a working fluid loop 300 which may be implemented in a PHES system, such as PHES system 1000, according to an example embodiment. FIG. 3 provides additional detail concerning working fluid loop 300 than is shown in the top-level schematic of FIG. 2. In general terms, the working fluid loop 300 includes, for example, high-pressure fluid paths and low-pressure fluid paths separated by the turbomachinery, turbomachinery bypass and recirculation loops, heat exchangers (e.g., excess heat radiators), valves, pressure relief devices, working fluid supply components (e.g., working fluid compressor), an inventory control system including working fluid tank systems (e.g., high pressure tank systems and low pressure tank systems), and sensors for pressure, temperature, flow rate, dewpoint, speed, and/or fluid concentration. Other embodiments of a working fluid loop operable in PHES systems disclosed herein are possible as well.

Figure 3N:
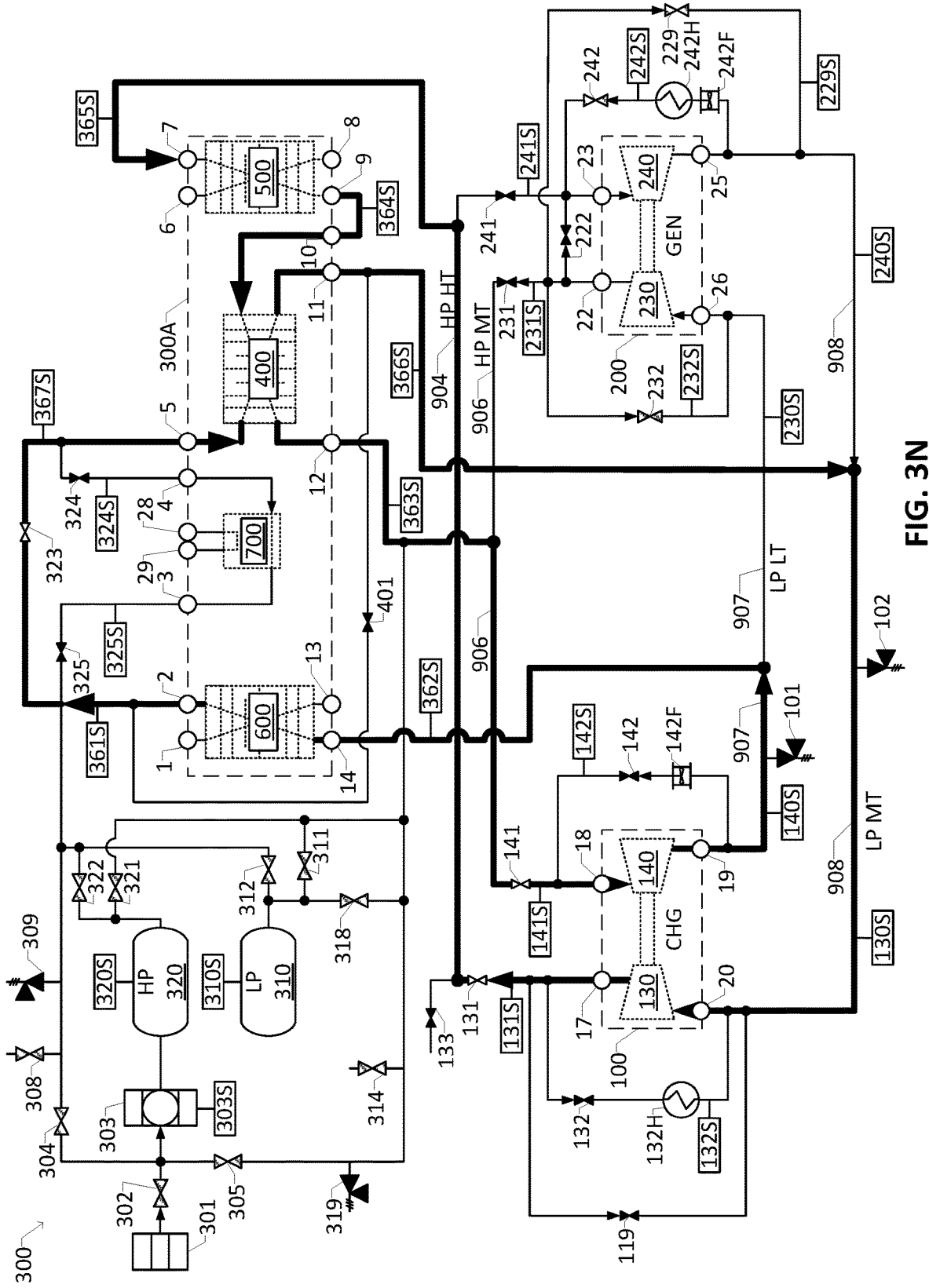
FIG. 3N is a schematic fluid path diagram of circulatory flow paths during charge mode.
Figure 3O:
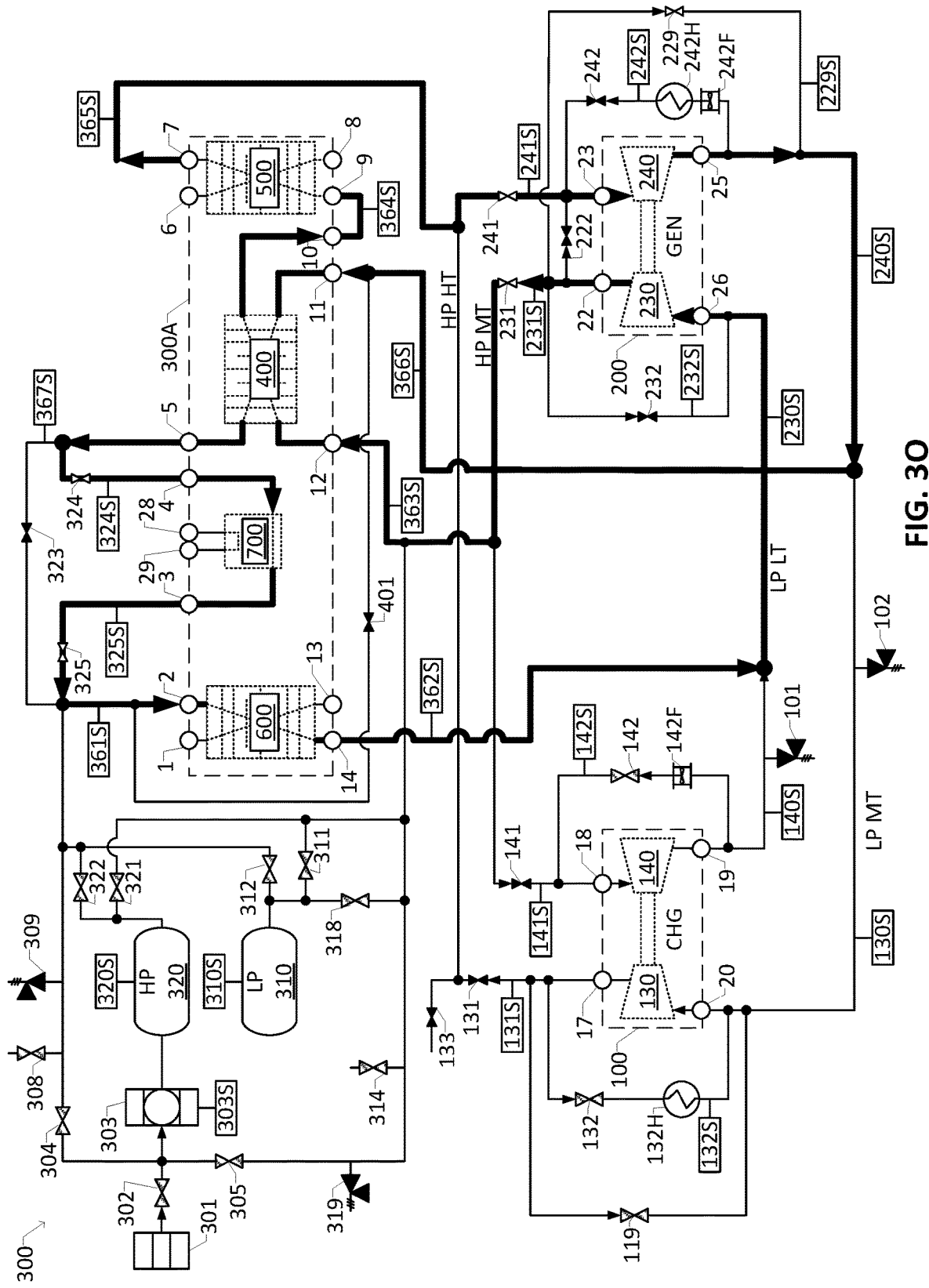
FIG. 3O is a schematic fluid path diagram of circulatory flow paths during generation mode.

FIG. 3N and FIG. 3O illustrate circulatory flow paths of working fluid in working fluid loop 300 for charge mode 1002 and generation mode 1004, respectively. Bold fluid paths illustrate the circulatory flow paths and arrows on bold fluid paths indicate circulatory flow direction. Working fluid may be resident in other fluid paths, but is not actively circulating because such other fluid paths do not form a circulatory circuit with an inlet and outlet (i.e., they are a dead end). Valve positions are indicated with a filled valve icon representing a closed valve, an unfilled valve icon representing an open valve, and a cross-hatched valve representing a valve that may change position state without affecting the illustrated circulatory flow path. For example, in FIG. 3N, valve 231 is closed, valve 131 is open, and valve 242 may change position state without affecting the flow path.

The embodiment of working fluid loop 300 illustrated in FIG. 3 can serve numerous roles within PHES system 1000. The working fluid loop 300 can route working fluid between the turbomachinery and the heat exchangers. The working fluid loop 300 can provide working fluid to the main heat exchanger system 300A for transferring heat between HTS medium and CTS medium during, for example, charge or generation cycles. The working fluid loop 300 can protect the turbomachinery during emergency trip events, and help with compressor surge prevention and overpressure prevention. The working fluid loop 300 can maintain its pressures (e.g., pressures in low-pressure and high-pressure fluid paths) below specified set points for each mode of PHES system operation. The working fluid loop 300 can help with smooth PHES system 1000 startup and shutdown, including, for example, working fluid bypass flow during generation cycle startup to prevent bidirectional loads/demands on a VFD. The working fluid loop 300 can quickly bring working fluid pressures down to allow mode switching operation within short time intervals. The working fluid loop 300 can maintain working fluid loop pressures at or above a minimum working fluid loop base pressure, such as whenever CHX system 600 or HHX system 500 are filled with their respective CTS or HTS media, for example, to prevent leakage of CTS or HTS media into the working fluid loop 300. The working fluid loop 300 can adjust low-side pressure in the working fluid loop between a minimum pressure and working pressures (i.e. pressures during charge and generation), as a means of controlling PHES system power. The working fluid loop 300 can regulate circulate working fluid mass, for example to control PHES system pressures, PHES system power, and/or compensate for working fluid losses from the working fluid loop over time.

The following paragraphs describe components of the working fluid loop 300:

Pressure relief device 101 is a pressure relief device on a low-pressure low-temperature ("LPLT") portion of the working fluid loop 300. It protects from overpressure the LPLT portion of the working fluid loop in the vicinity, for example, where high-pressure working fluid could be introduced through the turbomachinery, recirculation valves, or bypass valves.

Pressure relief device 102 is a pressure relief device on a low-pressure medium-temperature ("LPMT") portion of the working fluid loop 300. It protects from overpressure the LPMT portion of the working fluid loop 300 in the vicinity, for example, where high-pressure working fluid could be introduced through the turbomachinery, recirculation valves, and/or bypass valves.

Valve 119 regulates a high-flow recirculation fluid path around compressor system 130 that can be opened, for example, to reduce and/or prevent surge in charge compressor system 130. For example, valve 119 may be opened following a trip event during charge mode operation or when valve 131 is closed. In an embodiment where valve 132 is sufficiently large, valve 119 can be omitted.

Valve 131 is a charge compressor system 130 shutoff valve that, when closed, isolates charge compressor system 130 from the high-pressure side of the working fluid loop 300, for example, during generation mode or following a trip event. Valve 131 preferably fails closed. A benefit of valve 131 is that it can be closed to isolate the compressor system 130 from the large, high-pressure working fluid volume that is present in fluid paths on the side of valve 131 opposite the compressor system 130. That large volume could cause the compressor system 130 (e.g. compressor 130-1) to surge if the compressor system 130 (e.g. compressor 130-1) were to spin down following a power loss or unexpected trip scenario in the PHES system 1000.

Valve 132 regulates a recirculation fluid path around compressor system 130 that can be opened, for example, to recirculate working fluid driven by charge compressor system 130 during, for example, cooldown (e.g., during slow rolling) or after a mode switch. Valve 132 may exhibit slow response time and preferably fails open. A benefit of failing open is that a valve failure does not prevent compressor system 130 cooldown, which is beneficial to prevent damage to the compressor system 130.

Heat exchanger 132H is a radiator in the recirculation fluid path regulated by valve 132 and removes heat (e.g., to ambient) from the working fluid recirculating through charge compressor system 130, for example, following the end of charge mode operation.

Valve 133 is a working fluid dump valve located downstream of the charge compressor system 130 and isolation valve 131. Valve 133 may be, for example, used to reduce the working fluid pressure in the vicinity of the outlet of compressor 130 during certain events, for example trip events during charge mode 1002. Opening valve 133 dumps working fluid to ambient, or a working fluid reservoir (not shown), and decreases working fluid pressure in the vicinity of the outlet of compressor 130, which beneficially reduces the risk of compressor system 130 surge.

Valve 141 is a charge turbine system 140 shutoff valve that, when closed, isolates charge turbine system 140 from the high-pressure side of the working fluid loop 300, for example, during generation mode or following a trip event. Valve 141 preferably fails closed. A benefit of valve 141 is that it can be closed, in conjunction with closing valve 131, to prevent working fluid mass moving from the high-pressure side of the main working fluid loop 300 to the low-pressure side of the working fluid loop 300, which could result in the working fluid loop 300 equilibrating in pressure to a settle-out pressure greater than the pressure rating of components in the low-pressure side of the loop.

Valve 142 regulates a recirculation fluid path around charge turbine system 140 that can be opened, for example, to recirculate working fluid through turbine system 140 during, for example, turning (e.g., slow rolling) or after a mode switch. Valve 142 may exhibit slow response time and preferably fails open. A benefit of valve 142 is that it can be opened to prevent the inlet pressure of the charge turbine system 140 from dropping substantially below the outlet pressure of the turbine system 140 upon closing valve 141, which is beneficial because it prevents the turbine system 140 from operating outside typical design specifications for pressure differentials.

Fan 142F can be operated, when valve 142 is open, to provide recirculation flow of working fluid through the turbine 140 via the recirculation loop controlled by valve 142. This is beneficial, for example, when the spinning turbine system 140 does not create appreciable working fluid flow through the turbine system 140 and consequently experiences windage. Fan 142 can be turned on to create working fluid flow through the turbine system 140 via the recirculation loop to alleviate the windage.

Valve 222 regulates a bypass fluid path that can be opened, for example during generation mode, to provide a working fluid bypass path around the high-pressure side of RHX system 400 and HHX system 500, thereby allowing some amount of working fluid flow through the bypass fluid path instead of through RHX system 400 and HHX system 500. Opening valve 222, preferably in conjunction with closing valves 231 and 241, removes energy (in the form of hot compressed working fluid) that is supplied to the turbine system 240, thereby starving turbine system 240. Beneficially, valve 222 can be opened, for example, when the GPT system 200 experiences a loss of load event (e.g., from the electric grid) or a trip event. Closing valves 231 and 241 and opening of 222 collectively can prevent overspeed of the GPT system 200 as a result of turbine system 240 overspeed.

Valve 229 regulates a bypass fluid path that can be opened to provide a high-flow working fluid bypass path around the high-pressure side of RHX system 400, HHX system 500, and turbine system 240, thereby allowing some amount of working fluid flow through the bypass fluid path instead of through RHX system 400, HHX system 500, and turbine system 240. Beneficially, valve 229 can be opened to reduce load during startup of generation mode and to prevent generation turbine system 240 from generating substantial power during startup of generation mode. Opening valve 229 reduces a net load required of the generator system 210 (e.g., generator 210-1 acting as a motor) during generation mode startup. Opening valve 229 reduces the compressor system 230 power need by reducing outlet pressure at the compressor system 230. Opening valve 229 also starves the turbine system 240 of much of its fluid flow so that the turbine system 240 does not produce substantially more power than the compressor system 230. By keeping a low, but net positive, electrical power demand from generator system 210 (e.g., generator 210-1 acting as a motor) means that a VFD (e.g., VFD 214) supplying power to the generator system 210 can maintain speed control during startup/spin-up. Opening valve 229 also provides a high-flow fluid path to prevent surge in compressor system 230, for example, following a trip event out of generation mode operation and when valve 231 is closed.

Valve 231 is a generation compressor system 230 shutoff valve that, when closed, isolates generation compressor system 230 from the high-pressure side of the working fluid loop during charge mode operation or following a trip event. Valve 231 preferably fails closed. A benefit of valve 231 is that it can be closed to isolate the compressor system 230 from the large high-pressure working fluid volume that is present in fluid paths on the side of valve 231 opposite the compressor system 230. That large volume could cause the compressor system 230 (e.g. compressor 230-1) to surge if the compressor system 230 (e.g. compressor 230-1) were to spin down following a power loss or unexpected trip scenario in the PHES system 1000.

Valve 232 regulates a recirculation fluid path around generation compressor system 230 that can be opened, for example, to recirculate working fluid driven by generation compressor system 230 during, for example, turning or after a mode switch. Valve 232 may exhibit slow response time and preferably fails open. A benefit of valve 232 failing open is that it allows for turbomachinery temperature equilibration upon failure; for example, failure during a during a post-shutdown spinning mode allows cooldown of hot portions of the compressor system 230 and warmup of the inlet side of the compressor system 230.

Valve 241 is generation turbine system 240 shutoff valve that, when closed, isolates generation turbine system 240 from the high-pressure side of the working fluid loop 300 during, for example, charge mode operation or following a trip event. In practical effect, closing valve 241 can starve turbine system 240 and prevent GPT system 200 overspeed. Valve 241 preferably fails closed. A benefit of valve 241 is that can be closed to isolate a source of high-pressure working fluid that could continue to drive the turbine system 240 during, for example, a loss-of-grid-load event, which otherwise might cause an overspeed event for the GPT system 200.

Valve 242 regulates a recirculation fluid path around generation turbine system 240 that can be opened, for example, to recirculate working fluid through turbine system 240 during, for example, cooldown (e.g. during slow rolling) or after a mode switch. Valve 242 may exhibit slow response time and preferably fails open. A benefit of valve 242 failing open is that if valve 242 fails, by failing open it allows for cooldown spinning of GPT system 200 after shutdown of GPT system 200. Cooldown spinning can prevent bowing of rotating components in the turbomachinery. Another benefit of valve 242 failing open is that, when failed open, GPT system 200 can continue to function during generation (e.g., mode 1004) or slow turning (e.g., mode 1006), albeit with decreased efficiency during generation due to open valve 242 creating a bleed path for the working fluid.

Heat exchanger 242H is a radiator in the recirculation fluid path regulated by valve 242 and removes heat (e.g., to ambient) from the working fluid recirculating through turbine system 240.

Fan 242F can be operated, when valve 142 is open, to provide recirculation flow of working fluid through the turbine 240 via the recirculation loop controlled by valve 242. This is beneficial, for example, when the spinning turbine system 240 does not create appreciable working fluid flow through the turbine system 240 and consequently experiences windage. Fan 242 can be turned on to create working fluid flow through the turbine system 240 via the recirculation loop to alleviate the windage and/or for cooling down of turbine system 240 during, for example, slow rolling.

Valve 323 regulates a bypass fluid path that can be opened, for example during charge mode, to provide a working fluid bypass path around AHX system 700, thereby allowing some amount of working fluid flow through the bypass fluid path instead of through AHX system 700. Beneficially, opening valve 323, preferably in conjunction with closing valve 324 (and valve 325 if present), diverts working fluid around AHX system 700, thereby reducing working fluid loop 300 pressure drop when heat dump from the working fluid is not desired, such as during charge mode operation. Valve 323 may exhibit slow actuation time and preferably fails open. Beneficially, valve 323 preferably fails open so that working fluid loop 300 can maintain flow if working fluid valve 324 (and valve 325 if present) is closed or were to fail closed. If valve 323 and valve 324 (or valve 325 if present) are both closed, working fluid circulation in the working fluid loop 300 would stop and the loss of working fluid flow could damage turbomachinery attempting to circulate the working fluid. Additionally, if valve 323 fails open, it allows the PHES system 1000 to continue operating, albeit with a loss of efficiency in some modes. In an alternative embodiment of a working fluid loop, valve 323 may be combined with valve 324, at the junction of the fluid path exiting interconnect 5 and the fluid path entering interconnect 4 in generation mode, as a two-position, three-way valve to accomplish the same effect as the two valves 323, 324.

Valve 324 is an isolation valve that, when closed, isolates AHX system 700 from circulation of working fluid through AHX system 700, for example during charge mode. If valve 325 is present, both valves 324 and 325 may be closed to completely isolate AHX system 700 from working fluid, for example during charge mode and/or service. Valve 324 may exhibit slow actuation time and preferably fails to current position or alternately fails open. Beneficially, if valve 324 fails to current position, the PHES system 1000 can continue its current operation. Alternatively, valve 324 can be specified to fail open for the reasons described above with respect to valve 323.

Valve 325 is an isolation valve that, when closed, isolates AHX system 700 from circulation of working fluid through AHX system 700, for example during charge mode. Valve 325 may exhibit slow actuation time and preferably fails to current position. Beneficially, if valve 325 fails to current position, the PHES system 1000 can continue its current operation. In an alternative embodiment, valve 325 may be omitted from working fluid loop 300. FIGS. 3K, 3L and their corresponding disclosure illustrate that embodiment. In this alternate embodiment with valve 325 omitted, closing valve 324 and opening valve 323 will cause working fluid to not circulate through AHX system 700, and instead bypass AHX system 700 through valve 323. However, omitting valve 325 means that AHX system 700 cannot be fully isolated from the working fluid loop 300, as it will see resident working fluid.

Filter 301 is a working fluid filter (or pre-filter) for working fluid compressor 303 that provides filtration of working fluid entering the working fluid loop 300 from an outside source, such as ambient air when air is the working fluid or for a working fluid that is stored in an outside working fluid make-up reservoir (not shown). Filter 301 may act as a pre-filter if working fluid compressor 303 also contains filters.

Valve 302 is a working fluid compressor 303 feed valve that, when opened, provides the ability for the working fluid compressor 303 to pull working fluid from ambient or an outside working fluid make-up reservoir (not shown). When closed, valve 302 provides the ability for the working fluid compressor 303 to pull working fluid from the working fluid loop 300 (e.g., from evacuation lines via the fluid paths through valve 304 or valve 305).

Working fluid compressor 303 is a make-up working fluid compressor. When activated, working fluid compressor 303 can, depending on valve states, provide working fluid for inventory control system ("ICS") 300B storage tank systems 310 and/or 320. Additionally or alternatively, when activated, working fluid compressor 303 can, depending on valve states, replenish working fluid loop 300 with working fluid lost through leakage or venting. Additionally or alternatively, when activated, working fluid compressor 303 can, depending on valve states, evacuate working fluid loop 300 to reduce pressure below what ICS 300B valve arrangements can accomplish when lowering the working fluid loop 300 pressure below the settle-out pressure for startup. This is beneficial because working fluid loop 300 is preferably partially evacuated in order to drop working fluid loop 300 pressure when one powertrain (e.g., CPT system 100 or GPT system 200) has spun down and the other power train is spinning up. For example, if PHES system 1000 is coming out of charge mode 1002 and CPT system 100 has just spun down, it is desirable to lower the working fluid loop 300 pressure so that GPT system 200 can start to spin up. "Settle-out" pressure can be interpreted as the resulting pressure in the working fluid loop 300 if working fluid mass were allowed to move from the high-pressure side of the working fluid loop 300 to the low-pressure side of the working fluid loop 300 to the point where the pressure on both sides equilibrated. Additionally or alternatively, when activated, working fluid compressor 303 can, depending on valve states, counteract hysteresis in the functioning of ICS 300B by pumping working fluid mass from the low-pressure side of the working fluid loop 300 to high-pressure tank system 320.

Valve 304 is a feed valve for the working fluid compressor 303 on a low-pressure-side evacuation fluid path of working fluid loop 300. Valve 304, when open, connects the low-pressure side of working fluid loop 300 to working fluid compressor 303 for pulling working fluid from working fluid loop 300 into ICS 300B high-pressure tank system 320.

Valve 305 is a feed valve for the working fluid compressor 303 on a high-pressure-side evacuation fluid path of working fluid loop 300. Valve 305, when open, connects the high-pressure side of working fluid loop 300 to working fluid compressor 303 for pulling working fluid from working fluid loop 300 into ICS 300B high-pressure tank system 320.

Valve 308 is an evacuation valve on the low-pressure side of working fluid loop 300. Valve 308, when open, allows working fluid in the working fluid loop 300 to be evacuated to the environment or an outside working fluid make-up reservoir (not shown). Valve 308 is primarily for servicing of working fluid loop 300, but can also be used for inventory control purposes (e.g., reducing working fluid mass in working fluid loop 300) related to power generation mode 1004, charge mode 1002, or other operations.

Pressure relief device 309 is an ICS 300B low-pressure-side pressure relief device that protects low-pressure fluid paths in working fluid loop 300 from over pressurization, for example, near where high-pressure working fluid is introduced by ICS 300B (e.g., via valve 322) into the low-pressure fluid paths.

Low-pressure tank system 310 is an ICS 300B tank system that includes one or more tanks that store working fluid at low pressure (e.g., less than the pressure in high-pressure tank system 320, and/or less than the pressure in the high-pressure side of working fluid loop 300). Working fluid may be moved into low-pressure tank system 310 from, for example, working fluid loop 300. Working fluid may be released from low-pressure tank system 310 into, for example, working fluid loop 300. Preferably, tank system 310 includes built-in pressure relief devices.

Valve 311 is an ICS 300B HP-LP valve that, for example, when open, allows for release of high-pressure working fluid from the high-pressure side of working fluid loop 300 into the low-pressure tank system 310. Valve 311 may be a controlled proportional valve that is used, for example, for controlling PHES system 1000 power ramping rates.

Valve 312 is an ICS 300B LP-LP valve that, for example, when open, allows for movement of low-pressure working fluid between low-pressure tank system 310 and the low-pressure side of working fluid loop 300.

Valve 314 is an evacuation valve on the high-pressure side of working fluid loop 300. Valve 314, when open, allows working fluid in the working fluid loop 300 to be evacuated to the environment or an outside working fluid make-up reservoir (not shown). Valve 314 is primarily for servicing of working fluid loop 300, but can also be used for inventory control purposes (e.g., reducing working fluid mass in working fluid loop 300) related to power generation mode 1004, charge mode 1002, or other operations.

Valve 318 is a dump valve on the high-pressure side of working fluid loop 300. Valve 318, when open, allows working fluid in the high-pressure side of the working fluid loop 300 to be dumped to the ICS 300B low-pressure tank system 310, lowering pressure in the working fluid loop 300. Beneficially, this preserves filtered working fluid as opposed to evacuating working fluid through valves 308 or 314. Though similarly arranged in ICS 300B, valve 318 may differ from valve 311. Valve 318 may be a fast switched (i.e., "bang-bang") valve and/or may be larger than valve 318. This is beneficial for moving high-pressure working fluid from the working fluid loop 300 into the low-pressure tank system 310 at a much faster rate than valve 311 can accomplish, which may be preferred for certain mode transitions or trip events.

Pressure relief device 319 is an ICS 300B high-pressure-side pressure relief device that protects high-pressure fluid paths in working fluid loop 300 from over pressurization.

High-pressure tank system 320 is an ICS 300B tank system that includes one or more tanks that store working fluid at high pressure (e.g., higher than the pressure in low-pressure tank system 310, and/or higher than the pressure in the low-pressure side of working fluid loop 300). Working fluid may be moved into high-pressure tank system 320 from, for example, the high-pressure side of working fluid loop 300 via ICS 300B valves (e.g., valve 321) and/or working fluid compressor 303. Working fluid may be released from high-pressure tank system 320 into, for example, the low-pressure side of working fluid loop 300 via ICS 300B valves (e.g., valve 322). Preferably, the high-pressure tank system 320 includes built-in pressure relief devices.

Valve 321 is an ICS 300B HP-HP valve that, for example, when open, allows for movement of high-pressure working fluid between the high-pressure side of working fluid loop 300 and high-pressure tank system 320.

Valve 322 is an ICS 300B LP-HP valve that, for example, when open, allows for release of high-pressure working fluid from high-pressure tank system 320 into the low-pressure side of working fluid loop 300.

Sensors 119S, 130S, 131S, 132S, 140S, 141S, 142S, 229S, 230S, 231S, 232S, 240S, 241S, 242S, 324S, 325S, 361S, 362S, 363S, 364S, 365S, 366S, and 367S are monitoring and reporting devices that can provide one or more of pressure, temperature, flow rate, dewpoint, and/or fluid concentration data to one or more control systems controlling and/or monitoring conditions of the PHES system 1000.

Sensor 303S is a monitoring and reporting devices that can provide one or more of compressor speed, pressure, temperature, and/or flow rate data to one or more control systems controlling and/or monitoring conditions of the PHES system 1000.

Sensors 310S and 320S are monitoring and reporting devices that can provide one or more of pressure, temperature, dewpoint, and/or fluid concentration data to one or more control systems controlling and/or monitoring conditions of the PHES system 1000.

Valve 401 regulates a bypass fluid path that can be opened, for example during generation mode, to provide a working fluid bypass path around the low-pressure side of RHX system 400 and AHX system 700, thereby allowing some amount of working fluid flow through the bypass fluid path instead of through RHX system 400 and AHX system 700. Beneficially, valve 401 may be used in conjunction with valve 222, 323, 324 (and 325, if present) to mitigate a negative effect of opening valve 222. During, for example, generation mode 1004, opening valve 222 (with valves 231, 241 closed), will cause the outlet temperature of turbine system 240 to drop quickly. That results in circulation of colder working fluid downstream of the turbine system 240 that could shock (and potentially damage) the downstream RHX system 400 and AHX system 700 if the colder working fluid were allowed to pass into those heat exchangers. Therefore, as an example, when valve 222 is opened, valve 401 may also be opened and preferably valves 323, 324 (and 325, if present) may be closed, so that the colder working fluid flow from the turbine system 240 outlet bypasses around RHX system 400 and AHX system 700 and flows instead to the inlet of the CHX system 600, which is expecting colder working fluid.

HP/LP Working Fluid Paths

In working fluid loop 300, high-pressure fluid paths are downstream of charge and generation compressor systems 130, 230 and upstream of charge and generation turbine systems 140, 240 (i.e., between outlets of charge and generation compressor systems 130, 230 and inlets of charge and generation turbine systems 140, 240, respectively). Low-pressure fluid paths are downstream of charge and generation turbine systems 140, 240 and upstream of charge and generation compressor systems 130, 230 (i.e., between outlets of charge and generation turbine systems 140, 240 and inlets of charge and generation compressor systems 130, 230, respectively).

For example, a high-pressure fluid path is between the CPT system 100 compressor system 130 outlet and the CPT turbine system 140 inlet. In FIGS. 3 and 3N, that high-pressure fluid path encompasses fluid interconnects 17, 7, 9, 10, 12, and 18. With reference to the circulatory flow paths illustrated in bold in FIG. 3N, the portion of this high-pressure fluid path downstream of compressor system 130, encompassing fluid interconnects 17, 7, 9, 10, and ending at RHX system 400 can additionally be considered a high-pressure high-temperature (e.g., HP-HT) fluid path. Similarly, the portion of this high-pressure fluid path downstream of RHX system 400, encompassing fluid interconnects 12, 18, and ending at the inlet to turbine system 140 can additionally be considered a high-pressure medium-temperature (e.g., HP-MT) fluid path.

Another high-pressure fluid path is between the GPT system 200 compressor system 230 outlet and the GPT turbine system 240 inlet. In FIGS. 3 and 3O, that high-pressure fluid path encompasses fluid interconnects 22, 12, 10, 9, 7, and 23. With reference to the circulatory flow paths illustrated in bold in FIG. 3O, the portion of this high-pressure fluid path downstream of compressor system 230, encompassing fluid interconnects 22, 12, and ending at RHX system 400 can additionally be considered a high-pressure medium-temperature (e.g., HP-MT) fluid path. Similarly, the portion of this high-pressure fluid path downstream of RHX system 400, encompassing fluid interconnects 10, 9, 7, 23, and ending at the inlet to turbine system 240 can additionally be considered a high-pressure high-temperature (e.g., HP-HT) fluid path.

As another example, a low-pressure fluid path is between the CPT system 100 turbine system 140 outlet and the CPT compressor system 130 inlet. In FIGS. 3 and 3N, that low-pressure fluid path encompasses fluid interconnects 19, 14, 2, 5, 11, and 20. With reference to the circulatory flow paths illustrated in bold in FIG. 3N, the portion of this low-pressure fluid path downstream of turbine system 140, encompassing fluid interconnects 19, 14, 2, 5, and ending at RHX system 400 can additionally be considered a low-pressure low-temperature (e.g., LP-LT) fluid path. Similarly, the portion of this low-pressure fluid path downstream of RHX system 400, encompassing fluid interconnects 11, 20, and ending at the inlet to compressor system 130 can additionally be considered a low-pressure low-temperature (e.g., LP-LT) fluid path.

Another low-pressure fluid path is between the GPT system 200 turbine system 240 outlet and the compressor system 230 inlet. In FIGS. 3 and 3O, that low-pressure fluid path encompasses fluid interconnects 25, 11, 5, 4 and 3 (depending on AHX system 700 bypass state), 2, 14, and 26. With reference to the circulatory flow paths illustrated in bold in FIG. 3O, the portion of this low-pressure fluid path downstream of turbine system 240, encompassing fluid interconnects 25, 11, and ending at RHX system 400 can additionally be considered a low-pressure medium-temperature (e.g., LP-MT) fluid path. Similarly, the portion of this low-pressure fluid path downstream of RHX system 400, encompassing fluid interconnects 5, 4 and 3 (depending on AHX system 700 bypass state), 2, 14, 26, and ending at the inlet to compressor system 230 can additionally be considered a low-pressure medium-temperature (e.g., LP-MT) fluid path.

Powertrain Isolation

Valve 131 and valve 141 may be closed to isolate the CPT system 100 turbomachinery during generation mode 1004. Valve 231 and valve 241 may be closed to isolate the GPT system 200 turbomachinery during charge mode 1002. As noted above, these isolation valves 131, 141, 231, 241 are preferably fail-closed valves and preferably they can close quickly to help protect the turbomachinery during a trip event.

AHX System Isolation

The AHX system 700 can exhaust excess heat in the working fluid to the environment. In some embodiments, excess heat may be rejected from the PHES system 1000 via the working fluid loop 300 only during generation (e.g., mode 1004). Excess heat from inefficiency is generated during both charge (e.g. mode 1002) and generation (e.g., mode 1004) due to inefficiencies of the turbomachinery. In an embodiment where excess heat is not rejected during a charge mode (e.g., mode 1002), the excess heat accumulates and results in, for example, a higher CTS medium 690 temperature. In an embodiment where excess heat is rejected during a generation mode (e.g., mode 1004), excess heat from charge mode inefficiency and generation mode inefficiency can be removed from the working fluid loop 300 through the AHX system 700.

Consequently, in a preferred embodiment, it is desirable to provide a mode-switchable working fluid heat dissipation system that can be activated during generation mode 1004 and bypassed during charge mode 1002, or vice versa in another embodiment. In working fluid loop 300, as depicted in FIGS. 3, 3N, 3O, an arrangement of valves allow AHX system 700 to be activated or bypassed depending on the mode (e.g., modes 1002, 1004, or other modes, transitions, or state as further described with respect to, for example, FIG. 11). A set of three valves, 323, 324, 325 direct working fluid flow through the AHX system 700 during generation mode, as illustrated in FIG. 3O, and direct working fluid to bypass the AHX system 700 during charge mode, as illustrated in FIG. 3N. To direct working fluid flow through the AHX system 700 during generation mode, valve 323 may be closed and valves 324 and 325 open. Conversely, to bypass AHX system 700, valve 323 may be opened and valves 324 and 325 may be closed. FIGS. 3I and 3J and their corresponding disclosure further illustrate the bypass and active states of AHX system 700. Alternatively, in another embodiment, valve 325 may be omitted and valves 323 and 324 are used to provide a mode-switchable heat dissipation system, as further illustrated and described herein and with respect to FIGS. 3K and 3L.

Inventory Control System

Figure 24:
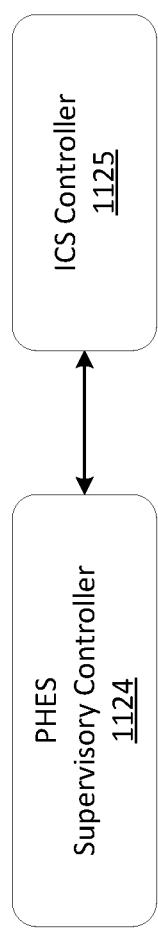
FIG. 24 illustrates select controllers that can be implemented in a PHES system, according to an example embodiment.

Inventory control refers to control of the mass, and corresponding pressures, of working fluid in the high-pressure and low-pressure sides of working fluid loop 300, which can be controlled to affect, for example, power generation and charge characteristics of the PHES system 1000. Control of working fluid inventory inside working fluid loop 300 can be accomplished with components illustrated in FIG. 3, and additionally illustrated as ICS 300B in FIG. 3M. One or more controllers, such as illustrated in FIG. 24, may participate in and/or direct the control. Using inventory control, power of the PHES system 1000 is preferably modulated by adjusting working fluid pressure in the low-pressure side of the working fluid loop 300.

In one example of inventory control, a high-pressure tank system and a low-pressure tank system and associated valves are used to control the amount of working fluid circulating in the working fluid loop 300. High-pressure tank system 320, which may include one or more fluid tanks for holding working fluid, can be connected to a high-pressure working fluid path via valve 321 and to a low-pressure working fluid path via valve 322. Low-pressure tank system 310, which may include one or more fluid tanks, can be connected to a high-pressure working fluid path via valve 311 and to a low-pressure working fluid path via valve 312. The four valves, 311, 312, 321, and 322, may be used to control the direction of working fluid flow between the tank systems 310, 320 and low-pressure or high-pressure fluid paths in the working fluid loop 300, effectively allowing the addition or removal of working fluid circulating through the working fluid loop 300.

ICS 300B further includes a make-up working fluid compressor 303 that can add working fluid to the system. The working fluid loop 300 operates as a closed loop; however, working fluid may be lost over time or intentionally lost due to operational decisions or hardware protection-related operations, such as venting of working fluid in overpressure conditions. Working fluid can be added to the working fluid loop 300 by adding outside working fluid through a working fluid filter 301. To get the outside working fluid into the high-pressure tank system 320, the working fluid compressor 303 is used to pressurize outside working fluid to a pressure greater than the high-pressure tank system 320 (or greater than at least one tank in the high-pressure tank system 320). In an embodiment where the working fluid is air, ambient air may be brought in through the filter 301 and pressurized with the compressor 303. In other embodiments, an outside working fluid make-up reservoir (not shown) may supply working fluid to the filter 301 or the compressor 303.

In another example of inventory control, after a normal shutdown or a trip event in PHES system 1000, pressure in working fluid loop 300 is preferably brought to a lower pressure before either CPT powertrain 100 or GPT powertrain 200 is started. This is beneficial because if high pressure in high-pressure fluid paths of the working fluid loop 300 is not lowered prior to certain mode transitions, the resulting settle-out pressure throughout the working fluid loop 300 would require that low-pressure fluid paths in the working fluid loop 300 be designed to work with a higher pressures than typical operating pressures in the low-pressure fluid paths during charge or generation modes. Thus, if working fluid can be removed from the working fluid loop 300 during spin-down (e.g., transition to hot turning mode 1006 and/or slow rolling state), lower-pressure piping and components can be used in the low-pressure fluid paths of the working fluid loop 300, thus allowing reduced capital investment in the PHES system design. Therefore, it is desirable to bring the circulating working fluid mass down so that the settle-out pressure in the working fluid loop 300 is no more than the typical low-side pressure in the working fluid loop 300.

In one example, working fluid loop 300 pressure reduction can be accomplished by using the working fluid compressor 303 to take working fluid from a high-pressure fluid path via valve 305, or working fluid from a low-pressure fluid path via valve 304, preferably one at a time, and push the working fluid into the high-pressure tank system 320. Additionally or alternatively, valves 311 or 318 can be used to slowly or quickly bleed down pressure from a high-pressure fluid path into the lower pressure tank system 310.

In another example, ICS 300B includes at least one evacuation valve 308 controllable to vent working fluid from the low-pressure side of working fluid loop 300, as well as pressure relief devices throughout the working fluid loop 300 to provide protection from overpressure.

In another example, ICS 300B includes at least one evacuation valve 314 controllable to vent working fluid from the high-pressure side of working fluid loop 300, as well as pressure relief devices throughout the working fluid loop 300 to provide protection from overpressure.

Powertrain Bypass/Recirculation Loops

For each turbomachinery powertrain (e.g., CPT powertrain 100 and GPT powertrain 200), there are working fluid recirculation and bypass loops. A recirculation loop may be characterized as a switchable closed-loop working fluid path that allows recirculation of working fluid from the outlet of a component back to the inlet of the component. For example, a recirculation loop can be used around a compressor system during hot turning. In this example, working fluid is routed from the compressor system outlet back to the compressor inlet instead of through the main heat exchangers, allowing the compressor system to gradually cool down after the compressor system transitions from high flow rate operation (e.g. charge mode 1002 or generation mode 1004) to low flow rate operation (e.g., hot turning mode 1006).

A bypass loop may be characterized as a switchable closed-loop working fluid path that routes working fluid around one or more components in the main working fluid loop 300. For example, during transition from a generation mode 1004 to a trip mode 1012, a bypass loop may be activated during that high flow rate period. The bypass loop could route high flow rate working fluid from a generation compressor system outlet away from the heat exchangers and to a generation turbine system inlet. A bypass loop can be beneficial during trip events (e.g., mode 1012) when surging of the turbomachinery is a risk, and also during turbomachinery startup when it is desirable to reduce startup power.

For the CPT system 100, valve 119, which is normally closed, can open a preferably high flow rate bypass loop around the charge compressor system 130. This is beneficial, for example, to prevent surge in the charge compressor system 130 during a trip event from charge mode.

For the CPT system 100, valve 132, which is normally closed, can open a recirculation loop around the charge compressor system 130. The valve 132 recirculation loop can be activated to allow circulation and also cooling of the working fluid through the heat exchanger 132. The valve 132 recirculation loop may have lower flow rate capability than the valve 119 recirculation loop. The valve 132 recirculation loop can be beneficial, for example, during a hot turning mode for the CPT system 100.

For the CPT system 100, valve 142, which is normally closed, can open a recirculation loop around the charge turbine system 140 to allow recirculation during, for example, hot turning mode for the CPT system 100. As previously noted, fan 142F may assist with working fluid flow in this recirculation loop.

For the GPT system 200, valve 229, which is normally closed, can open a preferably high flow rate bypass fluid path from the outlet of the generation compressor system 230 to the outlet fluid path of the generation turbine system 240 to reduce start-up power at GPT system 200. Routing working fluid through the valve 229 bypass loop reduces the magnitude of power for each of the compressor system 230 and the turbine system 240, and thus reduces the net power magnitude of the GPT system 200. In effect, the valve 229 bypass loop creates a limited starving effect in the GPT system 200. The effect on the turbine system 240 is greater than the effect on the compressor system 230. Consequently, opening the valve 229 bypass loop can keep turbine system 240 power production less than compressor system 230 power draw. Because that ensures a net electrical power input need, generator system 110 must still act as a motor during the duration of spin-up. Beneficially, this maintains VFD control of the spin-up process. As another benefit, opening the valve 229 bypass loop can provide surge protection during a trip event.

For the GPT system 200, valve 232, which is normally closed, can open a recirculation loop around the generation compressor system 230 to provide working fluid circulation through the generation compressor system 230 during, for example, hot turning mode 1006 for the GPT system 200.

For the GPT system 200, valve 242, which is normally closed, can open a recirculation loop around the generation turbine system 240. This recirculation loop can be activated to allow circulation and also cooling of the working fluid recirculating through the heat exchanger 242H, thereby cooling the generation turbine system 240. This is beneficial during, for example, hot turning mode 1006 for the GPT system 200.

For the GPT system 200, valve 222, which is normally closed, can be opened to provide to provide a working fluid bypass path around the high-pressure side of RHX system 400 and HHX system 500. This is further described above with respect to valve 222 and valve 401.

Other recirculation and bypass valves may be implemented in a PHES system, such as PHES system 1000, to provide functionality in surge prevention, overspeed prevention, overpressure prevention, startup load reduction, and low thermal ramping of components.

F. Hot-Side Thermal Storage Subsystem

FIG. 4 is a schematic fluid path diagram of a hot-side thermal storage system which may be implemented in a PHES system, such as PHES system 1000, according to an example embodiment. Other embodiments of an HTS system operable in PHES systems disclosed herein are possible as well. FIG. 4 provides additional detail concerning an HTS system 501 embodiment than is shown in the top-level schematic of FIG. 2. In general terms, HTS system 501 includes tanks for HTS medium, HTS medium fluid paths, pumps, valves, and heaters. The HTS system 501 is capable of transporting HTS medium 590 back and forth between the two (or more) storage tanks to allow charging of the warm HTS medium 590 (i.e., adding thermal energy) or discharging of the HTS medium 590 (i.e., extracting thermal energy). The heaters are available to ensure that the HTS medium 590 remains in liquid phase for anticipated operational conditions in PHES system 1000.

An HTS system, such as the embodiment of HTS system 501 illustrated in FIG. 4, can serve numerous roles within a PHES system, such as PHES system 1000. An HTS system may ensure that HTS medium 590 remains in liquid phase during all modes of operation of the PHES system 1000. An HTS system may deliver HTS medium 590 flow to the HHX system 500 to store heat in the HTS medium 590 during charge mode operation of the PHES system 1000 (e.g. mode 1002). An HTS system may deliver HTS medium 590 flow to the HHX system 500 to provide heat from the HTS medium 590 to the working fluid during generation mode operation of the PHES system 1000 (e.g., mode 1004). An HTS system may drain HTS medium 590 from the PHES system 1000 into at least one storage tank. An HTS system may vent entrapped gas in HTS medium 590 fluid paths. An HTS system may protect fluid paths and components from over pressurization. An HTS system may isolate itself from the other PHES 1000 subsystems when the HHX system 500 is disconnected for service, or for thermal rebalancing of the HTS system and/or PHES system 1000. An HTS system may maintain pressure of the HTS medium 590 in the HHX system 500 to be less than that of the working fluid pressure in the working fluid loop 300 at HHX system 500, for example, to prevent leakage of HTS medium into the working fluid loop 300.

In the embodiment of an HTS system shown in FIG. 4, the HTS system 501 includes two tanks: a warm HTS tank 510 for storing warm HTS medium 590 (e.g., at approximately 270° C.) and a hot HTS tank 520 for storing hot HTS medium 590 (e.g., at approximately 560° C.). In other embodiments, more than one tank may be used to increase the storage capacity of the warm HTS storage 591 and/or the hot HTS storage 592. Each HTS tank 510, 520 has a pump, an immersion heater, and sensors.

In HTS system 501, warm HTS pump 530 circulates HTS medium 590 from warm HTS tank 510, through fluid interconnect 8, through HHX system 500, through fluid interconnect 6, and to the hot HTS tank 520 during PHES charging mode 1002, where the HTS medium 590 is absorbing heat from the working fluid side of the HHX system 500. Hot HTS pump 540 circulates HTS medium 590 from hot HTS tank 520, through fluid interconnect 6, through HHX system 500, through fluid interconnect 8, and to the warm HTS tank 510 during PHES system generation mode 1004, where the HTS medium 590 is providing heat to the working fluid side of the HHX system 500.

In HTS system 501, valves in HTS system 501 can be actuated to bypass the HHX system 500 as necessary in order to isolate HTS tanks 510, 520 from the rest of PHES system 1000 and/or to facilitate thermal balancing of the HTS loop and/or PHES system. The ability to facilitate balancing can be beneficial, for example, to maintain thermal balance between PHES system charge and generation cycles. It is desirable that the mass of HTS medium 590 transferred from warm HTS tank 510 to hot HTS tank 520 during charge (e.g. charge mode 1002) is later transferred back from hot HTS tank 520 to warm HTS tank 510 during generation (e.g., generation mode 1004), and vice versa. However, disturbances to the HTS medium flow rate during charge and generation cycles, resulting from, for example, uneven heat loss across the PHES system 1000, may result in unequal masses of HTS medium 590 transferred between the cycles. If that occurs, direct transfer of HTS medium 590 from warm HTS tank 510 to hot HTS tank 520, or vice versa, may be used to re-balance HTS medium 590 masses at the beginning or end of a charge or generation cycle.

In HTS system 501, valves can be actuated to drain HTS medium 590 in fluid paths, including HHX system 500, into one or more tanks as necessary.

In HTS system 501, heat traces can be used throughout the fluid paths to avoid formation of solid HTS medium 590 during filling of the HTS system 501 and/or during hot turning mode 1006 or hot standby mode 1008 where there may be no significant flow of HTS medium 590 through fluid paths.

The following paragraphs describe components of the HTS system 501:

Warm HTS tank 510 is a tank for storing warm HTS medium 590. In other embodiments, there may be additional warm HTS tanks.

Sensors 510S, 520S are monitoring and reporting devices that can provide temperature and/or fluid level data for HTS medium 590 in tanks 510, 520, respectively, to one or more control systems controlling and/or monitoring conditions in the PHES system 1000.

Valve 511 is a bypass valve that provides a flow path for HTS medium 590 to go directly into the warm tank 510, bypassing the pump 530 when valve 557 is closed.

Heater 512 provides heat to HTS medium 590 in warm HTS tank 510, for example, to ensure it stays in liquid form.

Hot HTS tank 520 is a tank for storing hot HTS medium 590. In other embodiments, there may be additional hot HTS tanks.

Valve 521 is a bypass valve that provides a flow path for HTS medium 590 to go directly into the hot tank 520, bypassing the pump 540 when valve 558 is closed.

Heater 522 provides heat HTS medium 590 in hot tank 520, for example, to ensure it stays in liquid form.

Breather device 529 allows ambient air in and out of the tank head space as the HTS medium 590 expands and contracts with temperature.

Warm HTS pump 530 delivers HTS medium 590 from warm HTS tank 510 to hot HTS tank 520 via HHX system 500 during charge mode operation. Depending on valve state, pump 530 can alternatively or additionally deliver HTS medium 590 to hot HTS tank 520 via bypass valve 551, bypassing HHX system 500, for balancing purposes. In other embodiments, there may be additional warm HTS pumps.

Hot HTS pump 540 delivers HTS medium 590 from hot HTS tank 520 to warm HTS tank 510 via HHX system 500 during generation mode operation. Depending on valve state, pump 540 can alternatively or additionally deliver HTS medium 590 to warm HTS tank 510 via valve 551, bypassing HHX system 500, for balancing purposes. In other embodiments, there may be additional hot HTS pumps.

Valve 551 is an HHX system 500 bypass valve that provides a fluid flow path allowing HTS medium 590 to travel between HTS tanks 510, 520 while bypassing HHX system 500.

Sensors 551S, 552S are monitoring and reporting devices that can provide temperature, flow, and/or pressure data to one or more control systems controlling and/or monitoring conditions in the PHES system 1000.

Valve 552 is a drain valve that provides a fluid flow path for draining of HTS medium 590 into or out of warm tank 510.

Valve 553 is a drain valve that provides a fluid flow path for draining of HTS medium 590 into or out of hot tank 520.

Valve 554 is a check valve that works as a gas release valve to allow accumulated gas in the HTS system 501 to migrate to a tank cover gas space in either or both tanks 510, 520.

Valve 555 is an HHX system 500 isolation valve that restricts HTS medium 590 flow between the HHX system 500 and HTS system 501 through interconnect 8.

Valve 556 is an HHX system 500 isolation valve that restricts HTS medium 590 flow between the HHX system 500 and HTS system 501 through interconnect 6.

Valves 552, 553, 555, and 556 can all be closed to isolate HHX system 500 from HTS medium 590 in the HTS system 501.

Valve 557 is a warm CTS pump 530 outlet valve that can be opened to allow CTS medium 590 flow from warm CTS pump 530 or closed to prevent flow into the outlet of hot CTS pump 530.

Valve 558 is a hot CTS pump 540 outlet valve that can be opened to allow CTS medium 590 flow from hot CTS pump 540 or closed to prevent flow into the outlet of hot CTS pump 540.

Heat trace 560 can be activated to maintain fluid paths and/or other metal mass at temperatures sufficient to keep the HTS medium 590 in liquid phase, and/or at desired setpoint temperatures during various modes and/or states of PHES system 1000 in order to reduce thermal gradients on sensitive components, and/or to reduce transition time between PHES system 1000 modes and states. Beneficially, heat trace 560 can reduce thermal ramp rates, which benefits component longevity, and allows for faster startup times. Heat trace 560 is illustrated as near fluid interconnect 8 and on the warm tank 510 side of HTS system 501. However, heat trace 560 can be located at other locations within HTS system 501 in order to accomplish its functions. Additionally or alternatively, heat trace 560 can include heat traces at multiple locations within HTS system 501 in order to accomplish its functions.

Operation of HTS System

During PHES system 1000 generation mode 1004, the HTS system 501 is configured such that hot HTS medium 590 is delivered from hot HTS tank 520 to warm HTS tank 510 via HHX system 500 at a fixed and/or controllable rate using pump 540. During generation, heat from the hot HTS medium 590 is transferred to the working fluid via the HHX system 500. The rated generation flow of HTS medium 590 at a given PHES system 1000 power may be a function of the generation flow of CTS medium 690 to maintain inventory balance.

During PHES system 1000 charge mode 1002, the HTS system 501 is configured such that warm HTS medium 590 can be delivered from warm HTS tank 510 to hot HTS tank 520 via HHX system 500 at a fixed or controllable rate using the pump 530. During charge, the warm HTS medium 590 absorbs heat from the hot working fluid via the HHX system 500. The rated charge flow of HTS medium 590 at a given PHES system 1000 power may be a function of the charge flow of CTS medium 690 to maintain inventory balance.

Under some PHES system 1000 modes, such as long-term Cold Dry Standby, the HTS medium 590 in the hot-side loop (e.g., HTS system 501, HHX system 500, and intermediate fluid paths) needs to be drained to the HTS tanks 510 and/or 520. In this scenario, preferably the heater 512 in the warm tank 510 is used to ensure HTS medium 590 remain in liquid form. Preferably, for example, the hot HTS pump 540 can be used to transfer hot HTS medium 590 from the hot HTS tank 520 to the warm HTS tank 510 via the HHX system 500 bypass line (e.g., via valve 551) and valve 511. Alternatively, warm HTS pump 530 can be used to transfer warm HTS medium 590 from the warm HTS tank 510 to the hot HTS tank 520 via the HHX system 500 bypass line (e.g., via valve 551) and valve 521. HTS 590 medium remaining in hot HTS tank 520 may also be kept in a liquid state with heater 522.

Under certain operating modes, HHX system 500 can be bypassed by closing valves 552, 553, 555, and 556, opening valve 551, and using pump 530 or 540 to cause flow of HTS medium 590 between HTS tanks 510 and 520 For example, HHX system 500 can be bypassed to balance the thermal energy content either between the HTS tanks 510, 520 individually and/or to balance total thermal energy between HTS system 501 and CTS system 601.

G. Cold-Side Thermal Storage Subsystem

FIG. 5 is a schematic fluid path diagram of a cold-side thermal storage system which may be implemented in a PHES system, such as PHES system 1000, according to an example embodiment. Other embodiments of an CTS system operable in PHES systems disclosed herein are possible as well. FIG. 5 provides additional detail concerning a CTS system 601 embodiment than is shown in the top-level schematic of FIG. 2. In general terms, CTS system 601 includes tanks for CTS medium, CTS medium fluid paths, pumps, valves, and inert gas supply. The CTS system 601 is capable of transporting CTS medium 690 back and forth between the two (or more) storage tanks to allow charging of the CTS medium 690 (i.e., removing thermal energy) or discharging of the CTS medium 690 (i.e., adding thermal energy). During PHES system 1000 charge mode operation, the CTS medium 690 deposits heat to working fluid inside the CHX system 600. During PHES system 1000 generation mode operation, the CTS medium 690 absorbs heat from the working fluid inside the CHX system 600.

A CTS system, such as CTS system 601 illustrated in FIG. 5, can serve numerous roles within a PHES system, such as PHES system 1000. A CTS system may deliver CTS medium 690 flow to the CHX system 600 to provide heat during charge mode operation of PHES system 1000 (e.g., mode 1002). A CTS system may deliver CTS medium 690 flow to the CHX system 600 to absorb heat during generation mode operation of the PHES system 1000 (e.g., mode 1004). A CTS system may drain CTS medium 690 into at least one storage tank. A CTS system may vent entrapped gas in CTS medium 690 fluid paths. A CTS system may protect fluid paths and components from over pressurization. A CTS system 601 may isolate itself from other PHES 1000 subsystems when the CHX system 600 is disconnected for service, or for thermal rebalancing. A CTS system may isolate the CTS medium 690 from ambient via an inert gas blanket. A CTS system may maintain pressure of the CTS medium 690 in the CHX system 600 to be less than that of the working fluid pressure in the working fluid loop 300 at CHX system 600, for example, to prevent leakage of CTS medium into the working fluid loop 300. A CTS system 601 may monitor CTS medium 690 health during operation.

In the embodiment of a CTS system shown in FIG. 5, the CTS system 601 includes two tanks: a warm CTS tank 610 for storing warm CTS medium 690 (e.g., at approximately 30° C.) and a cold CTS tank 620 for storing cold CTS medium 690 (e.g., at approximately −60° C.). In other embodiments, more than one CTS tank may be used to increase the storage capacity of the warm CTS storage 691 and/or the cold CTS storage 692. In CTS system 601, each CTS storage 691, 692 has a pump system 639, 649, respectively.

In CTS system 601, warm pump 630 circulates CTS medium 690 from warm CTS tank 610, through fluid interconnect 1, through CHX system 600, through fluid interconnect 13, and to the cold CTS tank 620 during PHES 1000 charging mode 1002, where the CTS medium 690 is providing heat to the working fluid side of the CHX system 600. The cold pump 640 circulates CTS medium 690 from cold CTS tank 620, through fluid interconnect 13, through CHX system 600, through fluid interconnect 1, and to the warm CTS tank 610 during PHES system 1000 generation mode 1004, where the CTS medium 690 is absorbing heat from the working fluid side of the CHX system 600.

Valves in CTS system 601 can be actuated to bypass the CHX system 600 as necessary in order to isolate CTS storage 691, 692 from the rest of PHES system 1000 and/or to facilitate balancing of the CTS loop. The ability to facilitate balancing can be beneficial, for example, to maintain thermal balance between PHES system charge and generation cycles. It is desirable that the mass of CTS medium 690 transferred from warm CTS tank 610 to cold CTS tank 620 during charge (e.g. charge mode 1002) is later transferred back from cold CTS tank 620 to warm CTS tank 610 during generation (e.g., generation mode 1004). However, disturbances to the CTS flow rate during charge and generation cycles, resulting from, for example uneven heat loss across the PHES system 1000, may result in unequal masses of CTS medium 690 transferred between the cycles. If that occurs, direct transfer of CTS medium 690 from warm CTS tank 610 to cold CTS tank 620, or vice versa, may be used to re-balance CTS medium 690 masses at the beginning or end of a charge or generation cycle.

In CTS system 601, valves can be actuated to drain CTS medium 690 in fluid paths, including CHX system 600, into one or more tanks as necessary.

In an embodiment of CTS system 601, one, or both of, CTS pumps 630, 640 are capable of bidirectional flow. Beneficially, reverse pumping can be used to provide active pressure reduction in the CTS loop, which can be employed to keep CTS medium 690 pressure in CHX system 600 below working fluid pressure in CHX system 600. This working fluid positive pressure condition (with respect to CTS medium 690) beneficially prevents any CTS medium from leaking into the working fluid loop 300 (e.g., through cracked heat exchanger cores).

The following paragraphs describe components of the CTS system 601:

Valve 602 is a CHX system 600 isolation valve that restricts CTS medium 690 flow between the CHX system 600 and CTS system 601 through interconnect 13.

Valve 603 is a CHX system 600 isolation valve that restricts CTS medium 690 flow between the CHX system 600 and CTS system 601 through interconnect 1.

Valves 602, 603 can both be closed to isolate the CHX system 600 from CTS medium 690 in the CTS system 601.

Valve 605 is a CHX system 600 bypass valve that provides a fluid flow path allowing CTS medium 690 to travel between CTS tanks 610, 620 while bypassing CHX system 600.

Warm CTS tank 610 is a tank for storing warm CTS medium 690.

Sensors 610S, 620S are monitoring and reporting devices that can provide temperature and/or fluid level data for HTS medium 690 in tanks 610, 620, respectively, to one or more control systems controlling and/or monitoring conditions in the PHES system 1000.

Valve 611 is an isolation valve that isolates warm CTS tank 610 from the CTS loop.

Pressure relief device 619 protects CTS tanks 610, 620 from over pressurization via a gas fluid path between the headspace of CTS tanks 610, 620.

Cold CTS tank 620 is a tank for storing cold CTS medium 690.

Valve 621 is an isolation valve that isolates cold CTS tank 620 from the CTS loop.

Inert gas reservoir 622 is a storage reservoir for an inert gas (e.g., nitrogen) useable as a cover gas to blanket CTS medium 690 in tanks 610, 620.

Valve 623 is an inert gas fluid path valve that can control a flow of inert gas from inert gas reservoir 622 to the headspace of CTS tanks 620, 621 which are connected via a gas fluid path. Valve 623 can be used to regulate the pressure of an inert gas blanket within the CTS tanks 610, 620.

Valve 624 is an inert gas purge valve that can control a flow of pressurized inert gas into the cold-side loop CTS medium 690 fluid paths to purge those fluid paths of CTS medium 690.

Warm CTS pump 630 delivers CTS medium 690 from warm CTS tank 610 to cold CTS tank 620 via CHX system 600 during charge mode operation of the PHES system 1000 (e.g., mode 1002). Depending on valve states, pump 630 can alternatively or additionally deliver CTS medium 690 to cold CTS tank 620 via valve 605, bypassing CHX system 600, for balancing purposes. In other embodiments, there may be additional warm CTS pumps.

Valve 631 is a warm pump 630 isolation valve that, when closed, can isolate pump 630, for example during PHES system 1000 generation mode when CTS medium 690 is flowing from cold CTS tank 620 to warm CTS tank 610. In an embodiment where pump 630 is bidirectional and operating in reverse, valve 631 may be open during generation mode to allow active pressure reduction in the CTS loop.

Valve 632 is a warm CTS pump 630 bypass valve that provides a flow path around pump 630 during, for example, generation mode operation of the PHES system 1000 (e.g., mode 1004) or balancing of CTS medium 690 in CTS system 601.

Valve 633 is a warm pump 630 isolation valve that, when closed along with warm pump outlet valve 631, allows for servicing of warm pump 630 when the pump is not in use, for example during PHES system 1000 generation mode when CTS medium 690 is flowing to warm tank 610 through pump 630 bypass valve 632.

Warm CTS pump system 639 and cold CTS pump system 649 illustrate respective CTS medium 690 pumping systems for warm CTS storage 691 and cold CTS storage 692, respectively.

Cold pump 640 delivers CTS medium 690 from cold CTS tank 620 to warm CTS tank 610 via CHX system 600 during generation mode operation of the PHES system 1000 (e.g., mode 1004). Depending on valve state, pump 640 can alternatively or additionally deliver CTS medium 690 to warm CTS tank 620 via valve 605, bypassing CHX system 600, for balancing purposes. In other embodiments, there may be additional cold CTS pumps.

Valve 641 is a cold pump 640 isolation valve that, when closed, can isolate pump 640, for example during PHES system 1000 charge mode when CTS medium 690 is flowing from warm CTS tank 610 to cold CTS tank 620. In an embodiment where pump 640 is bidirectional and operating in reverse, valve 641 may be open during generation mode to allow active pressure reduction in the CTS loop.

Valve 642 is a cold CTS pump 640 bypass valve that provides a flow path around pump 640 during, for example, charge mode operation of the PHES system 1000 (e.g., mode 1002) or balancing of CTS medium 690 in CTS system 601.

Valve 643 is a cold pump 640 isolation valve that, when closed along with cold pump outlet valve 641, allows for servicing of cold pump 640 when the pump is not in use, for example during PHES system 1000 charge mode when CTS medium 690 may be flowing to cold tank 620 through pump 640 bypass valve 642.

Sensors 661S, 662S, 663S, 664S, 665S, 666S, 667S, 668S are monitoring and reporting devices that can provide temperature, flow, and/or pressure data to one or more control systems controlling and/or monitoring conditions in the PHES system 1000.

Valve 682 is a check-style vent valve that allows entrapped CTS medium 690 gas in CTS loop fluid paths (e.g., CTS system 601 and CHX system 600) to be vented to a cover gas region of the CTS tanks 610, 620, but prevents gas or fluid from the CTS tanks from flowing back towards CHX system 600.

Operation of CTS System

During PHES system 1000 charge mode 1002, warm pump 630 delivers warm CTS medium 690 at a fixed or controllable rate from warm CTS tank 610 to cold CTS tank 620 via CHX system 600. During charge, heat from the warm CTS medium 690 is transferred to the working fluid via the CHX system 600. The rated charge flow of CTS medium 690 at a given PHES system 1000 power may be a function of the charge flow of HTS medium 590 to maintain inventory balance. The cold CTS pump 640 can be used to reduce pressure at the CHX system 600 by pulling CTS medium 690 from there.

During PHES system 1000 generation mode 1004, the cold pump 640 delivers cold CTS medium 690 at a fixed or controllable rate from the cold CTS tank 620 to the warm CTS tank 610 through CHX system 600. The rated generation flow of CTS medium 690 at a given PHES system 1000 power may be a function of the generation flow of HTS medium 590 to maintain inventory balance. The warm coolant pump 630 can be used to reduce pressure at the CHX system 600 by pulling CTS medium 690 from there.

Under some PHES system 100 modes, such as long-term Cold Dry Standby, the CTS medium 690 in the cold-side loop (e.g., CTS system 601, CHX system 600, and intermediate fluid paths) needs to be drained to the CTS tanks 610 and/or 620. For example, cold pump 640 can be used to transfer cold CTS medium 690 in the cold tank 620 to the warm tank 610 via a fluid path through bypass valve 605.

Under certain operating modes, CHX system 600 can be bypassed by closing valves 602, 603 and opening valve 605, and using pumps 630 and/or 640 to cause flow of CTS medium 690 between CTS tanks 610 and 620. For example, CHX system 600 can be bypassed to balance the thermal energy content either between CTS tanks 610, 620 individually and/or to balance total thermal energy between CTS system 601 and HTS system 501.

III. Operating Modes and States in a PHES System

Disclosed herein are various modes of operation and states of a PHES system, each of which may be implemented in the exemplary PHES system 1000.

A. Primary Modes of Operation

The PHES systems herein, including PHES system 1000, can transition through a number of modes of operation. Each of the primary modes of operation can be described with respect to a particular state of components and subsystems in the PHES system. Additionally, each of the primary modes of operation has an associated active parasitic load and a readiness time. Example primary modes of operation of the disclosed PHES systems are shown in FIG. 10.

Figure 10:
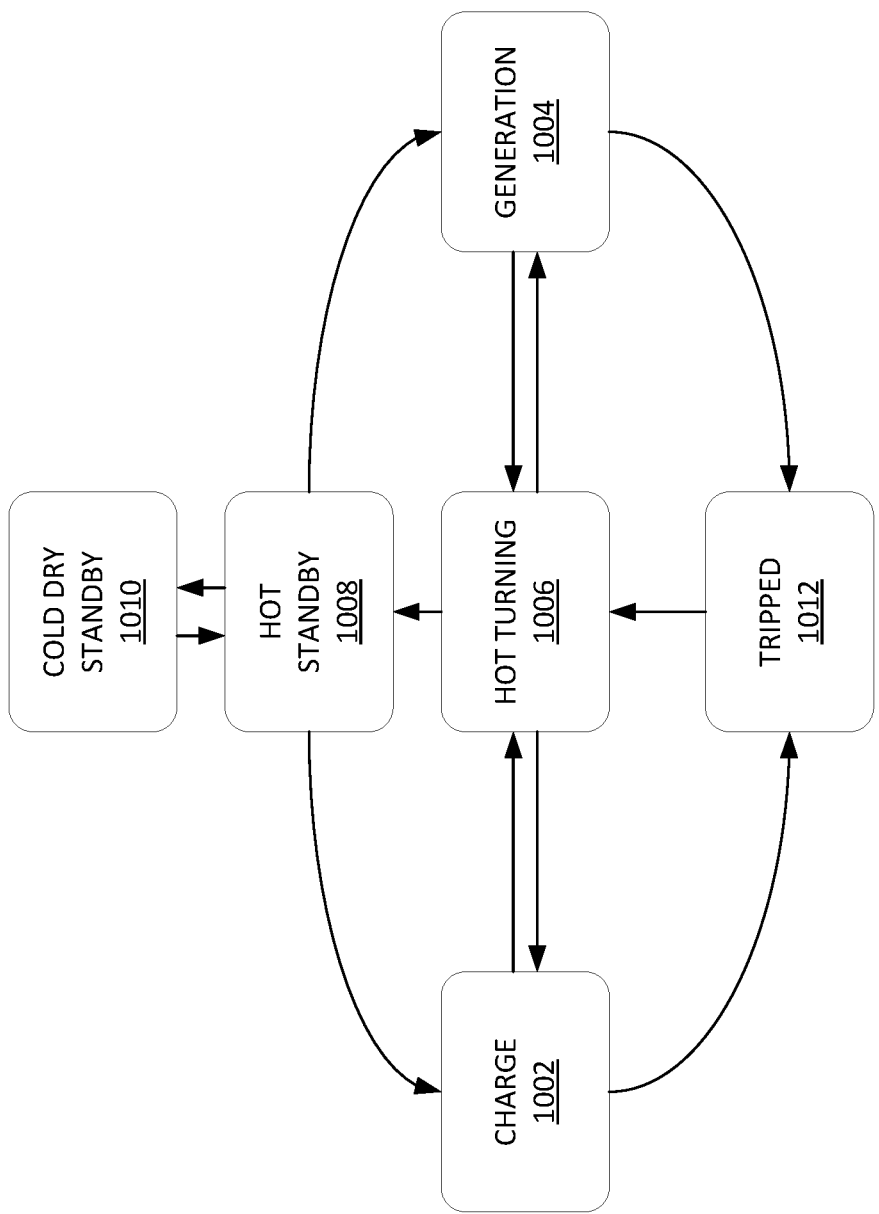
FIG. 10 illustrates primary modes of operation of a PHES system, according to an example embodiment.

FIG. 10 illustrates primary modes of operation of a PHES system, including PHES system 1000, according to an example embodiment. The primary modes of operation include charge 1002, generation 1004, hot turning 1006, hot standby 1008, cold dry standby 1010, and tripped 1012. FIG. 10 further illustrates the preferred transitions between modes, as indicated by directional arrows between modes. For example, in one embodiment, a PHES system, such as PHES system 1000, can transition from charge 1002 to hot turning 1006 to hot standby 1008 to cold dry standby 1010. In another example, a PHES system, such as PHES system 1000, can transition from charge 1002 to hot turning 1006 to generation 1004.

Cold Dry Standby Mode 1010. In this primary mode of operation, the thermal storage reservoirs are effectively offline and the associated thermal storage media are at their lowest practical thermal energy state for a given embodiment. In embodiments with liquid thermal storage, the thermal storage media may be drained to their respective tanks and not circulated through the rest of the PHES system. In embodiments with a hot-side liquid thermal storage media (e.g., molten salt), the hot-side liquid thermal storage media may be kept at a minimum temperature to prevent freezing, which may include active heating to maintain this minimum practical thermal energy state. In embodiments with a coolant as a cold-side liquid thermal storage media, the coolant may be kept at or near environmental ambient temperature. In some embodiments, the remainder of the PHES system infrastructure may also be kept at or near environmental ambient temperature. In some embodiments, pressure in the working fluid loop may be kept at or near ambient environmental pressure or at a minimum working fluid pressure $P_{standby}$. In one embodiment, $P_{standby}$ is a pressure in the working fluid loop (e.g., working fluid loop 300) below working pressure (e.g., during charge or generation modes 1002, 1004) but still sufficient to ensure positive pressure with respect to any opposite side pressure in HTS medium or CTS medium heat exchanger systems (e.g., HHX system 501 or CHX system 601). Maintaining $P_{standby}$ beneficially prevents any HTS medium or CTS medium from leaking into the working fluid loop (e.g., through cracked heat exchanger cores).

In Cold Dry Standby mode 1010, a PHES system achieves its lowest active parasitic load. In some embodiments, there is no significant parasitic load. In some embodiments, heating a hot-side liquid thermal storage media to prevent freezing is an active parasitic load. In some embodiments, maintaining a working fluid pressure at $P_{standby}$ greater than ambient environmental pressure is an active parasitic load.

Within embodiments of the disclosed PHES systems, including PHES system 1000, the readiness time to transition between cold dry standby mode 1010 and either charge mode 1002 or generation mode 1004 (via hot standby mode 1008) is a relatively long time compared to other mode transitions to charge mode 1002 or generation mode 1004.

Hot Standby Mode 1008. In this primary mode of operation, heat exchangers are primed with thermal storage media. In some embodiments, hot-side and/or cold-side heat exchangers are filled partially or completely with HTS and/or CTS media, respectively. In the case of liquid thermal storage media, the thermal storage media may or may not be continuously flowing through the heat exchangers, preferably at a very low flow rate. One or more hot-side heat exchangers (e.g., HHX system 500) are warmed above ambient environmental temperature. In some embodiments, heat traces or other heaters (e.g., heaters 512, 522) are used to heat the HTS medium, which in turn warms the hot-side heat exchanger(s). The warmed hot-side heat exchangers may be at or near their steady-state temperature for charge or generation modes, or may be at an intermediate temperature between their steady-state temperature and ambient environmental temperature. CPT system (e.g., CPT system 100) and GPT system (e.g., GPT system 200) are at zero RPM or substantially zero RPM (e.g., no turning, temporarily spinning down to eventual zero RPM from a prior state, insubstantial turning as a result of convective currents only, and/or no torque input from motors). In some embodiments, minimum pressure in the working fluid loop is kept at $P_{standby}$, though pressure in the working fluid loop (e.g. working fluid loop 300) may be higher initially upon entering hot standby mode 1008, depending on the prior mode the PHES system is transitioning from.

In hot standby mode, embodiments of the disclosed PHES systems can experience active parasitic load from heaters working on the thermal storage media. In some embodiments, heat traces are active to keep the thermal storage media at or near steady-state temperatures. In some embodiments, maintaining a working fluid pressure at $P_{standby}$ is an active parasitic load.

Within embodiments of the disclosed PHES systems, including PHES system 1000, and beneficially, the readiness time to transition between hot standby mode 1008 and either charge mode 1002 or generation mode 1004 is relatively short. For example, the readiness time may be less than 10% of the readiness time for transition from cold dry standby mode 1010 to either charge mode 1002 or generation mode 1004.

Hot Turning Mode 1006. In this primary mode of operation, either or both the CPT system and/or GPT system is slow rolling (i.e., CPT and/or GPT turbomachinery is spinning at a minimum speed). In a preferred embodiment, the slow-rolling turbomachinery use recirculation and/or bypass fluid loops, such as the examples disclosed herein, to circulate working fluid through the slow-rolling turbomachinery.

Within embodiments of the disclosed PHES systems, including PHES system 1000, and beneficially, the readiness time to transition between hot turning mode 1006 and either charge mode 1002 or generation mode 1004 is shorter than the readiness time to transition between hot standby mode 1008 and either charge mode 1002 or generation mode 1004.

Charge Mode 1002. In this primary mode of operation, the CPT system turbomachinery is connected to the electrical grid and preferably operating at grid speed, i.e., the CPT system is operating at an RPM that synchronizes the motor system with the operating frequency of the connected electrical grid. In some embodiments, the GPT system is at zero RPM or substantially zero RPM (e.g., no turning, temporarily spinning down to eventual zero RPM from prior state, insubstantial turning as a result of convective currents only, and/or no torque input from motors). In some embodiments, the GPT system is at turning speed. In charge mode, thermal storage media are substantially at steady-state temperatures and one or more control systems control may modulate power consumption of the disclosed PHES systems by, for example, controlling the pressure of the working fluid. In another embodiment, one or more control systems may control CTS medium and/or HTS medium flow rates and/or pressures through the main heat exchanger system to modulate power consumption of the disclosed PHES systems. In another embodiment, one or more control systems control both the pressure of the working fluid and/or CTS medium and/or HTS medium flow rates and/or pressures to modulate power consumption of the disclosed PHES systems.

In charge mode, active parasitic loads include support systems for the heat exchanger systems and any associated fluid loops, support systems for CPT system, and in some embodiments, support systems for the GPT system if the generation powertrain is turning.

Beneficially, embodiments of the disclosed PHES systems can ramp the charge mode 1002 power consumption very quickly between full power and a significantly reduced power consumption level (and vice versa). Additionally, within embodiments of the disclosed PHES systems, including PHES system 1000, and beneficially, the readiness time to transition between charge mode 1002 and generation mode 1004 (or vice versa) via hot turning mode 1006 is shorter than the readiness time to transition between hot standby mode 1008 and either charge mode 1002 or generation mode 1004.

Generation Mode 1004. In this primary mode of operation, the GPT system is connected to the electrical grid and preferably operating at grid speed, i.e., the GPT system is operating at an RPM that synchronizes the generator system with the operating frequency of the connected electrical grid. In some embodiments, the charge powertrain is at zero RPM or substantially zero RPM (e.g., no turning, temporarily spinning down to eventual zero RPM from prior state, insubstantial turning as a result of convective currents only, and/or no torque input from motors). In some embodiments, the CPT system is at turning speed. In generation mode, thermal storage media are substantially at steady-state temperatures. In generation mode, thermal storage media are substantially at steady-state temperatures and one or more control systems control may modulate power generation of the disclosed PHES systems by, for example, controlling the pressure of the working fluid. In another embodiment, one or more control systems may control CTS medium and/or HTS medium flow rates and/or pressures through the main heat exchanger system to modulate power generation of the disclosed PHES systems. In another embodiment, one or more control systems control both the pressure of the working fluid and/or CTS medium and/or HTS medium flow rates and/or pressures to modulate power generation of the disclosed PHES systems.

In generation mode, active parasitic loads include support systems for the heat exchanger systems and any associated fluid loops, support systems for GPT system, and in some embodiments, support systems for the CPT system if the charge powertrain is turning.

Beneficially, embodiments of the disclosed PHES systems can ramp the generation mode 1004 power generation very quickly between low power and full power (and vice versa).

Tripped Mode 1012. This primary mode of operation is a state of recovery from a trip event. This mode may include spin-down of one or more of the powertrains (e.g. CPT system 100, GPT system 200) from its prior controlled (e.g., hot turning and/or steady-state) speed to a slower or substantially zero RPM speed. In some embodiments, this mode may further include venting working fluid to manage working fluid pressures and/or maintain working fluid pressures within design and/or safe working limits.

In a tripped mode, active parasitic loads will be consistent with whatever mode preceded the Tripped mode, except where an active parasitic load also trips to a failsafe condition with a lower (or higher) load of the active parasitic loads. PHES system readiness exiting from tripped mode 1012 to another mode will vary depending on the initiating trip event.

B. PHES System Operating States and Transitional States

Operating States

Figure 11:
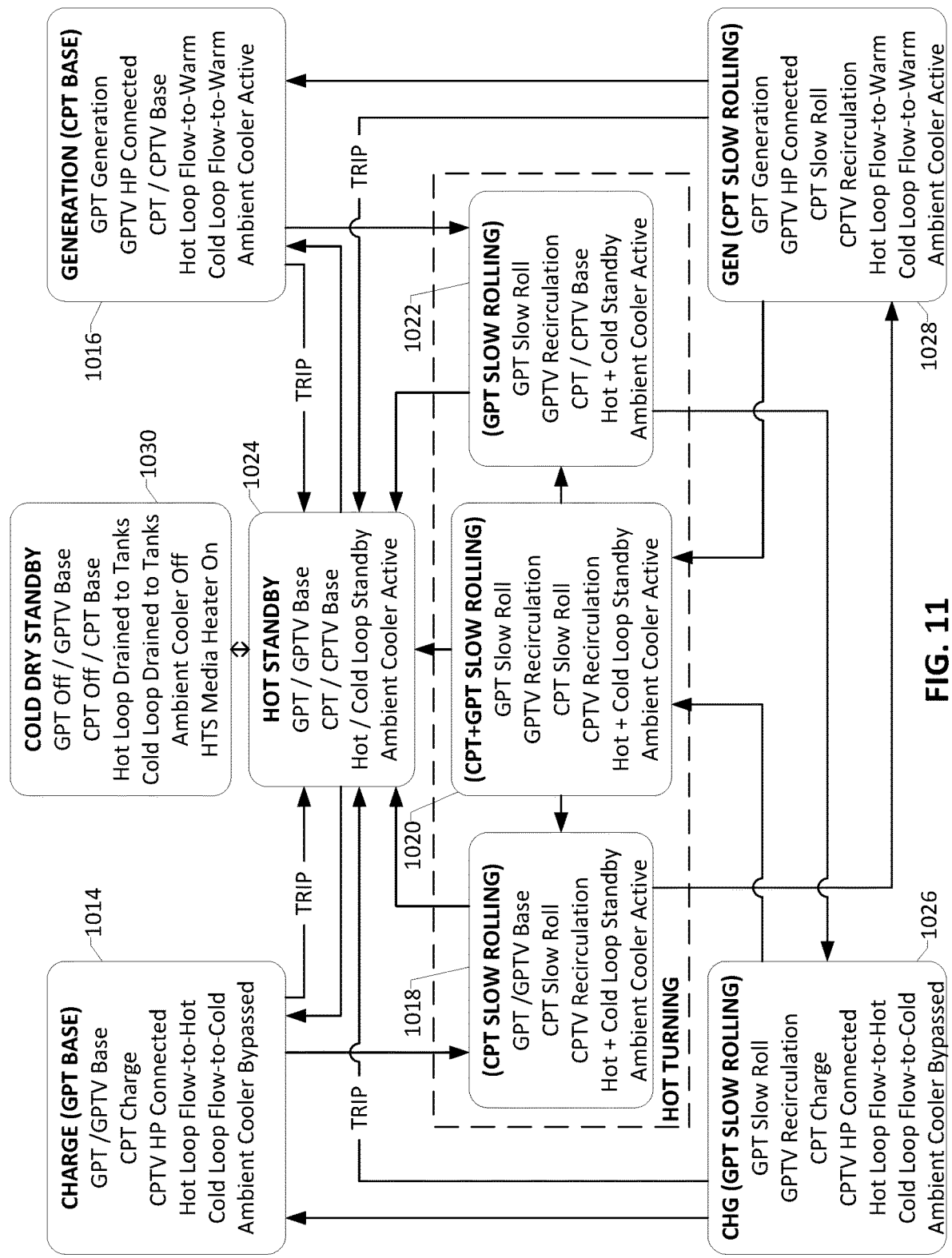
FIG. 11 is a state diagram illustrating operating states of a PHES system, according to an example embodiment.

FIG. 11 is a state diagram illustrating operating states of a PHES system, including PHES system 1000, according to an example embodiment. FIG. 11 mirrors the primary modes of operation shown in FIG. 10, including the preferred transitions between modes, as indicated by directional arrows between modes. FIG. 11 further adds additional detail regarding state conditions. Operating states are shown as headings in the blocks in FIG. 11. Some of these states represent different versions of three common modes of operation (i.e., hot turning 1006, charge 1002, and generation 1004) and account for alternate configurations in which the non-primary powertrain may be operating in (e.g., slow rolling or not slow rolling). The PHES system operating states illustrated in FIG. 11 are "holding states" in which the PHES systems spend significant time.

CHARGE (GPT BASE) 1014 is a charge mode 1002 operating state where the GPT system (e.g., GPT system 200) is at a base level with low or no activity. Valves associated with GPT system operation are configured at a base level (e.g., for no rotation of the GPT system). The CPT system (e.g., CPT system 100) is in charge mode with CPT turbomachinery rotating at steady state (i.e., operating) speed. Valves associated with the CPT system are configured for steady state rotation of CPT turbomachinery, including connection to high-pressure working fluid paths. The hot-side loop is configured for HTS medium to flow from a warm HTS system (e.g., warm HTS system 591) to a hot HTS system (e.g., hot HTS system 592) via an HHX system (e.g., HHX system 500). The cold-side loop is configured for CTS medium to flow from a warm CTS system (e.g., warm CTS system 691) to a cold CTS system (e.g., cold CTS system 692) via a CHX system (e.g., CHX system 600). Ambient cooling of working fluid (e.g. AHX system 700) is bypassed.

GENERATION (CPT BASE) 1016 is a generation mode 1004 operating state where the CPT system (e.g., CPT system 100) is at a base level with low activity. Valves associated with CPT system operation are configured at a base level (e.g., for no rotation of the CPT system). The GPT system (e.g., GPT system 200) is in generation mode with GPT turbomachinery rotating at steady state (i.e., operating) speed. Valves associated with the GPT system are configured for steady-state rotation of GPT turbomachinery, including connection to high-pressure working fluid paths. The hot-side loop is configured for HTS medium to flow from the hot HTS system (e.g., hot HTS system 592) to the warm HTS system (e.g., warm HTS system 591). The cold-side loop is configured for CTS medium to flow from the cold CTS system (e.g., cold CTS system 692) to the warm CTS system (e.g., warm CTS system 691). Ambient cooling of working fluid (e.g. AHX system 700) is active with working fluid circulating through the AHX system 700.

CHARGE (GPT SLOW ROLLING) 1026 is a charge mode 1002 operating state where the GPT system (e.g., GPT system 200) is slow rolling (i.e., GPT turbomachinery is spinning at a minimum speed). Valves associated with GPT system operation are configured for recirculation of working fluid through the GPT system. The CPT system (e.g., CPT system 100) is in charge mode with CPT turbomachinery rotating at operating speed. Valves associated with the CPT system are configured for steady-state rotation of CPT turbomachinery, including connection to high-pressure working fluid paths. The hot-side loop is configured for HTS medium to flow from the warm HTS system (e.g., warm HTS system 591) to the hot HTS system (e.g., hot HTS system 592). The cold-side loop is configured for CTS medium to flow from the warm CTS system (e.g., warm CTS system 691) to the cold CTS system (e.g., cold CTS system 692). Ambient cooling of working fluid (e.g. AHX system 700) is bypassed.

GENERATION (CPT SLOW ROLLING) 1028 is a generation mode 1004 operating state where the CPT system (e.g., CPT system 100) is slow rolling (i.e., CPT turbomachinery is spinning at a minimum speed). Valves associated with CPT system operation are configured for recirculation of working fluid through the CPT system. The GPT system (e.g., GPT system 200) is in generation mode with GPT turbomachinery rotating at operating speed. Valves associated with the GPT system are configured for steady-state rotation of GPT turbomachinery, including connection to high-pressure working fluid paths. The hot-side loop is configured for HTS medium to flow from the hot HTS system (e.g., hot HTS system 592) to the warm HTS system (e.g., warm HTS system 591). The cold-side loop is configured for CTS medium to flow from the cold CTS system (e.g., cold CTS system 692) to the warm CTS system (e.g., warm CTS system 691). Ambient cooling of working fluid (e.g. AHX system 700) is active with working fluid circulating through the AHX system 700.

HOT TURNING (CPT SLOW ROLLING) 1018 is a hot turning mode 1008 operating state where CPT system (e.g., CPT system 100) is slow rolling (i.e., CPT turbomachinery is spinning at a minimum speed). Valves associated with CPT system operation are configured for recirculation of working fluid through the CPT system. GPT system (e.g., GPT system 200) is at a base level with low activity. Valves associated with GPT system operation are configured at a base level (e.g., for no rotation of the GPT system). Hot-side and cold-side loops are in standby, where the HTS and CTS media are resident in the associated heat exchangers and thermal media loop fluid paths (e.g., HHX system 500 and CHX system 600, respectively). Heat traces on the hot-side loop are turned on as necessary to keep HTS medium in liquid phase. The ambient heat exchanger system (e.g. AHX system 700) is set to active state. AHX valves are set to allow working fluid circulation through the AHX system, but no working fluid may actually be circulating through the AHX system due to recirculation and/or base state of the working fluid at the powertrain. With no working fluid circulation through the AHX system, AHX system fans are turned off.

HOT TURNING (GPT SLOW ROLLING) 1022 is a hot turning mode 1008 operating state where GPT system (e.g., GPT system 200) is slow rolling (i.e., GPT turbomachinery is spinning at a minimum speed). Valves associated with GPT system operation are configured for recirculation of working fluid through the GPT system. CPT system (e.g., CPT system 100) is at a base level with low activity. Valves associated with CPT system operation are configured at a base level (e.g., for no rotation of the CPT system). Hot-side and cold-side loops are in standby, where the HTS and CTS media are resident in the associated heat exchangers and thermal media loop fluid paths (e.g., HHX system 500 and CHX system 600, respectively). Heat traces on the hot-side loop are turned on as necessary to keep HTS medium in liquid phase. The ambient heat exchanger system (e.g. AHX system 700) is set to active state. AHX valves are set to allow working fluid circulation through the AHX system, but no working fluid may actually be circulating through the AHX system due to recirculation and/or base state of the working fluid at the powertrain. With no working fluid circulation through the AHX system, AHX system fans are turned off.

HOT TURNING (CPT+GPT SLOW ROLLING) 1020 is a hot turning mode 1008 operating state where GPT system (e.g., GPT system 200) is slow rolling (i.e., GPT turbomachinery is spinning at a minimum speed) and CPT system (e.g., CPT system 100) is slow rolling (i.e., CPT turbomachinery is spinning at a minimum speed). Valves associated with GPT system operation are configured for recirculation of working fluid through the GPT system. Valves associated with CPT system operation are configured for recirculation of working fluid through the CPT system. Hot-side and cold-side loops are in standby, where the HTS and CTS media are resident in the associated heat exchangers and thermal media loop fluid paths (e.g., HHX system 500 and CHX system 600, respectively). Heat traces on the hot-side loop are turned on as necessary to keep HTS medium in liquid phase. The ambient heat exchanger system (e.g. AHX system 700) is set to active state. AHX valves are set to allow working fluid circulation through the AHX system, but no working fluid may actually be circulating through the AHX system due to recirculation and/or base state of the working fluid at the powertrain. With no working fluid circulation through the AHX system, AHX system fans are turned off.

HOT STANDBY 1024 is a hot standby mode 1008 operating state. GPT system (e.g., GPT system 200) is at a base level with low activity. Valves associated with GPT system operation are configured at a base level (e.g., for no rotation of the GPT system). CPT system (e.g., CPT system 100) is at a base level with low activity. Valves associated with CPT system operation are configured at a base level (e.g., for no rotation of the CPT system). Hot-side and cold-side loops are in standby, where the HTS and CTS media are resident in the associated heat exchangers and thermal media loop fluid paths (e.g., HHX system 500 and CHX system 600, respectively). Heat traces on the hot-side loop are turned on as necessary to keep HTS medium in liquid phase. The ambient heat exchanger system (e.g. AHX system 700) is set to active state. AHX valves are set to allow working fluid circulation through the AHX system, but no working fluid may actually be circulating through the AHX system due to base state of the working fluid at the powertrain. With no working fluid circulation through the AHX system, AHX system fans are turned off.

COLD DRY STANDBY 1030 is a cold dry standby mode 1010 operating state. GPT system (e.g., GPT system 200) is off with no significant activity. Valves associated with GPT system operation are configured at a base level (e.g., for no rotation of the GPT system). CPT system (e.g., CPT system 100) is off with no significant activity. Valves associated with CPT system operation are configured at a base level (e.g., for no rotation of the CPT system). HTS and CTS media in hot-side and cold-side loops, respectively, are drained to HTS and CTS tanks, respectively (e.g., tank(s) 510 and/or 520; tank(s) 610 and/or 620). In one embodiment, HTS medium 590 in HHX 500 and associated fluid paths is drained to hot HTS tank 520, and HTS medium 590 in warm HTS tank 510 remains in warm HTS tank 510. In another embodiment, CTS medium 690 in CHX 600 and associated fluid paths is drained to warm CTS tank 610, and CTS medium 690 in cold CTS tank 620 remains in cold CTS tank 620. Additionally or alternatively, HTS medium 590 and CTS medium 690 may be pumped between their respective tanks in the same manner as a thermal media rebalancing operation. Hot-side and cold-side heat exchangers and associated thermal media loop fluid paths (e.g., HHX system 500 and CHX system 600, respectively) are empty of thermal storage media and HTS and CTS media are not actively circulating. One or more HTS system 501 heaters (e.g., heaters 512, 522) are active to maintain HTS medium resident in tanks (e.g., HTS tanks 510, 520) in liquid state.

Transitional States

In addition to the operating states (i.e., long-term holding states) shown in FIG. 11, there are numerous additional transitionary states. These transitionary states would be within the paths shown by the arrows in FIG. 11. Between operating states, there may be transitional states where one or more subsystems need to switch to their own respective states. The subsystems may change their state (e.g., valve actuation, pump speed change) in specific preferred sequences. These transitions and the intermediary transitionary states that make up the transitions are described in more detail below.

C. States of Generation Powertrain and Associated Valves

Figure 12:
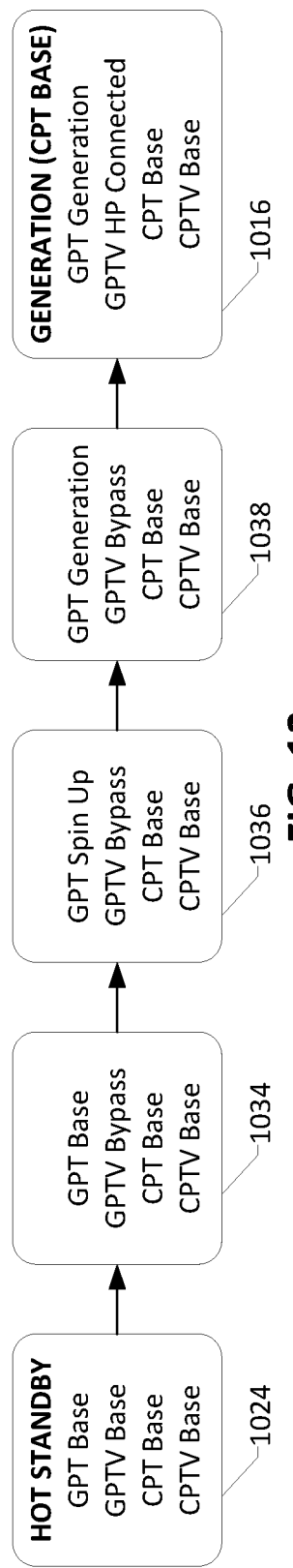
FIG. 12 is a state diagram illustrating select operating and transitional states of a PHES system, according to an example embodiment.
Figure 13:
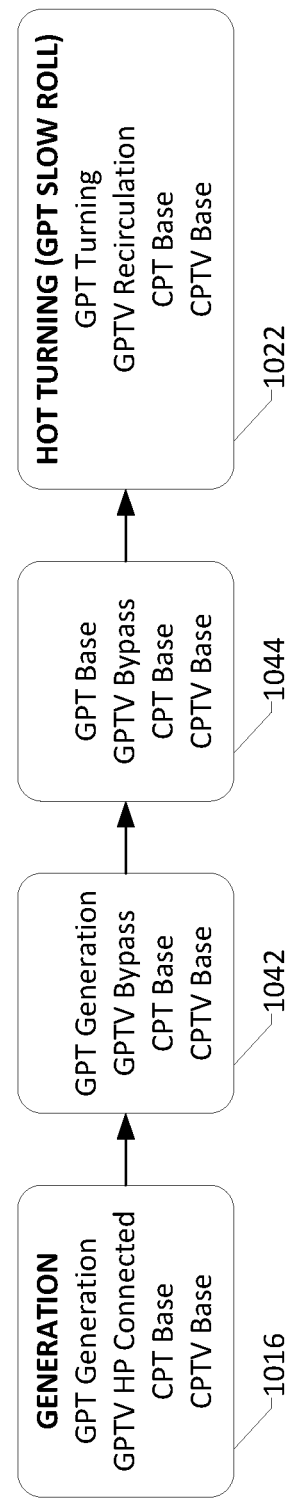
FIG. 13 is a state diagram illustrating select operating and transitional states of a PHES system, according to an example embodiment.

FIG. 12 and FIG. 13 are state diagrams illustrating select operating and transitional states of a PHES system, including PHES system 1000, each according to an example embodiment. These are example state transitions and other embodiments are possible as well. FIG. 12 and FIG. 13 are used primarily to illustrate generation powertrain state transitions. Other examples are provided herein reflecting other state transitions for other subsystems in a PHES system, for example, FIGS. 19, 20, 21, 22, and 23 and their associated descriptions.

FIG. 12 illustrates transition from the HOT STANDBY state 1024 to GENERATION (CPT BASE) state 1016, with intermediate transitional states 1034, 1036, 1038. During the transition from the HOT STANDBY state 1024 to GENERATION (CPT BASE) state 1016, the generation powertrain moves from the base state, at 1024 and 1034, to spin up to variable frequency drive state, at 1036, to power generation, at 1038 and 1016. The GPT valve system moves from its base state, at 1024, to bypassed state, at 1034 and 1036 and 1038, and then eventually to the connected state, at 1016. Beneficially, this overall transition process enables the generation powertrain to move through the spin up state with minimal load.

FIG. 13 illustrates transition from the GENERATION (CPT BASE) state 1016 to the HOT TURNING (GPT SLOW ROLLING) state 1022, with intermediate transitional states 1042 and 1044. During the transition from the GENERATION (CPT BASE) state 1016 to the HOT TURNING (GPT SLOW ROLLING) state 1022 (e.g., due to operator initiated shutdown of the generation mode 1004), the generation powertrain moves through the generation state, at 1016 and 1042, to the base state, at 1044, and then to the turning state, at 1022. The GPT valve systems move from a connected state, at 1016, to a bypass state, at 1042 and 1044, beneficially to allow the turbomachinery speed to drop, and eventually to a recirculation state, at 1022, beneficially to allow the rotor to cool down.

Figure 14:
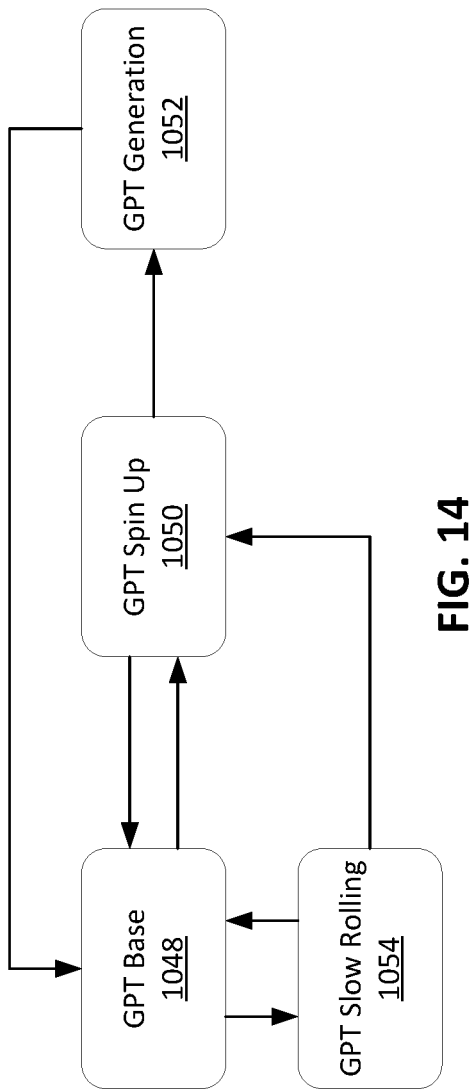
FIG. 14 is a state diagram illustrating generation powertrain states of a PHES system, according to an example embodiment.

FIG. 14 further describes the generation powertrain (e.g., GPT system 200) states (i.e., GPT states) illustrated in FIGS. 12 and 13. FIG. 14 is a state diagram illustrating generation powertrain states of a PHES system, including PHES system 1000, according to an example embodiment.

The states in FIG. 14 occur sequentially, for the most part, and correspond to startup and grid synchronization of the generation powertrain. The preferred sequential relationship of these states, with expected allowable transitions, is indicated by directional arrows between states.

At GPT Base state 1048, the generation powertrain is not driven. It is typically not spinning (i.e., at zero RPM), but it may still be spinning as it comes into this state from another state in which it was spinning Both generation circuit breakers (e.g., 211, 212) are open. The generation powertrain is ready to be spun.

At GPT Spin Up state 1050, the generation powertrain is connected to, and driven by, the VFD, spinning up to rated speed. For grid connections, once at grid speed, the generator (e.g., generation system 230) may not yet be synchronized to the external electrical grid.

GPT Generation state 1052, is a typical operating state for the generation mode 1004. At this state, the generation powertrain is spinning at rated speed (i.e., steady state) and the circuit breaker to the grid is closed. The generation powertrain is connected to the grid.

GPT Slow Roll state 1054, is a typical state for the generation powertrain when the PHES system is in charge mode 1002, unless the GPT system has cooled to the point that it can be in the base state. At this state, the generation powertrain is spinning at a low speed (i.e., slow rolling). A generation turning motor (e.g., 221-1) is on to maintain the slow rotational speed of the generation powertrain.

The generation powertrain states illustrated in FIGS. 12, 13, and 14 can be further described with respect to the electrical status of the power interface 2002. Table I lists power interface 2002 component status for GPT states illustrated in FIGS. 12, 13, and 14.

TABLE 1

| | Status | | | |
|---|---|---|---|---|
| | GPT Base 1048 | GPT Spin Up 1050 | GPT Generation 1052 | GPT Slow Roll 1054 |
| VFD 214 | Off | On | Off | Off |
| VFD-to-GEN Breaker 211 | Open | Closed | Open | Open |
| GEN grid-connect Breaker 212 | Open | Open | Closed | Open |
| GEN Turning Motor 221-1 | Off | Off | Off | On |

Transitions between generation powertrain states are described in the following paragraphs, with steps recited in preferred sequence. Component references refer to example embodiment GPT system 200, but the steps may be applied to other configurations to accomplish the same state transitions.

GPT Base 1048 to GPT Spin Up 1050. For this state transition, the working fluid loop valving configuration and pressure must be at the right state before this transition can take place, as described below with respect to GPTV states. Power is first applied to a motor to spin the generation powertrain. In GPT system 200, VFD-to-generator breaker 211 is closed and VFD 214 is turned on, resulting in the generation powertrain spinning. Generator 210-1 is acting as a motor and accepting current from VFD 214. Compressor 230-1 and turbine 240-1 are spinning. The motor speed is then increased via VFD 214, bringing the generation powertrain up to a grid-synchronous speed.

GPT Spin Up 1050 to GPT Generation 1052. This transition is a grid-synchronization transition. Motor (e.g., generator 210-1 acting as a motor) speed is adjusted through current control (e.g., at VFD 214) to ensure grid-synchronous speed and to prevent speed overshoot. Motor phase is adjusted (e.g., at VFD 214) until the motor phase is grid synchronous. Power supply from grid to motor is shutoff (e.g., grid-connect breaker 212 is closed), and the motor then acts as a generator to supply power to the grid (e.g., VFD-to-generator breaker 211 is opened). The VFD will then start powering down to zero.

GPT Generation 1052 to GPT Base 1048. This transition can happen, for example, during both normal shutdown of the generation powertrain and during a trip event. Power supply from grid to motor is opened (e.g., grid-connect breaker 212 is opened). Once the generation powertrain has transitioned into GPT Base 1048 (after opening of the breaker), the generation powertrain will still be spinning, and will start ramping down to zero speed unless the generation powertrain is further transitioned to the GPT Slow Rolling 1054 state prior to spinning down to zero.

GPT Spin Up 1050 to GPT Base 1048. This transition could happen, for example, due to a trip signal. The VFD (e.g., VFD 214) is turned off and no longer connected to the generator (e.g., VFD-to-generator breaker 211 is opened). Once the generation powertrain has transitioned into GPT Base 1048 (after opening of the breaker), the generation powertrain will still be spinning, and will start ramping down to zero speed unless the generation powertrain is further transitioned to the GPT Slow Rolling 1054 state prior to spinning down to zero GPT Base 1048 to GPT Slow Rolling 1054. This transition takes place by turning on the turning motor (e.g., turning motor 221-1), which turns the drive train (e.g., generation turbomachinery 230-1, 240-1) at a very low, "slow rolling speed" (e.g., 0.1% to 1%, 1% to 5%, or 5% to 10% of steady state generation RPM). In normal operation, as the drive train ramps down in speed, the turning motor will be turned on during ramp down to ensure the speed of the turbomachinery drivetrain does not slow down below the slow rolling speed, or if the speed slows below the slow rolling speed, then it is brought back to the slow rolling speed. This can be accomplished through an overrunning clutch (e.g., overrunning clutch 221-2) connected between the turning motor and the drivetrain that disengages when the driver side (e.g. drivetrain) of the clutch is operating at speeds higher than the slow rolling speed, and engages when the driver side of the clutch is operating at speeds lower than or equal to the slow rolling speed. This results in the turning motor engaging with the turbine when the turbine reaches the speed of the turning motor. The motor will then maintain the slow rolling speed.

GPT Slow Rolling 1054 to GPT Base 1048. The turning motor (e.g., turning motor 221-1) is turned off. The generation powertrain will subsequently coast down to substantially zero rpm.

GPT Slow Rolling 1054 to GPT Spin Up 1050. To start the generation startup process with the generation powertrain spinning, the powertrain can transition directly from GPT Slow Rolling 1054 to GPT Spin Up 1050 by sequentially connecting the VFD to the generator (acting as a motor) (e.g., closing VFD-to-generator breaker 211) and turning off the turning motor (e.g., turning motor 221-1).

The generation powertrain transitional states illustrated in FIGS. 12 and 13 can also be further described with respect to the valve states associated with generation powertrain, including, for example, bypass and recirculation loops.

Figure 16:
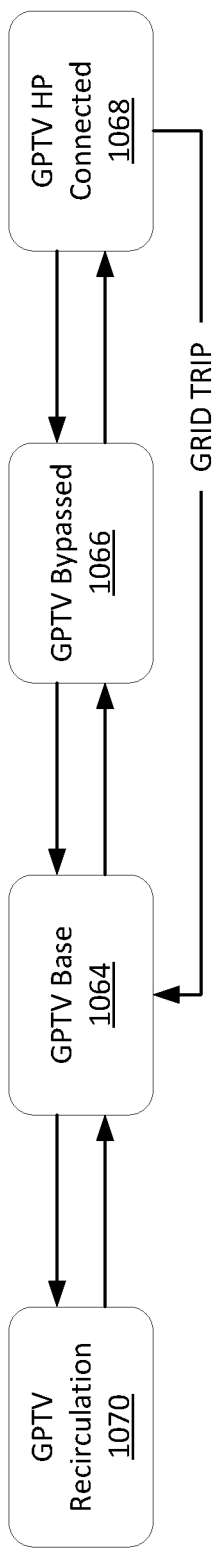
FIG. 16 is a state diagram illustrating generation powertrain valve states of a PHES system, according to an example embodiment.

FIG. 16 is a state diagram illustrating generation powertrain (e.g., GPT system 200) valve states (i.e., GPTV states), of a PHES system, including PHES system 1000, from a generation powertrain perspective (e.g., GPT system 200 and associated GPT system 200 bypass/recirculation valves), according to an example embodiment.

The states in FIG. 16 occur sequentially, for the most part. The preferred sequential relationship of these states, with expected allowable transitions, is indicated by directional arrows between states.

At GPTV Base state 1064, the valves are configured to have both recirculation valves and the bypass valves open. This is considered a fail-safe state.

At GPTV Recirculation state 1070, the generation working fluid valves are configured such that they can provide working fluid circulation and any desired heat removal for the generation powertrain (e.g., GPT system 200) as it spins at a low rate (e.g., slow rolling speed). The generation powertrain is also isolated from the high-pressure side of the working fluid loop (e.g., working fluid loop 300).

At GPTV Bypassed state 1066, the bypass valve is open in addition to the isolation (shutoff) valves. This allows working fluid to bypass the generation turbine partially, which allows the control of the turbine power generation prior to reaching full speed and closing the breaker. Beneficially, this allows the use of a uni-directional VFD (e.g., VFD 214).

At GPTV HP Connected state 1068, the generation working fluid valves are configured such that working fluid can be circulated between the high-pressure side and the low-pressure side via the generation powertrain. All the working fluid bypass loops are closed to prevent loss. Valve 229 is closed but may be in a state where it is ready to be opened quickly to help with anti-surge as necessary in case of a trip event.

Table II lists valve status for state transitions illustrated in FIGS. 12 and 13 and GPTV states illustrated in FIG. 16.

TABLE II

| | Status | | | |
|---|---|---|---|---|
| | GPTV Base 1064 | GPTV Recirculation 1070 | GPTV Bypassed 1066 | GPTV HP Connected 1068 |
| Compressor Shutoff Valve 231 (fails closed) | Closed | Closed | Open | Open |
| Turbine Shutoff Valve 241 (fails closed) | Closed | Closed | Open | Open |
| Compressor Bypass Valve 229 (fails open) | Open | Closed | Open | Closed |
| Compressor Recirc Valve 232 (fails closed) | Open | Open | Closed | Closed |
| Turbine Recirc Valve 242 (fails open) | Open | Open | Closed | Closed |
| Bypass Path Valve 222 (fails open) | Closed | Closed | Closed | Closed |
| Bypass Path Valve 401 | Closed | Closed | Closed | Closed |

Further illustrating the GPTV states, FIGS. 3A, 3B, 3C, and 3D each illustrate a portion of FIG. 3 encompassing GPT system 200 and associated bypass/recirculation valves, each according to an example embodiment. FIG. 3A illustrates GPTV base state 1064. FIG. 3B illustrates GPTV Bypass state 1066. FIG. 3C illustrates GPTV Recirculation state 1070. FIG. 3D illustrates GPTV HP Connected state 1068. Valve positions are indicated in FIGS. 3A, 3B, 3C, and 3D with a filled valve icon representing a closed valve and an unfilled valve icon representing an open valve. For example, in FIG. 3A, valve 231 is closed and valve 232 is open.

Transitions between generation powertrain valve (GPTV) states are described in the following paragraphs, with steps recited in preferred sequence. Component references refer to example embodiments GPT system 200 and working fluid loop 300, but the steps may be applied to other configurations to accomplish the same GPTV state transitions.

GPTV Base 1064 to GPTV Recirculation 1070. Turbine bypass fluid path is closed (e.g., valve 229 is closed).

GPTV Base 1064 to GPTV Bypassed 1066. Compressor recirculation fluid path and turbine recirculation fluid path are closed (e.g., valve 232 and valve 242 are closed). Turbine bypass fluid path (e.g., valve 229) remains open to allow working fluid to go through the bypass loop. Compressor outlet (shutoff) valve 231 is opened. Turbine inlet (shutoff) valve 241 is opened.

GPTV Bypassed 1066 to GPTV HP Connected 1068. Turbine bypass fluid path is closed (e.g., valve 229 is closed).

GPTV Bypassed 1066 to GPTV Base 1064. Generation powertrain recirculation fluid paths are opened (e.g., recirculation valves 232, 242 are opened). Turbine inlet fluid paths are closed (e.g., valve 241 is closed). Compressor outlet fluid path is closed (e.g., valve 231 is closed).

GPTV HP Connected 1068 to GPTV Base 1064. This transition can happen, for example, due to a trip event. Turbine inlet fluid paths are quickly closed (e.g., valve 241 is quickly closed). Turbine bypass fluid path is quickly opened (e.g., valve 229 is quickly opened) to help with anti-surge. Compressor outlet fluid path is closed (e.g., valve 231 is closed). Generation powertrain recirculation fluid paths are opened (e.g., recirculation valves 232, 242 are opened).

GPTV HP Connected 1068 to GPTV Bypassed 1066. This transition generally happens during normal shut down. Turbine bypass fluid path is opened (e.g., valve 229 is opened) to help with anti-surge.

GPTV Recirculation 1070 to GPTV Base 1064. Turbine bypass fluid path is opened (e.g., valve 229 is opened).

D. States of Charge Powertrain and Associated Valves

Figure 15:
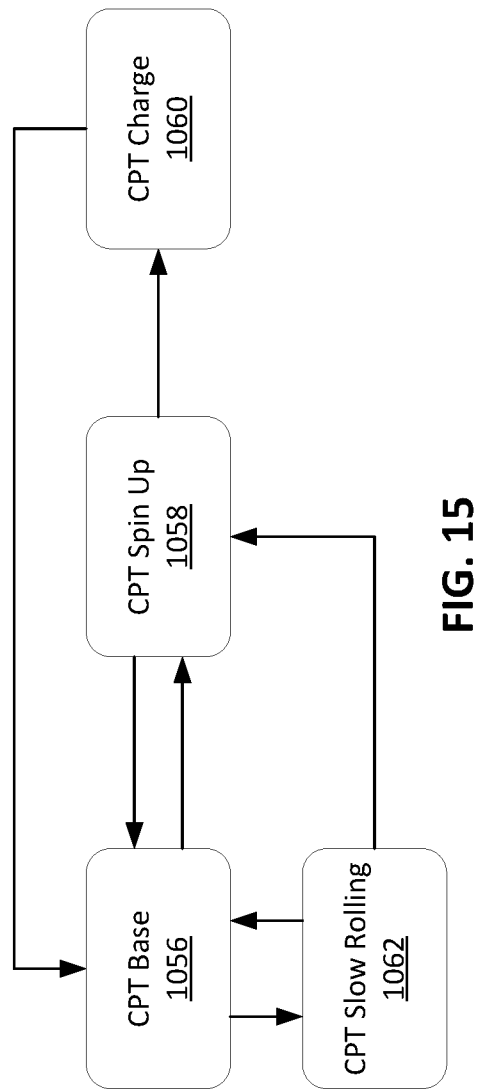
FIG. 15 is a state diagram illustrating charge powertrain states of a PHES system, according to an example embodiment.

FIG. 15 is a state diagram illustrating charge powertrain (e.g., CPT system 100) states (i.e., CPT states) of a PHES system, including PHES system 1000, according to an example embodiment.

The states in FIG. 15 occur sequentially, for the most part. The preferred sequential relationship of these states, with expected allowable transitions, is indicated by directional arrows between states.

At CPT Base state 1056, the charge powertrain is not driven. It is typically not spinning (i.e., at zero RPM), but it may still be spinning as it comes into this state from another state in which it was spinning Both charge circuit breakers (e.g., 111, 112) are open. The charge powertrain is ready to be spun.

At CPT Spin Up state 1058, the charge powertrain is connected to, and driven by, the VFD, spinning up to rated speed. For grid connections, once at grid speed, the motor (e.g., charge motor system 110) is not yet synchronized to the external electrical grid.

CPT Charge state 1060, is a typical operating state for the charge mode 1002. At this state, the charge powertrain is spinning at rated speed (i.e., steady state) and the circuit breaker to the grid is closed. The charge powertrain is connected to the grid.

CPT Slow Rolling state 1062, is a typical state for the charge powertrain when the PHES system is in generation mode 1004, unless the CPT system has cooled to the point that it can be in the base state. At this state, the charge powertrain is spinning at a very low, "slow rolling speed" (e.g., 0.1% to 1%, 1% to 5%, or 5% to 10% of steady state charge RPM). A charge turning motor (e.g., 121-1) is on to maintain the slow rolling speed of the charge powertrain.

The charge powertrain states illustrated in FIG. 15 can be further described with reference to the electrical status of the power interface 2002, illustrated in FIG. 9, which can control electrical power in the CPT system 100. Table III lists power interface 2002 component status, and charge turning motor, for CPT states illustrated in FIG. 15.

TABLE III

| | Status | | | |
|---|---|---|---|---|
| | CPT Base | CPT Spin Up | CPT Charge | CPT Slow Roll |
| VFD 214 | Off | On | Off | Off |
| VFD-to-CHG-Motor Breaker 111 | Open | Closed | Open | Open |
| CHG Motor Grid-connect Breaker 112 | Open | Open | Closed | Open |
| CHG Turning Motor 121-1 | Off | Off | Off | On |

Transitions between charge powertrain states are described in the following paragraphs, with steps recited in preferred sequence. Component references refer to example embodiment CPT system 100 and power interface 2002, but the steps may be applied to other configurations to accomplish the same state transitions.

CPT Base 1056 to CPT Spin Up 1058. For this state transition, the working fluid loop valving configuration and pressure must be at the right state before this transition can take place, as described below with respect to CPTV states. Power is first applied to a motor (e.g., motor 110-1) to spin the charge powertrain. For CPT system 100, VFD-to-motor breaker 111 is closed and VFD 214 is turned on, resulting in the charge powertrain spinning Compressor system 1301 and turbine system 140 are spinning. The motor speed is then increased via VFD 214, bringing the generation powertrain up to a grid-synchronous speed.

CPT Spin Up 1058 to CPT Charge 1060. This transition is a grid-synchronization transition. Motor (e.g., motor 110-1) speed is adjusted through current control (e.g., at VFD 214) to ensure grid-synchronous speed and to prevent speed overshoot. Motor phase is adjusted (e.g., at VFD 214) until the motor phase is grid synchronous. Power supply from grid to motor is activated (e.g., grid-connect breaker 112 is closed), and VFD power to motor is stopped (e.g., VFD-to-motor breaker 111 is opened). The VFD will then start powering down to zero.

CPT Charge 1060 to CPT Base 1056. This transition happens, for example, during both normal shutdown of the charge powertrain and during a trip event. Power supply from grid to motor is halted (e.g., grid-connect breaker 112 is opened). Once the charge powertrain has transitioned into CPT Base 1056 (upon the opening of the breaker), the charge powertrain will still be spinning, and will start ramping down to zero speed unless the powertrain is further transitioned to the CPT Slow Rolling 1062 state prior to spinning down to zero.

CPT Spin Up 1058 to CPT Base 1056. This transition could happen, for example, due to a trip signal. The VFD (e.g., VFD 214) is turned off and no longer connected to the motor (e.g., VFD-to-motor breaker 111 is opened). Once the charge powertrain has transitioned into CPT Base 1056 (upon the opening of the breaker), the charge powertrain will still be spinning, and will start ramping down to zero speed unless the charge powertrain is further transitioned to the CPT Slow Rolling 1062 state prior to spinning down to zero.

CPT Base 1056 to CPT Slow Rolling 1062. This transition takes place by turning on the turning motor (e.g., turning motor 121-1), which turns the drivetrain (e.g., charge turbomachinery 130-1, 140-1) at a low speed (e.g., slow rolling speed). In normal operation, as the drivetrain ramps down in speed, the turning motor will be turned on during ramp down to ensure the speed of the drivetrain does not slow down below the minimum speed, or if the speed slows below the minimum speed, then it is brought back to the minimum speed. This can be accomplished through an overrunning clutch (e.g., overrunning clutch 121-2) connected between the turning motor and the drivetrain that disengages when the driver side (e.g., drivetrain) of the clutch is operating at speeds higher than a minimum speed (e.g., slow rolling speed), and engages when the driver side of the clutch is operating at speeds lower than or equal to a minimum speed (e.g., slow rolling speed). This results in the turning motor engaging with the turbine when the turbine reaches the speed of the turning motor. The motor will then maintain the low (e.g., slow rolling) speed.

CPT Slow Rolling 1062 to CPT Base 1056. The turning motor (e.g., turning motor 121-1) is turned off. The charge powertrain will subsequently coast down to zero rpm.

CPT Slow Rolling 1062 to CPT Spin Up 1058. To start the charge startup process with the charge powertrain spinning, the powertrain can transition directly from CPT Slow Rolling 1062 to CPT Spin Up 1058 by sequentially connecting the VFD to the motor (e.g., closing VFD-to-motor breaker 111) and turning off the turning motor (e.g., turning motor 121-1).

Charge powertrain transitional states can also be further described with respect to the valve states associated with charge powertrain bypass and recirculation loops.

Figure 17:
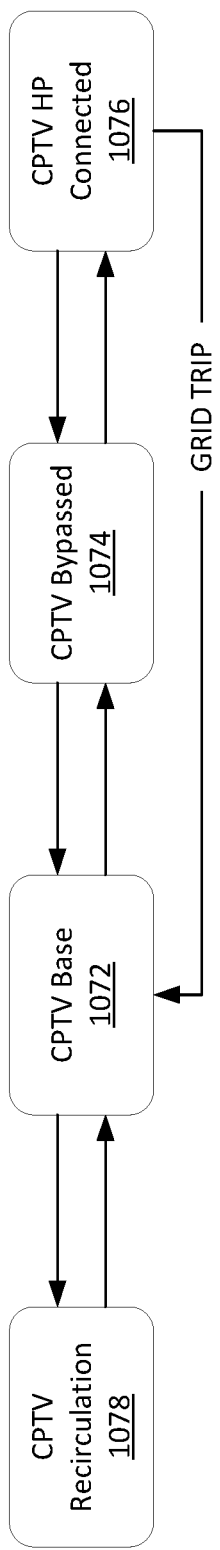
FIG. 17 is a state diagram illustrating charge powertrain valve states of a PHES system, according to an example embodiment.

FIG. 17 is a state diagram illustrating charge powertrain (e.g., CPT system 100) valve states (i.e., CPTV states), of a PHES system, including PHES system 1000, from a charge powertrain perspective (e.g., CPT system 100 and associated CPT system 100 bypass/recirculation valves), according to an example embodiment.

The states in FIG. 17 occur sequentially, for the most part. The preferred sequential relationship of these states, with expected allowable transitions, is indicated by directional arrows between states.

At CPTV Base state 1072, the valves are configured to have both recirculation valves and the bypass valves open. This is considered a fail-safe state.

At CPTV Recirculation state 1078, the generation working fluid valves are configured such that they can provide working fluid circulation and any desired heat removal for the charge powertrain (e.g., CPT system 100) as it spins at a slow rate (e.g., slow rolling speed). The charge powertrain is also isolated from the high-pressure side of the working fluid loop.

At CPTV Bypassed state 1074, the bypass valve is open in addition to the isolation valves. This allows working fluid to circulate via a bypass loop to reduce load on the charge compressor (e.g., compressor system 130).

At CPTV HP Connected state 1076, the charge working fluid valves are configured such that working fluid can be circulated between the high-pressure side and the low-pressure side via the charge powertrain. All the working fluid bypass loops are closed to prevent loss. Valve 119 is closed but in a state where it is ready to be opened quickly to help with anti-surge as necessary in case of a trip event.

Table IV lists valve status for CPTV states illustrated in FIG. 17.

TABLE IV

| | Status | | | |
|---|---|---|---|---|
| Valve | CPTV Base 1072 | CPTV Recirculation 1078 | CPTV Bypassed 1074 | CPTV HP Connected 1076 |
| Compressor Shutoff Valve 131 (fails closed) | Closed | Closed | Open | Open |
| Turbine Shutoff Valve 141 (fails closed) | Closed | Closed | Open | Open |

TABLE IV-continued

| | Status | | | |
|---|---|---|---|---|
| Valve | CPTV Base 1072 | CPTV Recirculation 1078 | CPTV Bypassed 1074 | CPTV HP Connected 1076 |
| Compressor Bypass Valve 119 (fails closed) | Open | Closed | Open | Closed |
| Compressor Recirc Valve 132 (fails closed) | Open | Open | Closed | Closed |
| Turbine Recirc Valve 142 (fails open) | Open | Open | Closed | Closed |

Further illustrating the CPTV states, FIGS. 3E, 3F, 3G, and 3H each illustrate a portion of FIG. 3 encompassing CPT system 100 and associated bypass/recirculation valves, each according to an example embodiment. FIG. 3E illustrates CPTV base state 1072. FIG. 3F illustrates CPTV Bypass state 1074. FIG. 3G illustrates CPTV Recirculation state 1078. FIG. 3H illustrates CPTV HP Connected state 1076. Valve positions are indicated in FIGS. 3E, 3F, 3G, and 3H with a filled valve icon representing a closed valve and an unfilled valve icon representing an open valve. For example, in FIG. 3E, valve 131 is closed and valve 132 is open.

Transitions between charge powertrain valve (CPTV) states are described in the following paragraphs, with steps recited in preferred sequence. Component references refer to example embodiments CPT system 100 and working fluid loop 300, but the steps may be applied to other configurations to accomplish the same CPTV state transitions.

CPTV Base 1072 to CPTV Recirculation 1078. Compressor high-flow recirculation fluid path is closed (e.g., valve 119 is closed).

CPTV Base 1072 to CPTV Bypassed 1074. Compressor recirculation fluid path and turbine recirculation fluid path are closed (e.g., valve 132 and valve 142 are closed). Compressor high-flow recirculation fluid path (e.g., valve 119) remains open to allow working fluid to go through the recirculation loop. Compressor outlet valve 131 is opened. Turbine inlet valve 141 is opened.

CPTV Bypassed 1074 to CPTV HP Connected 1076. Compressor high-flow recirculation fluid path is closed (e.g., valve 119 is closed).

CPTV Bypassed 1074 to CPTV Base 1072. Charge powertrain recirculation fluid paths are opened (e.g., recirculation valves 132, 142 are opened). Turbine inlet fluid path is closed (e.g., valve 141 is closed). Compressor outlet fluid path is closed (e.g., valve 131 is closed).

CPTV HP Connected 1076 to CPTV Base 1072. This transition may happen, for example, due to a trip event. Turbine inlet fluid path is quickly closed (e.g., valve 141 is quickly closed). Compressor high-flow recirculation fluid path is quickly opened (e.g., valve 119 is quickly opened) to help with anti-surge. Compressor outlet fluid path is closed (e.g., valve 131 is closed). Charge powertrain recirculation fluid paths are opened (e.g., recirculation valves 132, 142 are opened).

CPTV HP Connected 1076 to CPTV Bypassed 1074. This transition can happen, for example, during normal shut down or during a grid trip event. Compressor high-flow recirculation fluid path is opened (e.g., valve 119 is opened) to help manage the pressure ratio across the compressor and avoid compressor surge.

CPTV Recirculation 1078 to CPTV Base 1072. Compressor high-flow recirculation fluid path is opened (e.g., valve 119 is opened).

E. States of Ambient Heat Exchanger and Associated Valves

Figure 18:
FIG. 18 is a state diagram illustrating ambient cooler states of a PHES system, according to an example embodiment.

FIG. 18 is a state diagram illustrating ambient cooler (also referred to as ambient heat exchanger) states (e.g., AHX system 700) of a PHES system, including PHES system 1000, according to an example embodiment. The two states in FIG. 18 can transition back-and-forth, as indicated by directional arrows between the states.

Example ambient cooler states include, Ambient Cooler Bypassed 1080, Ambient Cooler Active 1082, and Ambient Cooler Off 1084. During Ambient Cooler Off 1084, working fluid loop valves regulating working fluid flow paths into or out of the ambient cooler (e.g., AHX system 700) are all closed, preventing movement of working fluid into or out of the ambient cooler. Ambient cooler fans, if present, are off. During Ambient Cooler Bypassed 1080, working fluid loop valves are configured such that the ambient cooler is bypassed by working fluid circulating in the working fluid loop (e.g. working fluid loop 300). Ambient cooler fans, if present, are off. During Ambient Cooler Active 1082, working fluid loop valves are configured such that working fluid in the working fluid loop can enter the ambient cooler. If the working fluid is actually circulating through the ambient cooler, the ambient cooler removes heat from working fluid in the working fluid loop and exhausts it the environment; this state may, for example, be used during generation mode 1004 and the bypass state 1080 may, for example, be used during charge mode 1002. Ambient cooler fans, if present, may be used to vary the rate of heat extraction from the working fluid. Ambient cooler fans may be turned on, and may have their speed adjusted, when working fluid is actively circulating through the ambient cooler, and the fans may be turned off if the working fluid is not actively circulating through the ambient cooler, regardless of valve configuration.

Alternatively, in other embodiments of PHES systems and/or working fluid loop, an ambient cooler (e.g., AHX system 700) can be configured to be continuously connected to the working fluid loop (i.e., no bypass state is available). In these alternative embodiments, the fans or other equipment (e.g., heat sink fluid flow rate) are used to vary the heat removal capability of the ambient cooler. For example, during generation mode 1004, ambient cooler fans are turned on to actively remove heat from the working fluid, and during generation mode 1002, when ambient cooler fans are turned off, the ambient cooler does not passively remove a significant amount of heat from the working fluid.

Table V lists cooler and valve status for ambient cooler (e.g., AHX system 700) states illustrated in FIG. 18.

TABLE V

| | Status | | |
|---|---|---|---|
| | Ambient Cooler Bypassed 1080 | Ambient Cooler Active 1082 | Ambient Cooler Off 1084 |
| Bypass Valve 323 | Open | Closed | Closed |
| Cold-side Isolation Valve 324 | Closed | Open | Closed |
| Recuperator-side Isolation Valve 325 | Closed | Open | Closed |
| AHX Fans | Fan Off | Fan On | Fan Off |

Further illustrating ambient cooler states 1080 and 1082, FIGS. 3I and 3J each illustrate a portion of FIG. 3 encompassing AHX system 700 and associated bypass valves, according to an example embodiment. FIG. 3I illustrates ambient cooler bypass state 1080. FIG. 3J illustrates ambient cooler active state 1082. Valve positions are indicated in FIGS. 3I and 3J with a filled valve icon representing a closed valve and an unfilled valve icon representing an open valve. For example, in FIG. 3I, valve 324 is closed and valve 323 is open.

In an alternative valve arrangement for the ambient cooler states 1080 and 1082, FIGS. 3K and 3L each illustrate a portion of FIG. 3, but with valve 325 removed. FIG. 3K illustrates ambient cooler bypass state 1080. FIG. 3L illustrates ambient cooler active state 1082. Valve positions are indicated in FIGS. 3K and 3L with a filled valve icon representing a closed valve and an unfilled valve icon representing an open valve. For example, in FIG. 3K, valve 324 is closed and valve 323 is open. The valve states in Table V are applicable to both FIGS. 3I, 3J and FIGS. 3K, 3L, with the exception that valve 325 states are not applicable to FIGS. 3K, 3L.

Transitions between ambient cooler states are described in the following paragraphs, with steps recited in preferred sequence. Component references refer to example embodiments of AHX system 700 and working fluid loop 300, but the steps may be applied to other configurations to accomplish the same ambient cooler state transitions.

Ambient Cooler Bypassed 1080 to Ambient Cooler Active 1082. This transition may occur, for example, for mode switch from charge mode 1002 to generation mode 1004 or from start up (e.g., cold dry standby mode 1010) to hot standby 1024. Isolation valves 324 and 325 (if present) are opened. Bypass valve 323 is closed. If working fluid is circulating through the ambient cooler (e.g. AHX system 700), fans (e.g., fans in AHX system 700) are turned on and fan speed may be controlled for desired heat removal.

Ambient Cooler Active 1082 to Ambient Cooler Bypassed 1080. This transition may occur, for example, for mode switch from generation mode 1004 to charge mode 1002. Isolation valves 324 and 325 (if present) are closed. Bypass valve 323 is opened. Fans (e.g., fans in AHX system 700) are turned off.

Ambient Cooler Active 1082 to Ambient Cooler Off 1084. This transition may occur, for example, for mode switch from hot standby 1008 and/or 1024 to cold dry standby 1010 and/or 1030. Isolation valves 324 and 325 (if present) are closed. Bypass valve 323 is closed. Fans (e.g., fans in AHX system 700) are turned off.

F. States and Control of Inventory Control System

The working fluid inventory control system (ICS) is part of the working fluid loop subsystem (e.g., working fluid loop 300). The inventory control system may include a compressor, a filtering system to condition the working fluid, one or more working fluid tanks, fluid paths, and valves to manage the various requirements from this system.

Example components of an ICS 390 embodiment, as implemented in working fluid loop 300, are shown in FIG. 3M. FIG. 3M illustrates a portion of FIG. 3 encompassing an inventory control system, according to an example embodiment.

As illustrated in FIG. 24, one or more control systems may be used to control ICS system 390. A PHES supervisory controller 1124 may determine and/or direct PHES system 1000 modes and/or states, which may include ICS system 390 modes and/or states. Alternatively or additionally, an ICS controller 1125 may receive directives from PHES supervisory controller 1124, responsively enact changes in ICS 390, and report conditions to PHES supervisory controller 1124. For example, a power demand signal can be sent from PHES supervisory controller 1124 to ICS controller 1125. The ICS controller 1125 may then determine valve sequences and operations based, for example, on current PHES system conditions and the power demand signal. Alternatively or additionally, PHES supervisory controller 1124 may enact changes in ICS 390. For example, PHES supervisory controller 1124 may determine a new power demand level in the PHES system 1000 and responsively direct valve sequences and operations based, for example, on current PHES system conditions and power requirements, to reach that power demand level.

During normal operation, in order to increase power in the PHES system 1000, a controller (e.g., controller 1125 and/or controller 1124) can increase the working fluid pressure. To accomplish this, the controller can cause the following:

Open valve 312 to throttle working fluid from low-pressure tank system 310 into the low-pressure side of the working fluid loop 300. This increases the inlet pressure into the CPT system 100 or GPT system 200, which will, in turn, increase the power of the PHES system 1000.

Determine current PHES system 1000 power level and compare to the power demand level. This step may be repeated until: (i) the current power level matches the demand level, or (ii) there is no more driving head (the pressure in low-pressure tank system 310 is only marginally above the working fluid loop 300 low-side pressure). The latter stop condition can be determined, for example, by comparing low-pressure tank system 310 pressure and working fluid loop 300 low-side pressure, or by determining that current power levels have ceased increasing. If either of these stop conditions are met, close valve 312.

Determine if further power increase is still required (i.e., the second stop condition above occurred prior to reaching demand level). If further power increase is required, open valve 322 to add working fluid from the high-pressure tank system 320 into the low-pressure side of the working fluid loop 300. This can be continued until the PHES system 1000 reaches the demand power level. The ICS tank systems 310, 320 are preferably sized such that the PHES system 1000 can get to full power in either charge mode 1002 or generation mode 1004.

To decrease the power in the PHES system 1000, a controller (e.g., controller 1125 and/or controller 1124) can decrease the working fluid pressure. To accomplish this, the controller can cause the following:

Open valve 321 to throttle working fluid from the high-pressure side of the working fluid loop 300 into high-pressure tank system 320. This decreases the inlet pressure into the CPT system 100 or GPT system 200, which will, in turn, decrease the power of the PHES system 1000.

Determine current PHES system 1000 power level and compare to the power demand level. This step may be repeated until: (i) the current power level matches the demand level, or (ii) there is no more driving head (high-pressure side of the working fluid loop 300 is only marginally above the pressure in high-pressure tank system 320). The latter stop condition can be determined, for example, by comparing high-pressure tank system 320 pressure and working fluid loop 300 high-side pressure, or by determining that current power levels have ceased decreasing. If either of these stop conditions are met, close valve 321.

Determine if further power decrease is still required (i.e., the second stop condition above occurred prior to reaching demand level). If further power decrease is required, open valve 311 to add working fluid from the high-pressure side of the working fluid loop 300 into the low-pressure tank system 310. This can be continued until the PHES system 1000 reaches the demand power level. The ICS tank systems 310, 320 are preferably sized such that the system can get to minimum power in either charge mode 1002 or generation mode 1004.

Other functions ICS controller 1125 can perform include bringing the working fluid loop 300 pressures to a desired pressure (e.g., base, ambient, $P_{standby}$, specific pressure range(s) that are below either or both the current pressures in the working fluid high-side fluid paths and low-side fluid paths) following a normal shutdown or a trip event so that the PHES system can be restarted.

Following a trip event, a controller (e.g., controller 1125 and/or controller 1124) can cause the following:

Open valve 318 to bleed working fluid from high-pressure working fluid paths into low-pressure tank system 310. By using large valve 318 (instead of or in addition to valve 311), this can reduce the pressure in the high-pressure working fluid paths at a rate fast enough to help maintain a settle-out pressure below a threshold limit.

Close valve 318 once pressure in low-pressure tank system 310 is substantially equal to that of the high-pressure working fluid paths.

Open valve 305 and then turn on compressor 303 to draw working fluid from high-pressure working fluid paths into high-pressure tank system 320 until the high-pressure working fluid paths are within a desired high-pressure range.

Turn off compressor 303 and then close valve 305.

Open valve 304 and then turn on compressor 303 to draw working fluid from low-pressure working fluid paths into the high-pressure tank system 320 until the low-pressure working fluid paths are within a desired low-pressure range.

If the PHES system 1000 is shut down normally, large valve 318 may not need to be opened because the pressure in the high-pressure working fluid paths has been slowly reduced during the process to substantially a base level. Accordingly, a controller (e.g., controller 1125 and/or controller 1124) can cause the following:

Open valve 305 and then turn on compressor 303 to draw working fluid from high-pressure working fluid paths into high-pressure tank system 320 until the pressure in high-pressure working fluid paths are at a base pressure.

Turn off compressor 303 and then close valve 305.

Open valve 304 and then turn on compressor 303 to draw working fluid from low-pressure working fluid paths into the high-pressure tank system 320 until the low-pressure working fluid paths are at a base pressure. This should take only a short time because the low-pressure working fluid paths should already be very close to base pressure.

If the working fluid loop 300 leaks working fluid, to controller (e.g., controller 1125 and/or controller 1124) can cause additional working fluid to be added to the working fluid loop 300 as follows. Steps are described as if from a state where all referenced valves are initially closed:

Open valve 302.

Turn on compressor 303 to add working fluid from ambient air when air is the working fluid or from an external working fluid make-up reservoir (not shown) into high-pressure tank system 320 until high-pressure tank system 320 reaches a desired pressure.

Turn off compressor 303.

Close valve 302.

Open valve 322 to add working fluid from high-pressure tank system 320 to low-pressure working fluid paths.

Close valve 322.

Repeat above steps until the working fluid loop pressure is at a desired level.

G. States of Hot-Side Loop

FIG. 25 is a state diagram illustrating hot-side loop (also referred to as HTS loop) states of a PHES system, including PHES system 1000, according to an example embodiment. The hot-side loop is the flow path of circulating HTS medium 590, for example, through HTS system 501 in FIG. 4 and, in some states, HHX system 500 in FIGS. 2, 3, 6A, and 6B.

The states in FIG. 25 occur sequentially, for the most part. The preferred sequential relationships of these states are indicated by directional arrows between states.

At Drained state 1146, HTS medium 590 in fluid paths, including heat exchangers, has been drained or is being drained into the HTS tanks (e.g., 510 and/or 520). Heat trace 560 is off. When coming out of drained state 1146, e.g., to standby state 1138, heat trace 560 may be turned on prior to reintroduction of HTS medium 590 into fluid paths.

At Standby state 1138, the hot-side loop is filled or filling with HTS medium 590 and is ready for HTS medium 590 to flow. If the loop is not already filled, then a small flow rate would be temporarily established in the appropriate direction in order to fill the fluid paths with HTS medium 590.

At Flow-to-Hot state 1140, the hot-side loop is configured to allow HTS medium 590 flow from warm HTS system 591 to hot HTS system 592 (e.g., from warm HTS tank 510 to hot HTS tank 520 in HTS system 501) via the hot-side heat exchanger(s) (e.g., HHX system 500). Warm pump 530 is on to deliver this flow. Heat trace 560 may be turned off because HTS medium 590 is already hot. Bypass valve 551 is closed so that HTS medium 590 flows through HHX system 500.

At Flow-to-Warm state 1142, the hot-side loop is configured to allow HTS medium 590 flow from hot HTS system 592 to warm HTS system 591 (e.g., from hot HTS tank 520 to warm HTS tank 510 in HTS system 501) via the hot-side heat exchanger(s) (e.g., HHX system 500). Hot pump 540 is on to deliver this flow. Heat trace 560 may be turned off because HTS medium 590 is already hot. Bypass valve 551 is closed so that HTS medium 590 flows through HHX system 500.

At Bypassed state 1144, HTS medium 590 is flowing in the hot-side loop preferably from hot HTS system 592 to warm HTS system 591 (e.g., from hot HTS tank 520 to warm HTS tank 510 in HTS system 501), but not through the hot-side heat exchanger(s) (e.g., HHX system 500). Hot-side heat exchanger(s) are bypassed by opening bypass valve 551 and closing isolation valves 555, 556. Alternatively, in another embodiment, HTS medium 590 could flow in the hot-side loop from warm HTS system 591 to hot HTS system 592 (e.g., from warm HTS tank 510 to hot HTS tank 520 in HTS system 501), but not through the hot-side heat exchanger(s) (e.g., HHX system 500).

Table VI lists equipment status for hot-side loop states illustrated in FIG. 25. Component references refer to example embodiments illustrated in, for example, FIGS. 2, 3, 4, 6A, and 6B, and including HTS system 501 and HHX system 500, but the status may be applied to other configurations to accomplish the same hot-side loop state states.

TABLE VI

| | Status | | | | |
|---|---|---|---|---|---|
| | Drained 1146 | Standby 1138 | Flow-to-Hot 1140 | Flow-to-Warm 1142 | Bypassed 1144 |
| HX Bypass Valve 551 | Closed | Closed | Closed | Closed | Open |
| Heat Trace 560 | Off | On | Off | Off | Off |
| Warm Pump 530 | Off | Off | On | Off | *2 |
| Warm Heater 512 | *1 | On | On | On | On |
| Warm Inflow Valve 511 | Closed | Closed | Closed | Open | *3 |
| Warm Pump Outlet Valve 557 | Closed | Open | Open | Closed | *2 |
| HX Warm Isolation Valve 555 | Closed | Open | Open | Open | Closed |
| Warm Drain Valve 552 | Open | Closed | Closed | Closed | Closed |
| Hot Pump 540 | Off | Off | Off | On | *3 |
| Hot Heater 522 | *1 | On | On | On | On |
| Hot Inflow Valve 521 | Closed | Open | Open | Closed | *2 |
| Hot Pump Outlet Valve 558 | Closed | Closed | Closed | Open | *3 |
| HX Hot Isolation Valve 556 | Closed | Open | Open | Open | Closed |
| Hot Drain Valve 553 | Open | Closed | Closed | Closed | Closed |

*1 ON if HTS medium present; OFF if HTS medium not present
*2 ON or OPEN if bypass flow to hot; OFF or CLOSED if bypass flow to warm
*3 ON or OPEN if bypass flow to warm; OFF or CLOSED if bypass flow to hot H. States of Cold-Side Loop FIG. 26 is a state diagram illustrating cold-side loop (also referred to as CTS loop) states of a PHES system, including PHES system 1000, according to an example embodiment. The cold-side loop is the flow path of circulating CTS medium 690, for example, through CTS system 601 in FIG. 5 and, in some states, CHX system 600 in FIGS. 2, 3, 6A, and 6B.

The states in FIG. 26 occur sequentially, for the most part. The preferred sequential relationship of these states are indicated by directional arrows between states.

At Drained state 1156, CTS medium 690 in fluid paths, including heat exchangers, has been drained or is being drained into the CTS tanks (e.g., 610 and/or 620), preferably into a warm CTS tank (e.g., warm CTS tank 610). Preferably, no CTS pump is running once all CTS medium 690 has been drained.

At Standby state 1148, the cold-side loop is filled or filling with CTS medium 690 and is ready for CTS medium 690 to flow. Preferably, no CTS pump is running once the cold-side loop has been filled. If the loop is not already filled, then a flow rate from pumps 630 and/or 640 would be established in the appropriate direction in order to fill the fluid paths with CTS medium 690.

At Flow-to-Cold state 1150, the cold-side loop is configured to allow CTS medium 690 flow from warm CTS system 691 to cold CTS system 692 (e.g., from warm CTS tank 610 to cold CTS tank 620 in CTS system 601) via the cold-side heat exchanger(s) (e.g., CHX system 600). Warm pump 630 is on to deliver this flow. Cold pump 640, if bi-directional, can also be on to assist with pressure control. Bypass valve 605 is closed so that CTS medium 690 flows through CHX system 600.

At Flow-to-Warm state 1152, the cold-side loop is configured to allow CTS medium 690 flow from cold CTS system 692 to warm CTS system 691 (e.g., from cold CTS tank 620 to warm CTS tank 610 in CTS system 601) via the cold-side heat exchanger(s) (e.g., CHX system 600). Cold pump 640 is on to deliver this flow. Warm pump 630, if bi-directional, can also be on to assist with pressure control. Bypass valve 605 is closed so that CTS medium 690 flows through CHX system 600.

At Bypassed state 1154, CTS medium 590 is preferably flowing in the cold-side loop from cold CTS system 692 to warm CTS system (e.g., from cold CTS tank 620 to warm CTS tank 610 in CTS system 601), but not through the cold-side heat exchanger(s) (e.g., CHX system 600). Cold-side heat exchanger(s) are bypassed by opening bypass valve 605 and closing isolation valves 602, 603. Alternatively, in another embodiment, CTS medium 590 could flowing in the cold-side loop from warm CTS system to cold CTS system 692 (e.g., from warm CTS tank 610 to cold CTS tank 620 in CTS system 601), but not through the cold-side heat exchanger(s) (e.g., CHX system 600).

Table VII lists equipment status for cold-side loop states illustrated in FIG. 26, in an embodiment of CTS system 601 where pumps 630, 640 are used for bi-directional pumping. Component references refer to example embodiments illustrated in, for example, FIGS. 2, 3, 5, 6A, and 6B and including CTS system 601 and CHX system 600, but the status may be applied to other configurations to accomplish the same hot-side loop states.

TABLE VII

| Equipment | Status | | | | |
|---|---|---|---|---|---|
| | Drained 1156 | Standby 1148 | Flow-to-Cold 1150 | Flow-to-Warm 1152 | Bypassed 1154 |
| Bypass Valve Valve 605 | Closed | Closed | Closed | Closed | Open |
| Inert Gas Purge Valve 624 | *1 | Closed | Closed | Closed | Closed |
| Cold Pump 640 | Off | Off | On to Cold | On to Warm | *2 |
| Cold Isolation Valve 602 | Closed | Open | Open | Open | Closed |
| Cold Tank Valve 621 | Closed | Open | Open | Open | Open |
| Cold Pump Isolation Valve 641 | Closed | Open | Open | Open | Open |
| Cold Pump Bypass Valve 642 | Closed | Closed | Closed | Closed | Closed |
| Cold Pump Isolation Valve 643 | Closed | Open | Open | Open | Open |
| Warm Pump 630 | Off | Off | On to Cold | On to Warm | *2 |
| Warm Isolation Valve 603 | Closed | Open | Open | Open | Closed |
| Warm Tank Valve 611 | Closed | Open | Open | Open | Open |
| Warm Pump Isolation Valve 631 | Closed | Open | Open | Open | Open |
| Warm Pump Bypass Valve 632 | Closed | Closed | Closed | Closed | Closed |
| Warm Pump Isolation Valve 633 | Closed | Open | Open | Open | Open |

*1 OPEN until purge complete
*2 ON-to-Warm if bypass flow to warm; ON-to-Cold if bypass flow to cold Table VIII lists equipment status for cold-side loop states illustrated in FIG. 26, in an embodiment of CTS system 601 where pumps 630, 640 are not used for bi-directional pumping. Component references refer to example embodiments illustrated in, for example, FIGS. 2, 3, 5, 6A, and 6B and including CTS system 601 and CHX system 600, but the status may be applied to other configurations to accomplish the same hot-side loop states.

TABLE VIII

| | Status | | | | |
|---|---|---|---|---|---|
| | Drained 1156 | Standby 1148 | Flow-to-Cold 1150 | Flow-to-Warm 1152 | Bypassed 1154 |
| Bypass Valve Valve 605 | Closed | Closed | Closed | Closed | Open |
| Inert Gas Purge Valve 624 | *1 | Closed | Closed | Closed | Closed |
| Cold Pump 640 | Off | Off | Off | On to Warm | *2 |
| Cold Isolation Valve 602 | Closed | Open | Open | Open | Closed |
| Cold Tank Valve 621 | Closed | Open | Open | Open | Open |
| Cold Pump Isolation Valve 641 | Closed | Open | Closed | Open | *5 |
| Cold Pump Bypass Valve 642 | Closed | Closed | Open | Closed | *4 |
| Cold Pump Isolation Valve 643 | Closed | Open | Closed | Open | *5 |
| Warm Pump 630 | Off | Off | On to Cold | On to Warm | *3 |
| Warm Isolation Valve 603 | Closed | Open | Open | Open | Closed |
| Warm Tank Valve 611 | Closed | Open | Open | Open | Open |
| Warm Pump Isolation Valve 631 | Closed | Open | Open | Closed | *4 |

TABLE VIII-continued

| | Status | | | | |
|---|---|---|---|---|---|
| | Drained 1156 | Standby 1148 | Flow-to-Cold 1150 | Flow-to-Warm 1152 | Bypassed 1154 |
| Warm Pump Bypass Valve 632 | Closed | Closed | Closed | Open | *5 |
| Warm Pump Isolation Valve 633 | Closed | Open | Open | Closed | *4 |

*1 OPEN until purge complete
*2 On-to-Warm if bypass flow to warm; OFF if bypass flow to cold
*3 On-to-Cold if bypass flow to cold; OFF if bypass flow to warm
*4 OPEN if bypass flow to cold; CLOSED if bypass flow to warm
*5 CLOSED if bypass flow to cold; OPEN if bypass flow to warm IV. Use Cases This section describes transient "use cases" that can be implemented in a PHES system, including PHES system 1000 and the subsystems described herein. Each transient use case is a process or a transitionary sequence that the PHES system undergoes, and can be described by mode and/or state changes.

A. Cold Dry Standby to Hot Standby (PHES System Startup)

This use case is illustrated in FIG. 10 as the transition from Cold Dry Standby mode 1010 to Hot Standby mode 1008, and in FIG. 11 as the transition from operating state 1030 to operating state 1024.

B. Hot Standby to Charge (PHES System Startup)

This use case is illustrated in FIG. 10 as the transition from Hot Standby mode 1008 to Charge mode 1002, and in FIG. 11 as the transition from operating state 1024 to operating state 1014.

Figure 19:
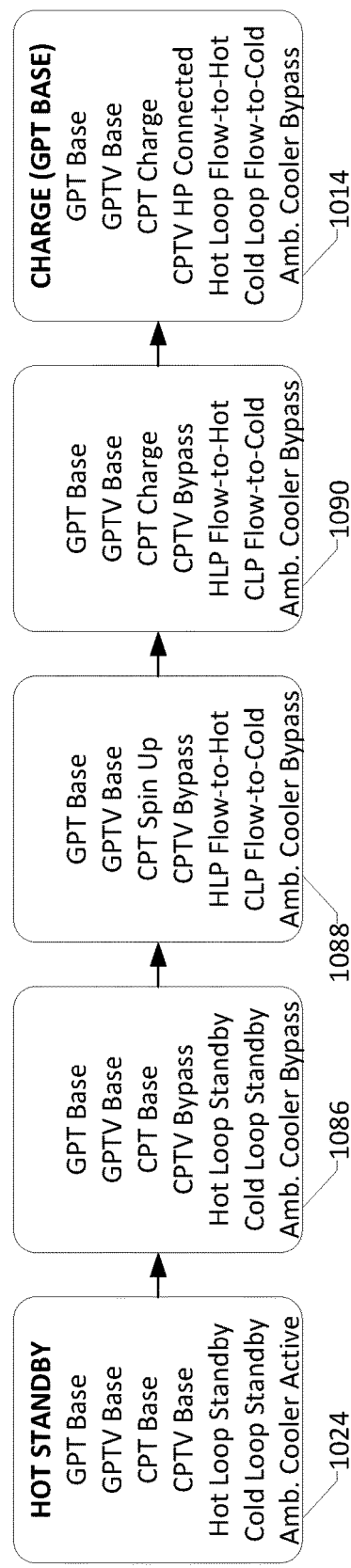
FIG. 19 is a state diagram illustrating select operating and transitional states of a PHES system, according to an example embodiment.

FIG. 19 further illustrates this use case. FIG. 19 is a state diagram illustrating operating and transitional states in a PHES system, including PHES system 1000, according to an example embodiment. These are example state transitions and other embodiments are possible as well. FIG. 19 illustrates transition from the HOT STANDBY state 1024 to CHARGE (GPT BASE) state 1014, with intermediate transitional states 1086, 1088, 1090 occurring sequentially in between. Each of the subsystem states is described elsewhere herein.

C. Hot Standby to Generation (PHES System Startup)

This use case is illustrated in FIG. 10 as the transition from Hot Standby mode 1008 to Generation mode 1004, and in FIG. 11 as the transition from operating state 1024 to operating state 1016.

Figure 20:
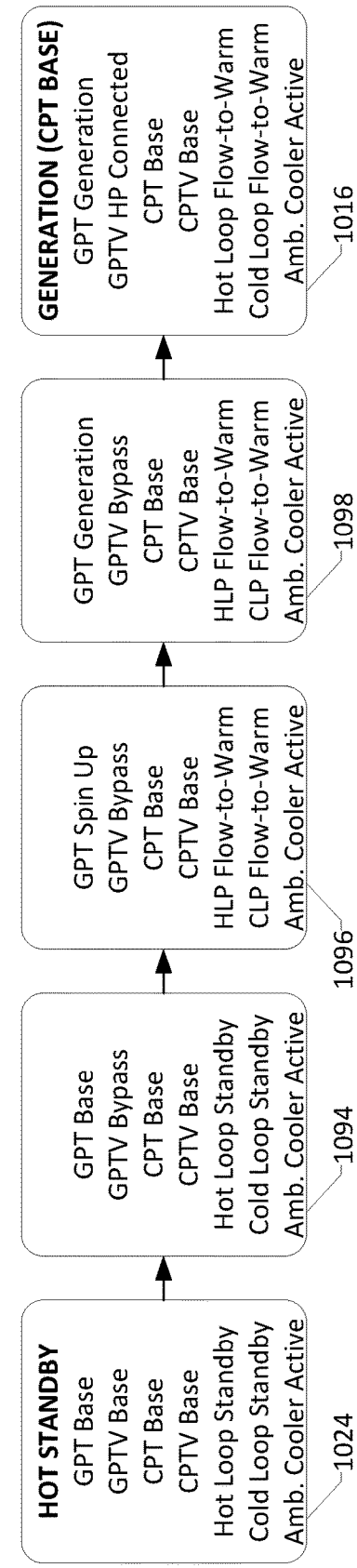
FIG. 20 is a state diagram illustrating select operating and transitional states of a PHES system, according to an example embodiment.

FIG. 20 further illustrates this use case. FIG. 20 is a state diagram illustrating operating and transitional states in a PHES system, including PHES system 1000, according to an example embodiment. These are example state transitions and other embodiments are possible as well. FIG. 20 illustrates transition from the HOT STANDBY state 1024 to GENERATION (CPT BASE) state 1016, with intermediate transitional states 1094, 1096, 1098 occurring sequentially in between. Each of the subsystem states is described elsewhere herein.

D. Charge to Hot Turning (PHES System Shutdown)

This use case is illustrated in FIG. 10 as the transition from Charge mode 1002 to Hot Turning mode 1006, and in FIG. 11 as the transition from operating state 1014 to operating state 1018.

Figure 21:
FIG. 21 is a state diagram illustrating select operating and transitional states of a PHES system, according to an example embodiment.

FIG. 21 further illustrates this use case. FIG. 21 is a state diagram illustrating operating and transitional states in a PHES system, including PHES system 1000, according to an example embodiment. These are example state transitions and other embodiments are possible as well. FIG. 21 illustrates transition from the CHARGE (GPT BASE) state 1014 to HOT TURNING (CPT SLOW ROLLING) state 1018, with intermediate transitional states 1102, 1104 occurring sequentially in between. Each of the subsystem states is described elsewhere herein.

E. Generation to Hot Turning (PHES System Shutdown)

This use case is illustrated in FIG. 10 as the transition from Generation mode 1004 to Hot Turning mode 1006, and in FIG. 11 as the transition from operating state 1016 to operating state 1022.

Figure 22:
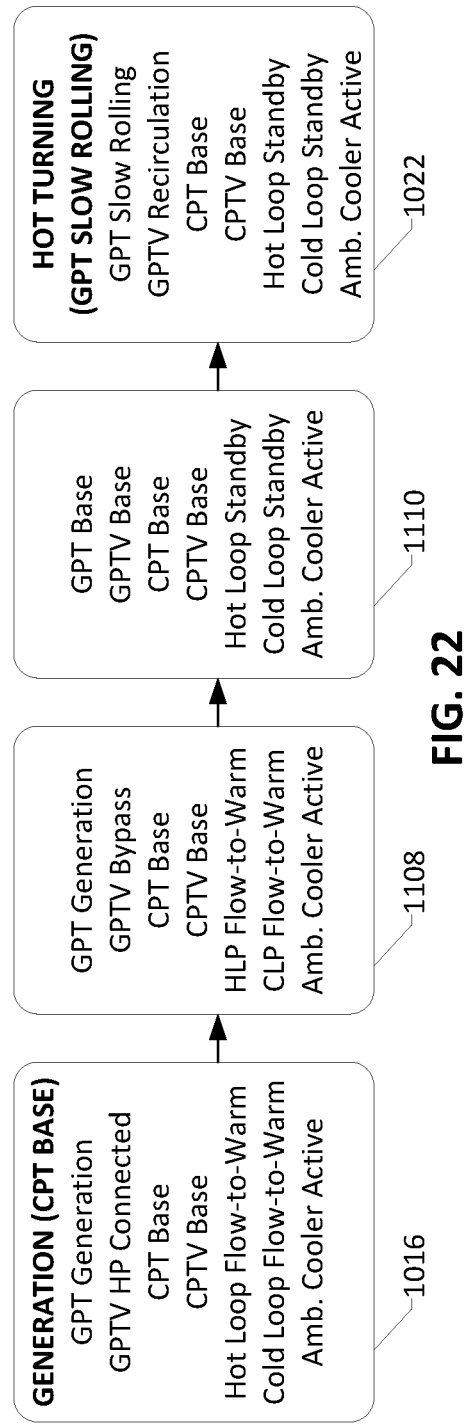
FIG. 22 is a state diagram illustrating select operating and transitional states of a PHES system, according to an example embodiment.

FIG. 22 further illustrates this use case. FIG. 22 is a state diagram illustrating operating and transitional states in a PHES system, including PHES system 1000, according to an example embodiment. These are example state transitions and other embodiments are possible as well. FIG. 22 illustrates transition from the GENERATION (CPT BASE) state 1016 to HOT TURNING (GPT SLOW ROLLING) state 1022, with intermediate transitional states 1108, 1110 occurring sequentially in between. Each of the subsystem states is described elsewhere herein.

F. Hot Standby to Cold Dry Standby (PHES System Shutdown)

This use case is illustrated in FIG. 10 as the transition from Hot Standby mode 1008 to Cold Dry Standby mode 1010 to, and in FIG. 11 as the transition from operating state 1024 to operating state 1030.

G. Charge to Generation (PHES System Mode Switch)

This use case is illustrated in FIG. 10 as the transition from Charge mode 1002 to Hot Turning mode 1006 to Generation mode 1004, and in FIG. 11 as the transition from operating state 1014 to operating state 1018 to operating state 1028.

Figure 23:
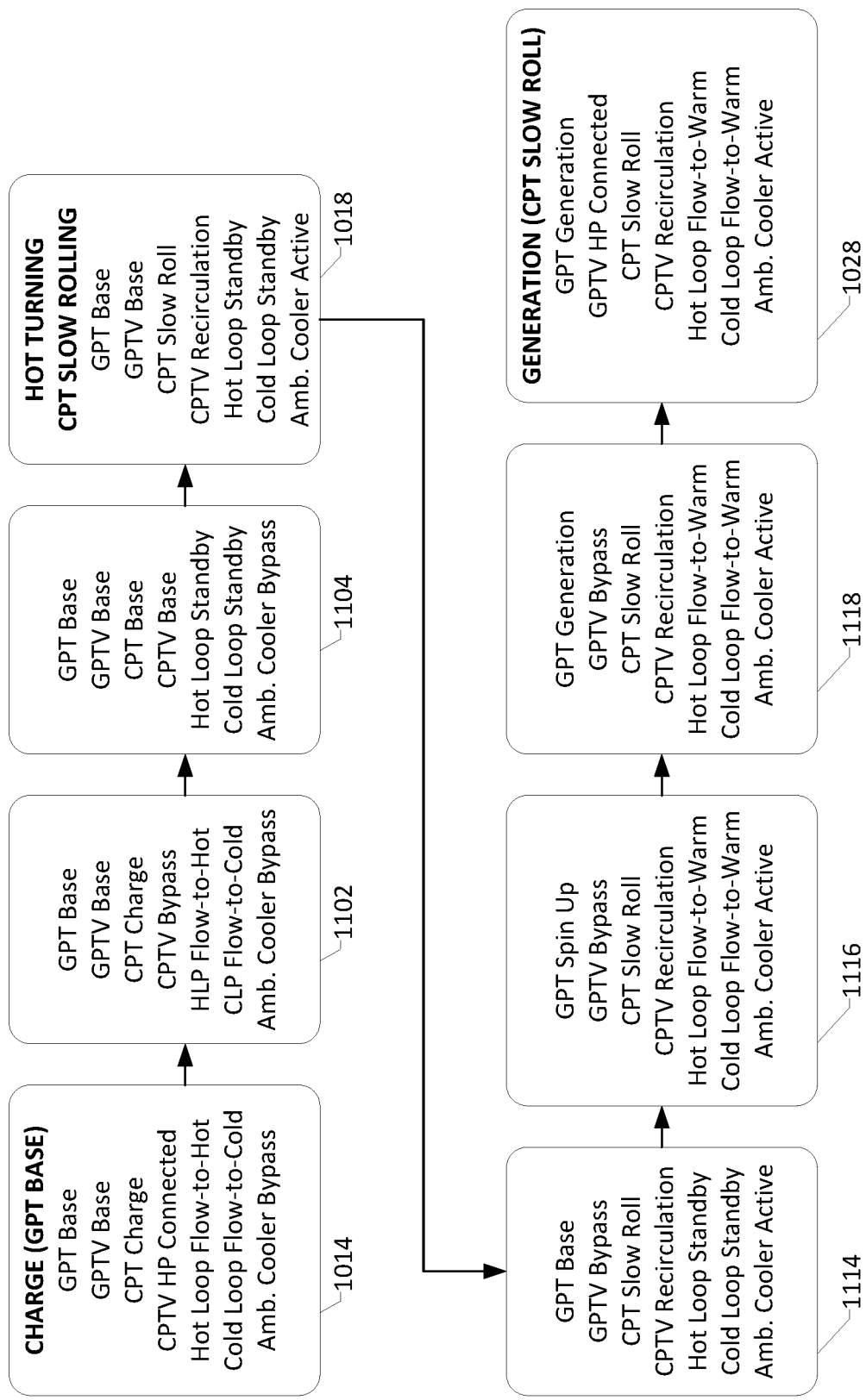
FIG. 23 is a state diagram illustrating select operating and transitional states of a PHES system, according to an example embodiment.

FIG. 23 further illustrates this use case. FIG. 23 is a state diagram illustrating operating and transitional states in a PHES system, including PHES system 1000, according to an example embodiment. These are example state transitions and other embodiments are possible as well. FIG. 23 illustrates transition from the CHARGE (GPT BASE) state 1014 to HOT TURNING (CPT SLOW ROLLING) state 1018, with intermediate transitional states 1102, 1104 occurring sequentially in between. FIG. 23 further continues with illustration of the continuing transition from HOT TURNING (CPT SLOW ROLLING) state 1018 to GENERATION (CPT SLOW ROLL) state 1028, with intermediate transitional states 1116, 1118 occurring sequentially in between. Each of the subsystem states is described elsewhere herein.

The invention claimed is:

1. A pumped heat energy storage system, the system comprising:
   a charge compressor system;
   a charge turbine system;
   a generation compressor system;
   a generation turbine system;
   a hot-side heat exchanger ("HHX") system;
   a recuperator heat exchanger ("RHX") system;
   a cold-side heat exchanger ("CHX") system;
   a hot-side thermal storage ("HTS") system;
   a cold-side thermal storage ("CTS") system;
   a working fluid loop comprising:
      a first working fluid path arranged to circulate a working fluid through, in sequence, the charge compressor system, the HHX system, the RHX system, the charge turbine system, the CHX system, the RHX system, and back to the charge compressor system,
      a second working fluid path arranged to circulate the working fluid through, in sequence, the generation compressor system, the RHX system, the HHX system, the generation turbine system, the RHX system, the CHX system, and back to the generation compressor system, and
      a third working fluid path arranged to recirculate at least a portion of the working fluid through the charge turbine system without circulating at least the portion of the working fluid through the CHX system, the RHX system, the charge compressor system, and the HHX system.

2. The system of claim 1, further comprising:
   an inventory control system, wherein the inventory control system includes a valve system operable to direct the working fluid from at least one of the first working fluid path or the second working fluid path into at least one tank system, wherein the valve system is further operable to add the working fluid from the at least one tank system to at least one of the first working fluid path or the second working fluid path.

3. The system of claim 1, further comprising:
   another working fluid path arranged to recirculate at least a portion of the working fluid through the charge compressor system without circulating at least the portion of the working fluid through the HHX system, the RHX system, the charge turbine system, and the CHX system.

4. The system of claim 3 further comprising a heat exchanger in the other working fluid path.

5. The system of claim 1, further comprising:
   another working fluid path arranged to recirculate at least a portion of the working fluid through the generation compressor system without circulating at least the portion of the working fluid through the RHX system, the HHX system, the generation turbine system, and the CHX system.

6. The system of claim 1, further comprising:
   another working fluid path arranged to recirculate at least a portion of the working fluid through the generation turbine system without circulating at least the portion of the working fluid through the RHX system, the CHX system, the generation compressor system, and the HHX system.

7. The system of claim 6 further comprising a heat exchanger in the other working fluid path.

8. The system of claim 6 further comprising a fan in the other working fluid path.

9. The system of claim 1, further comprising:
   a bypass working fluid path arranged to circulate at least a portion of the working fluid from an outlet of the generation compressor system to an inlet of the generation turbine system without circulating at least the portion of the working fluid through the RHX system and the HHX system.

10. The system of claim 1, further comprising:
    a bypass working fluid path arranged to circulate at least a portion of the working fluid from an outlet of the generation turbine system to an inlet of the CHX system without circulating at least the portion of the working fluid through the RHX system.

11. The system of claim 1, further comprising:
    a bypass working fluid path arranged to circulate at least a portion of the working fluid from an outlet of the generation compressor system to a low-pressure side of the RHX system without circulating at least the portion of the working fluid through a high-pressure side of the RHX system, the HHX system, and the generation turbine system.

12. The system of claim 1, further comprising:
    a first charge isolation valve in the first working fluid path between an outlet of the charge compressor system and an inlet of the HHX system; and
    a second charge isolation valve in the first working fluid path between an outlet of the RHX system and an inlet of the charge turbine system.

13. The system of claim 1, further comprising:
    a first generation isolation valve in the second working fluid path between an outlet of the generation compressor system and an inlet of the RHX system; and
    a second generation isolation valve in the second working fluid path between an outlet of the HHX system and an inlet of the generation turbine system.

14. The system of claim 1, further comprising an ambient heat exchanger ("AHX") system arranged in the second working fluid path between an outlet of a low-pressure side of the RHX system and an inlet of the CHX system.

15. A method of operating a pumped heat energy storage system, the method comprising:
    opening a first charge isolation valve in a first working fluid path between an outlet of a charge compressor system and an inlet of a hot-side heat exchanger ("HHX") system;
    opening a second charge isolation valve in the first working fluid path between an outlet of a recuperator heat exchanger ("RHX") system and an inlet of a charge turbine system;
    closing a first generation isolation valve in a second working fluid path between an outlet of a generation compressor system and an inlet of the RHX system;
    closing a second generation isolation valve in the second working fluid path between an outlet of the HHX system and an inlet of a generation turbine system;
    circulating a working fluid in the first working fluid path through, in sequence, the charge compressor system, the HHX system, the RHX system, the charge turbine system, a cold-side heat exchanger ("CHX") system, the RHX system, and back to the charge compressor system;
    opening a valve that permits recirculation of a quantity of the working fluid through the generation turbine system without circulating the quantity of the working fluid through the RHX system, the CHX system, the generation compressor system, and the HHX system; and
    recirculating the quantity of the working fluid through the generation turbine system without circulating the quantity of the working fluid through the RHX system, the CHX system, the generation compressor system, and the HHX system.

16. The method of claim 15, further comprising:

opening a first inventory control valve that releases at least a portion of the working fluid from the first working fluid path into at least one tank system; and closing the first inventory control valve, thus storing at least the portion of the working fluid in the at least one tank system.

17. The method of claim 15, further comprising:

opening a first inventory control valve that adds an amount of the working fluid from at least one tank system to the first working fluid path; and closing the first inventory control valve.

18. The method of claim 15, further comprising:

opening a valve that allows at least a portion of the working fluid to recirculate through the charge compressor system without circulating at least the portion of the working fluid through the HHX system, the RHX system, the charge turbine system, and the CHX system; and recirculating the at least the portion of the working fluid through the charge compressor system without circulating at least the portion of the working fluid through the HHX system, the RHX system, the charge turbine system, and the CHX system.

19. The method of claim 15, further comprising:

opening a valve that permits recirculation of a quantity of the working fluid through the generation compressor system without circulating the quantity of the working fluid through the RHX system, the HHX system, the generation turbine system, and the CHX system; and recirculating the quantity of the working fluid through the generation compressor system without circulating the quantity of the working fluid through the RHX system, the HHX system, the generation turbine system, and the CHX system.

20. A method of operating a pumped heat energy storage system, the method comprising:

closing a first charge isolation valve in a first working fluid path between an outlet of a charge compressor system and an inlet of a hot-side heat exchanger ("HHX") system;

closing a second charge isolation valve in the first working fluid path between an outlet of a recuperator heat exchanger ("RHX") system and an inlet of a charge turbine system;

opening a first generation isolation valve in a second working fluid path between an outlet of a generation compressor system and an inlet of the RHX system;

opening a second generation isolation valve in the second working fluid path between an outlet of the HHX system and an inlet of a generation turbine system; and circulating a working fluid in the second working fluid path through, in sequence, the generation compressor system, the RHX system, the HHX system, the generation turbine system, the RHX system, a cold-side heat exchanger ("CHX") system, and back to the generation compressor system; and opening a valve that permits recirculation of a quantity of the working fluid through the charge turbine system without circulating the quantity of the working fluid through the CHX system, the RHX system, the charge compressor system, and the HHX system; and recirculating the quantity of the working fluid through the charge turbine system without circulating the quantity of the working fluid through the CHX system, the RHX system, the charge compressor system, and the HHX system.

21. The method of claim 20, further comprising:

opening a first inventory control valve that releases working fluid from the first working fluid path into at least one tank system; and closing the first inventory control valve, thus storing working fluid in the at least one tank system.

22. The method of claim 20, further comprising:

opening a first inventory control valve that adds working fluid from at least one tank system to the first working fluid path; and closing the first inventory control valve.

23. The method of claim 20, further comprising:

opening a valve that permits recirculation of a quantity of the working fluid through the charge compressor system without circulating the quantity of the working fluid through the HHX system, the RHX system, the charge turbine system, and the CHX system; and recirculating the quantity of the working fluid through the charge compressor system without circulating the quantity of the working fluid through the HHX system, the RHX system, the charge turbine system, and the CHX system.

24. The method of claim 20, further comprising:

opening a bypass valve that permits circulation of a quantity of the working fluid from the outlet of the generation compressor system to the inlet of the generation turbine system without circulating the quantity of the working fluid through the RHX system and the HHX system;

circulating the quantity of the working fluid from the outlet of the generation compressor system to the inlet of the generation turbine system without circulating the quantity of the working fluid through the RHX system and the HHX system;

closing the first generation isolation valve; and closing the second generation isolation valve.

25. The method of claim 20, further comprising:

opening a bypass valve that permits circulation of at least a portion of the working fluid from an outlet of the generation turbine system to an inlet of the CHX system without circulating at least the portion of the working fluid through the RHX system; and circulating at least a portion of the working fluid from the outlet of the generation turbine system to the inlet of the CHX system without circulating at least the portion of the working fluid through the RHX system.

26. The method of claim 20, further comprising:

opening a valve that permits circulation of at least a portion of the working fluid from the outlet of the generation compressor system to a low-pressure side of the RHX system without circulating at least the portion of the working fluid through a high-pressure side of the RHX system, the HHX system, and the generation turbine system; and circulating at least the portion of the working fluid from the outlet of the generation compressor system to the low-pressure side of the RHX system without circulating at least the portion of the working fluid through the high-pressure side of the RHX system, the HHX system, and the generation turbine system.

27. A pumped heat energy storage system, the system comprising:
- a charge compressor system;
- a charge turbine system;
- a generation compressor system;
- a generation turbine system;
- a hot-side heat exchanger ("HHX") system;
- a recuperator heat exchanger ("RHX") system;
- a cold-side heat exchanger ("CHX") system;
- a hot-side thermal storage ("HTS") system;
- a cold-side thermal storage ("CTS") system;
- a working fluid loop comprising:
  - a first working fluid path arranged to circulate a working fluid through, in sequence, the charge compressor system, the HHX system, the RHX system, the charge turbine system, the CHX system, the RHX system, and back to the charge compressor system,
  - a second working fluid path arranged to circulate the working fluid through, in sequence, the generation compressor system, the RHX system, the HHX system, the generation turbine system, the RHX system, the CHX system, and back to the generation compressor system, and
  - a third working fluid path arranged to recirculate at least a portion of the working fluid through the generation turbine system without circulating at least the portion of the working fluid through the RHX system, the CHX system, the generation compressor system, and the HHX system.

28. The system of claim 27, further comprising:
an inventory control system, wherein the inventory control system includes a valve system operable to direct the working fluid from at least one of the first working fluid path or the second working fluid path into at least one tank system, wherein the valve system is further operable to add the working fluid from the at least one tank system to at least one of the first working fluid path or the second working fluid path.

29. The system of claim 27, further comprising:
another working fluid path arranged to recirculate at least a portion of the working fluid through the charge compressor system without circulating at least the portion of the working fluid through the HHX system, the RHX system, the charge turbine system, and the CHX system.

30. The system of claim 29, further comprising a heat exchanger in the other working fluid path.

31. The system of claim 27, further comprising:
another working fluid path arranged to recirculate at least a portion of the working fluid through the generation compressor system without circulating at least the portion of the working fluid through the RHX system, the HHX system, the generation turbine system, and the CHX system.

32. The system of claim 27, further comprising a heat exchanger in the third working fluid path.

33. The system of claim 27, further comprising a fan in the third working fluid path.

34. The system of claim 27, further comprising:
a bypass working fluid path arranged to circulate at least a portion of the working fluid from an outlet of the generation compressor system to an inlet of the generation turbine system without circulating at least the portion of the working fluid through the RHX system and the HHX system.

35. The system of claim 27, further comprising:
a bypass working fluid path arranged to circulate at least a portion of the working fluid from an outlet of the generation turbine system to an inlet of the CHX system without circulating at least the portion of the working fluid through the RHX system.

36. The system of claim 27, further comprising:
a bypass working fluid path arranged to circulate at least a portion of the working fluid from an outlet of the generation compressor system to a low-pressure side of the RHX system without circulating at least the portion of the working fluid through a high-pressure side of the RHX system, the HHX system, and the generation turbine system.

37. The system of claim 27, further comprising:
a first charge isolation valve in the first working fluid path between an outlet of the charge compressor system and an inlet of the HHX system; and
a second charge isolation valve in the first working fluid path between an outlet of the RHX system and an inlet of the charge turbine system.

38. The system of claim 27, further comprising:
a first generation isolation valve in the second working fluid path between an outlet of the generation compressor system and an inlet of the RHX system; and
a second generation isolation valve in the second working fluid path between an outlet of the HHX system and an inlet of the generation turbine system.

39. The system of claim 27, further comprising an ambient heat exchanger ("AHX") system arranged in the second working fluid path between an outlet of a low-pressure side of the RHX system and an inlet of the CHX system.

* * * * *